United States Patent
Yamada et al.

(10) Patent No.: US 7,652,956 B2
(45) Date of Patent: Jan. 26, 2010

(54) DISC DRIVE OPERATIVE WITH BOTH LARGE-DIAMETER AND SMALL-DIAMETER OPTICAL DISCS, AND METHOD OF CONTROLLING SAME

(75) Inventors: Takashi Yamada, Tokyo (JP); Kazuyuki Yamamoto, Kanagawa (JP); Hideaki Kumagai, Kanagawa (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 10/566,396

(22) PCT Filed: Jun. 1, 2005

(86) PCT No.: PCT/JP2005/010057

§ 371 (c)(1),
(2), (4) Date: Jan. 30, 2006

(87) PCT Pub. No.: WO2005/119665

PCT Pub. Date: Dec. 15, 2005

(65) Prior Publication Data

US 2006/0245313 A1    Nov. 2, 2006

(30) Foreign Application Priority Data

Jun. 1, 2004 (JP) .............................. 2004-163907

(51) Int. Cl.
*G11B 17/22* (2006.01)

(52) U.S. Cl. .................. 369/30.32; 369/53.2

(58) Field of Classification Search ........................ None
See application file for complete search history.

(56) References Cited

U.S. PATENT DOCUMENTS 4,498,162 A    2/1985    Schatteman

FOREIGN PATENT DOCUMENTS

| JP | 58-189867 A | 11/1983 |
|---|---|---|
| JP | 04-141830 A | 5/1992 |
| JP | 2001-134954 A | 5/2001 |
| JP | 2002-117604 A | 4/2002 |
| JP | 2003-030882 A | 1/2003 |

OTHER PUBLICATIONS

PCT International Search Report for PCT/JP2005/010057 mailed on Aug. 2, 2005.

*Primary Examiner*—Paul Huber
(74) *Attorney, Agent, or Firm*—Rader, Fishman & Grauer PLLC

(57) ABSTRACT

There is provided a disc drive adopting a slot-in loading by which an optical disc (2) is loaded into or ejected out of the device body through a disc slot. The disc drive can have loaded therein a large-diameter optical disc (2A) and small-diameter optical disc (2B), different in outside diameter from each other. With the small-diameter optical disc being set on a turn-table (23a), an objective lens (25a) is retreated in a direction away from the signal recording surface of the small-diameter optical disc when a pickup moving mechanism (26) moves an optical pickup (25) between the outer and inner radii of the small-diameter optical disc.

8 Claims, 54 Drawing Sheets

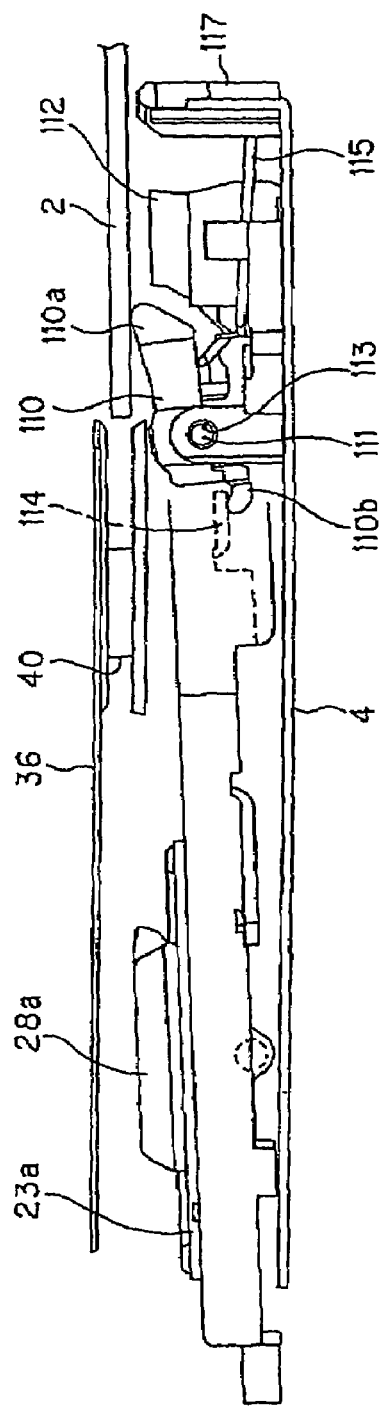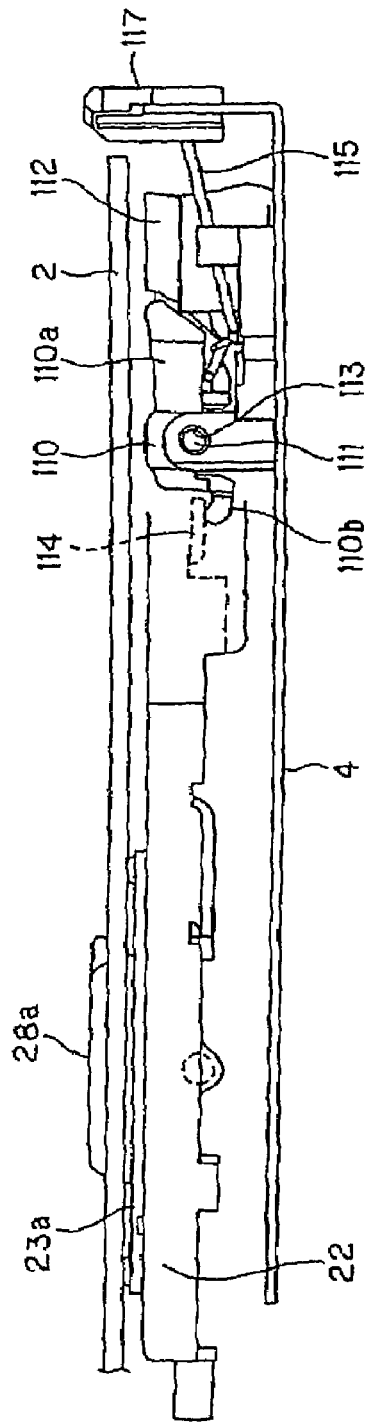
FIG. 70A
FIG. 70B

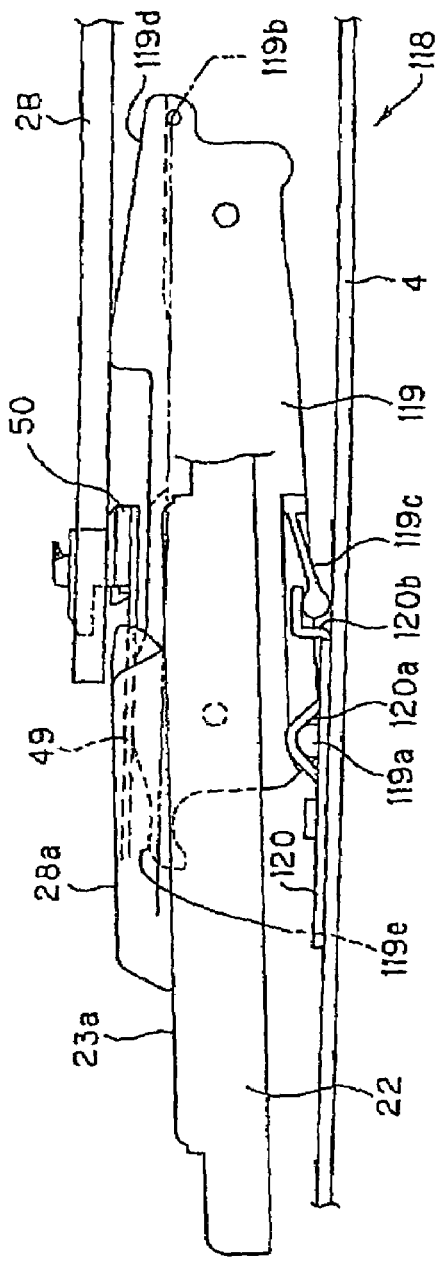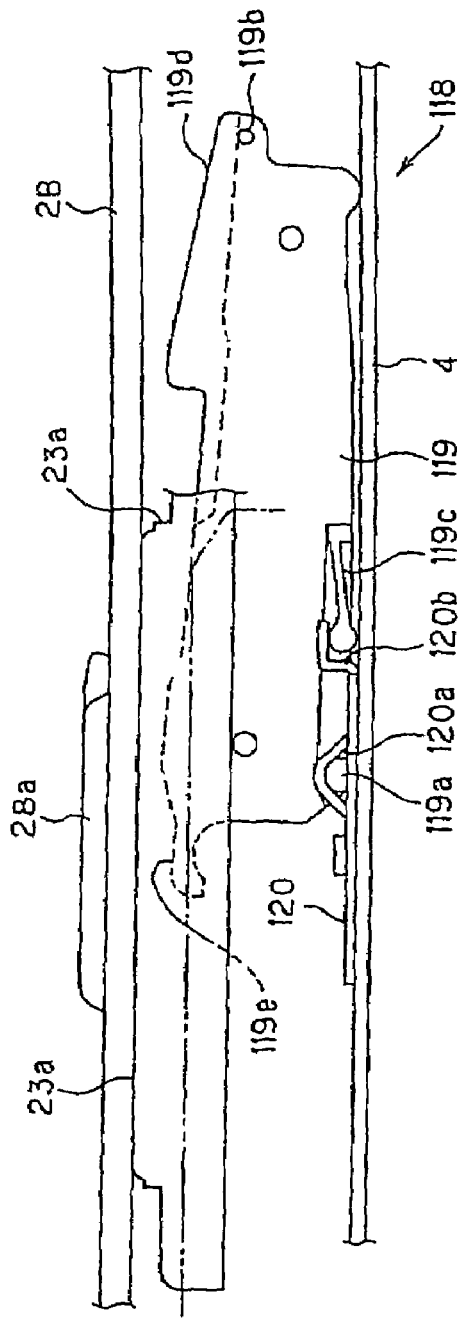
FIG. 71A
FIG. 71B

DISC DRIVE OPERATIVE WITH BOTH LARGE-DIAMETER AND SMALL-DIAMETER OPTICAL DISCS, AND METHOD OF CONTROLLING SAME

This application is a 371 of PCT/JP05/10057, filed Jun. 1, 2005.

TECHNICAL FIELD

The present invention generally relates to a disc drive that writes and/or reads information signals to and/from an optical disc and a method of controlling the disc drive, and more particularly to a slot-in type disc drive that can write and/or read information signals to and/or from one of optical discs different in outside diameter from each other and a method of controlling the disc drive.

BACKGROUND ART

Currently, there are available disc drives compatible with information signal recording media such as optical discs including a CD (Compact Disc), DVD (Digital Versatile Disc) and the like, magneto-optical disc called "MO" and magneto-optical disc called "MD (Mini Disc)", and which can use each disc of such a type as it is or as housed in a cartridge called "disc cartridge".

The disc drives using an optical disc as a recording medium include a type in which a disc is set directly on a turn-table exposed to outside with a lid or door provided on a housing being opened, a type in which a disc is mounted on a disc tray that is horizontally introduced into or ejected from a housing and the disc tray is carried into the housing and automatically set on a turn-table provided inside the housing, and a type in which a disc is set directly on a turn-table provided on a disc tray. In all of these types of disc drives, it is necessary to open and close the lid or door, introduce and eject the disc tray and set the disc on the turn-table.

Besides the above disc drives, there is available a type using a slot-in type loading mechanism by which a disc just inserted through a disc slot provided at the front side of a housing can automatically be set on a turn-table. This type of disc drive includes a pair of guide rollers to catch a disc inserted through the disc slot and carry the disc into the housing. More specifically, the disc inserted through the disc slot is taken into the housing by the pair of guide rollers rotated in directions opposite to each other (which is called "disc loading"). When an eject operation is made by the user, the rollers in pair are rotated in directions opposite to those for the disc loading to carry the disc to outside the housing (which is called "disc ejection").

Note here that the mobile device, for example, a portable personal computer in which a disc drive is to be installed, is required to be more compact and lightweight and slimmer and hence the disc drive to be installed in such as mobile device is also required to be correspondingly more compact and lightweight and slimmer. Also, it should be noted that a disc drive using the slot-in type loading mechanism easier to use is in higher demand in lieu of the disc drive of the tray type currently used in many portable personal computers.

To load a disc, the disc drive using the slot-in type loading mechanism needs a pair of guide rollers for catching and carrying a disc as mentioned above. However, the guide rollers are longer in the direction of the width of the entire disc drive because their length is larger than the diameter of a disc to carry because their structure. Also, since the pair of guide rollers catches the disc between them, their thickness is considerably large, which makes it difficult to design the conventional slot-in type disc drive more compact and slimmer.

The slim disc drive to be installed in a small mobile device such as a notebook computer having such a size as to be portable is normalized to have a thickness of 12.7 mm, and slimed to a thickness of 9.5 mm which is also the thickness of the hard disc drive (HDD). Therefore, adoption of a slot-in type loading mechanism including a pair of guide rollers in a disc drive slimmed to such a thickness is extremely difficult because of its structure.

To meet the requirements for a more compact and slimmer structure, there have been proposed disc drives each adopting the slot-in type loading mechanism, in which a plurality of pivoting arms is disposed between a disc inserted through a disc slot and a base having installed thereon a turn-table on which the disc is to be set, the pivoting arms are rotated in a plane parallel to the inserted disc to carry the disc from the disc slot into a housing and eject the disc from the disc slot to outside the housing. A typical one of these types of disc drives is disclosed in the Japanese Patent Application Laid Open No. 2002-117604.

In the disc drive proposed in the above patent document to overcome the drawbacks of the disc drive adopting the slot-in loading, there is provided a mechanism to forcibly eject an optical disc having a smaller diameter other than 12 cm (which is the diameter of the widely used standard-size optical disc), such as a CD of 8 cm in diameter, a recording-only DVD used in a camcorder or the like, introduced through a disc slot because the disc drive itself is compatible with only the standard-size optical disc. Therefore, this type of disc drive cannot make any slot-in loading of such discs different in outside diameter from each other.

On this account, there has been demanded a disc drive adopting the slot-in loading, capable of selective loading of discs different in outside diameter from each other, and designed for a slimmer structure.

DISCLOSURE OF THE INVENTION

Accordingly, the present invention has an object to overcome the above-mentioned drawbacks of the related art by providing a disc drive slimmed while adopting the slot-in loading and a method of controlling the disc drive.

The present invention has another object to provide a disc drive designed to protect mechanisms such as an optical pickup etc. disposed in the device body and also an optical disc being loaded and a method of controlling the disc drive.

The above object can be attained by providing a disc drive including according to the present invention:

a housing having formed at the front side thereof a disc slot through which each of large- and small-diameter optical discs different in outside diameter from each other is introduced and ejected;

a base unit including a base on which there are provided together a disc mount onto which the optical disc introduced from the disc slot into the housing is to be set, a disc rotation driving mechanism to drive, by rotation, the optical disc set on the disc mount, an optical pickup to write or read information signals to the optical disc being rotated by the disc rotation driving mechanism while irradiating a light beam condensed by an objective lens to the signal recording surface of the optical disc and a pickup moving mechanism to move the optical pickup radially of the optical disc; and a disc carrying mechanism to selectively carry the optical pickups having different outside diameters between a disc insertion/ejection position where the disc is inserted or ejected from the disc slot and a disc setting position where the optical disc is to be set, the optical pickup including an objective lens moving mechanism to move the objective lens at least in a direction parallel to the optical axis of the objective lens and a driving control circuit that controls the objective lens moving mechanism to retreat the objective lens in a direction away from the signal recording surface of a small-diameter one of small- and large-diameter optical discs different in outside diameter from each other, which is set on the disc mount, when the pickup moving mechanism moves the optical pickup between the outer and inner radii of the small-diameter optical lens.

Also the above object can be attained by providing a method of controlling a disc drive including:

a housing having formed at the front side thereof a disc slot through which each of large- and small-diameter optical discs different in outside diameter from each other is introduced and ejected;

a base unit including a base on which there are provided together a disc mount onto which the optical disc introduced from the disc slot into the housing is to be set, a disc rotation driving mechanism to drive, by rotation, the optical disc set on the disc mount, an optical pickup to write or read information signals to the optical disc being rotated by the disc rotation driving mechanism while irradiating a light beam condensed by an objective lens to the signal recording surface of the optical disc and a pickup moving mechanism to move the optical pickup radially of the optical disc; and a disc carrying mechanism to selectively carry the optical pickups having different outside diameters between a disc insertion/ejection position where the disc is inserted or ejected from the disc slot and a disc setting position where the optical disc is to be set, the objective lens being retreated in a direction away from the signal recording surface of a small-diameter one of small- and large-diameter optical discs different in outside diameter from each other, which is set on the disc mount, when the optical pickup is moved between the outer and inner radii of the small-diameter optical lens.

In the above disc drive and method of controlling the disc drive, since the objective lens is retreated in the direction away from the signal recording surface of the small-diameter one of the small- and large-diameter optical discs different in outside diameter from each other, which is set on the disc mount, when the pickup moving mechanism moves the optical pickup between the outer and inner radii of the small-diameter optical lens, it is possible to prevent the objective lens from colliding with the optical disc and also from abutting the optical disc carrying mechanism. Thus, it is also possible to protect the mechanisms such as the optical pickup including the objective lens and the optical disc to be loaded.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 58A to 58D show the operations of the base lifting mechanism, in which FIG. 58A is a plan view of the base unit with an optical disc being unchucked, FIG. 58B is a side elevation showing a physical relation between the second spindle of the base and the second cam groove of the cam with the optical disc being unchucked, FIG. 58C is a side elevation showing a physical relation between the first spindle of the base and first cam groove of the driving lever with the optical disc being unchucked, and FIG. 58D is a side elevation showing the position of the base unit with the optical disc being unchucked.

FIGS. 59A to 59D show the operations of the base lifting mechanism, in which FIG. 59A is a plan view of the base unit with an optical disc being chucked, FIG. 59B is a side elevation showing a physical relation between the second spindle of the base and the second cam groove of the cam with the optical disc being chucked, FIG. 59C is a side elevation showing a physical relation between the first spindle of the base and first cam groove of the driving lever with the optical disc being chucked, and FIG. 59D is a side elevation showing the position of the base unit with the optical disc being chucked.

FIGS. 60A to 60D show the operations of the base lifting mechanism, in which FIG. 60A is a plan view of the base unit in the intermediate position, FIG. 60B is a side elevation showing a physical relation between the second spindle of the base and of second cam groove of the cam in the intermediate position, FIG. 60C is a side elevation showing the first spindle of the base and first cam groove of the driving lever in the intermediate position and FIG. 60D is a side elevation showing the position of the base unit in the intermediate position.

FIG. 70A is a sectional view of the base unit with the optical disc being unchucked, explaining the operations of the first disc guide mechanism and shutter operating mechanism, and FIG. 70B is a sectional view of the base unit with the optical disc being positioned for data write or read.

FIG. 71A is a sectional view of the base unit with the optical disc being unchucked, explaining the operations of the second disc guide mechanism and shutter operating mechanism, and FIG. 71B is a sectional view of the base unit with the optical disc being positioned for data write or read.

BEST MODE FOR CARRYING OUT THE INVENTION

The present invention will be described in detail concerning the embodiments of the disc drive with reference to the accompanying drawings.

Figure 1:
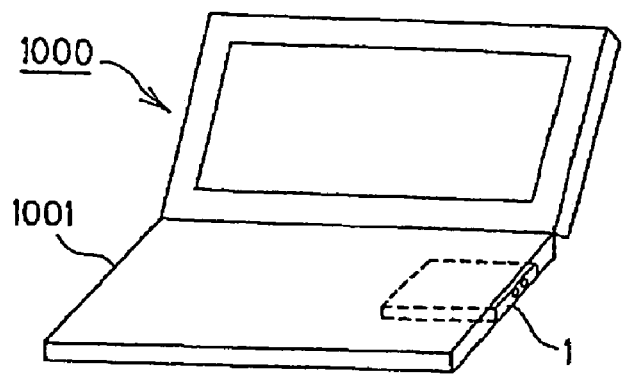
FIG. 1 is a perspective view of a notebook computer having installed therein a disc drive according to the present invention.
Figure 2:
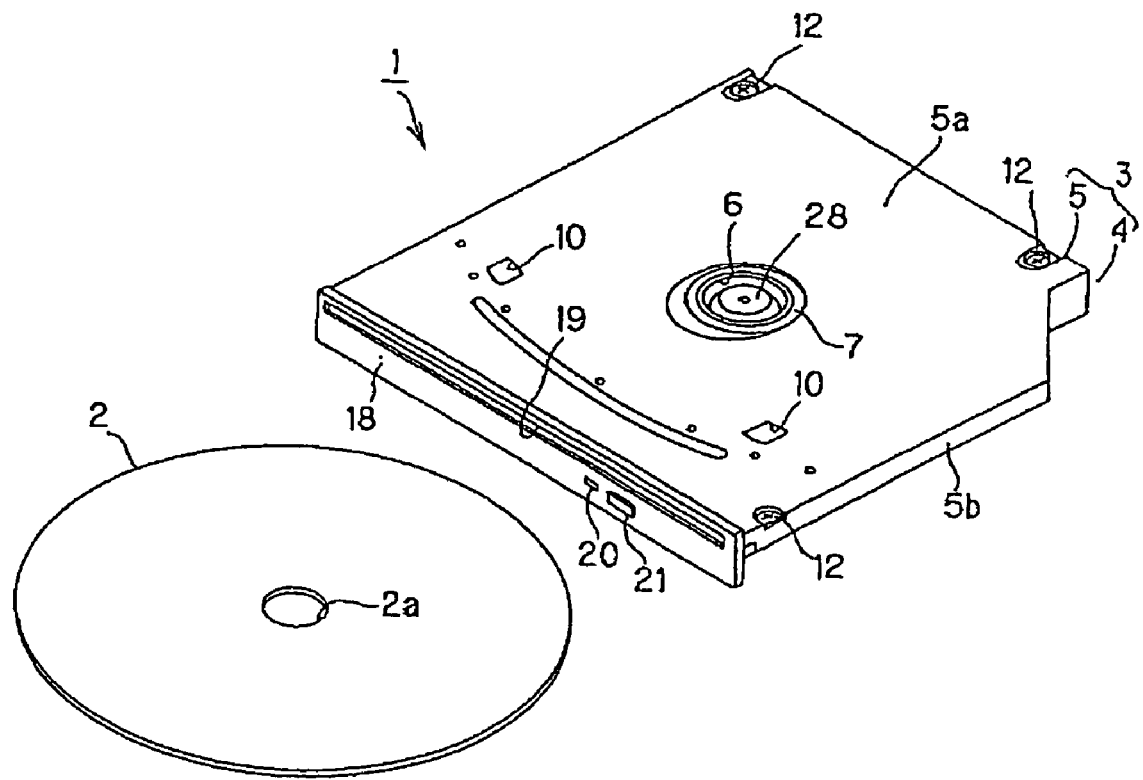
FIG. 2 is a perspective view of the disc drive.

Referring now to FIG. 1, there is illustrated in the form of a perspective view a personal computer designed so compact as to be portable (so-called notebook computer). The notebook computer is generally indicated with a reference numeral 1000. The notebook computer 1000 includes a body 1001 in which there is installed a disc drive 1 having a slot-in type loading mechanism. The disc drive 1 is designed slim for installation in the notebook computer body 1001. As shown in FIG. 2, the disc drive 1 has a thickness D1 of 12.7 mm, and has built therein a write/read mechanism compatible with a recording medium such as an optical disc 2 that is for example a CD (Compact Disc) or DVD (Digital Versatile Disc) and which writes and/read information signals to or from the optical disc 2.

The above disc drive 1 can have loaded therein a standard-size disc of 12 cm in diameter, and a smaller-diameter disc of 8 cm in diameter.

First, the concrete configuration of the disc drive 1 will be illustrated and described:

As shown in FIG. 2, the disc drive 1 includes a housing 3 as the main body thereof. The housing 3 is comprised of a flat housing-shaped bottom case 4 and a top cover 5 to cover the upper opening of the bottom case 4.

Figure 3:
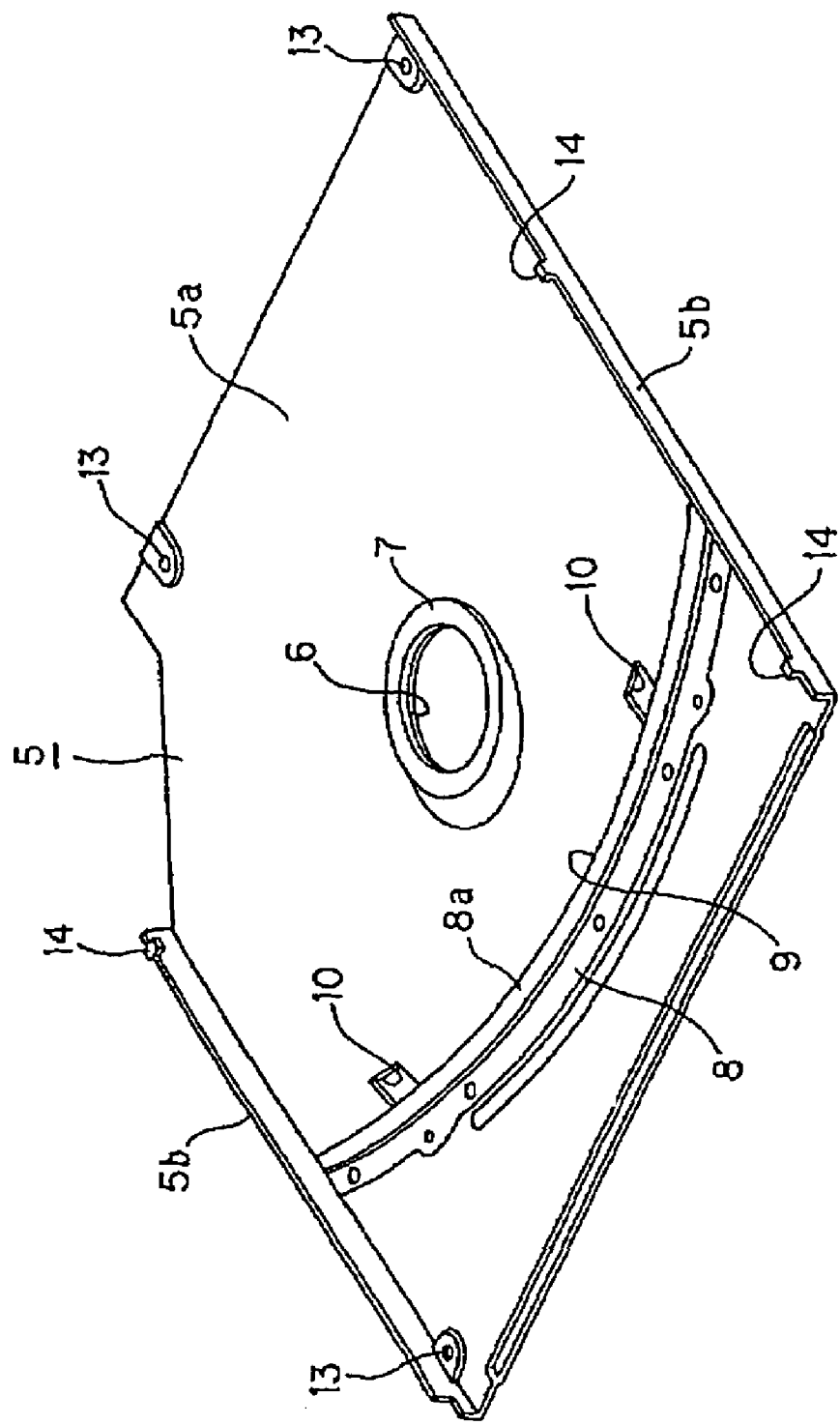
FIG. 3 is a perspective view of the top cover of the disc drive.

As shown in FIGS. 2 and 3, the top cover 5 is formed from a thin sheet metal, and includes a top plate portion 5a to close the top opening of the bottom case 4, and a pair of side plate portions 5b bent at opposite lateral sides of the top plate portion 5a. The top plate portion 5a has a circular opening 6 formed near the center thereof. An engagement projection 28a of a turn-table 23a that is to be engaged in a central hole 2a in an optical disc 2 when the optical disc 2 is to be chucked as will be described later is exposed through this central opening 6. Also, around the central opening 6 in the top plate portion 5a, there is formed an abutment projection 7 projected slightly inwardly of the housing 3 to abut the periphery of the central hole 2a in the optical disc 2 held on the turn-table 23a.

On the main inner side of the top plate portion 5a, there is provided a guide member 8 to guide the top ends of first and second pivoting arms 35 and 36 toward and/or away from each other while limiting them from moving in the direction of their height. The guide member 8 is formed from a generally circular sheet metal extending between the side plate portions 5b at the opposite sides of the top plate 5a, and fixed by spot welding or the like to the top plate portion 5a in a position near the front end of the latter. Also, the guide member 8 has a step 8a of which the rear side is one step higher than the front side. Thus, between the step 8a at the rear side of the guide member 8 and the top plate portion 5a, there is formed a guide recess 9 in which the free ends of the first and second pivoting arms 35 and 36 are engaged. Also, the top plate portion 5a has formed therein access windows 10 through which the free ends of the first and second pivoting arms 35 and 36 are engaged in the guide recess 9.

Figure 4:
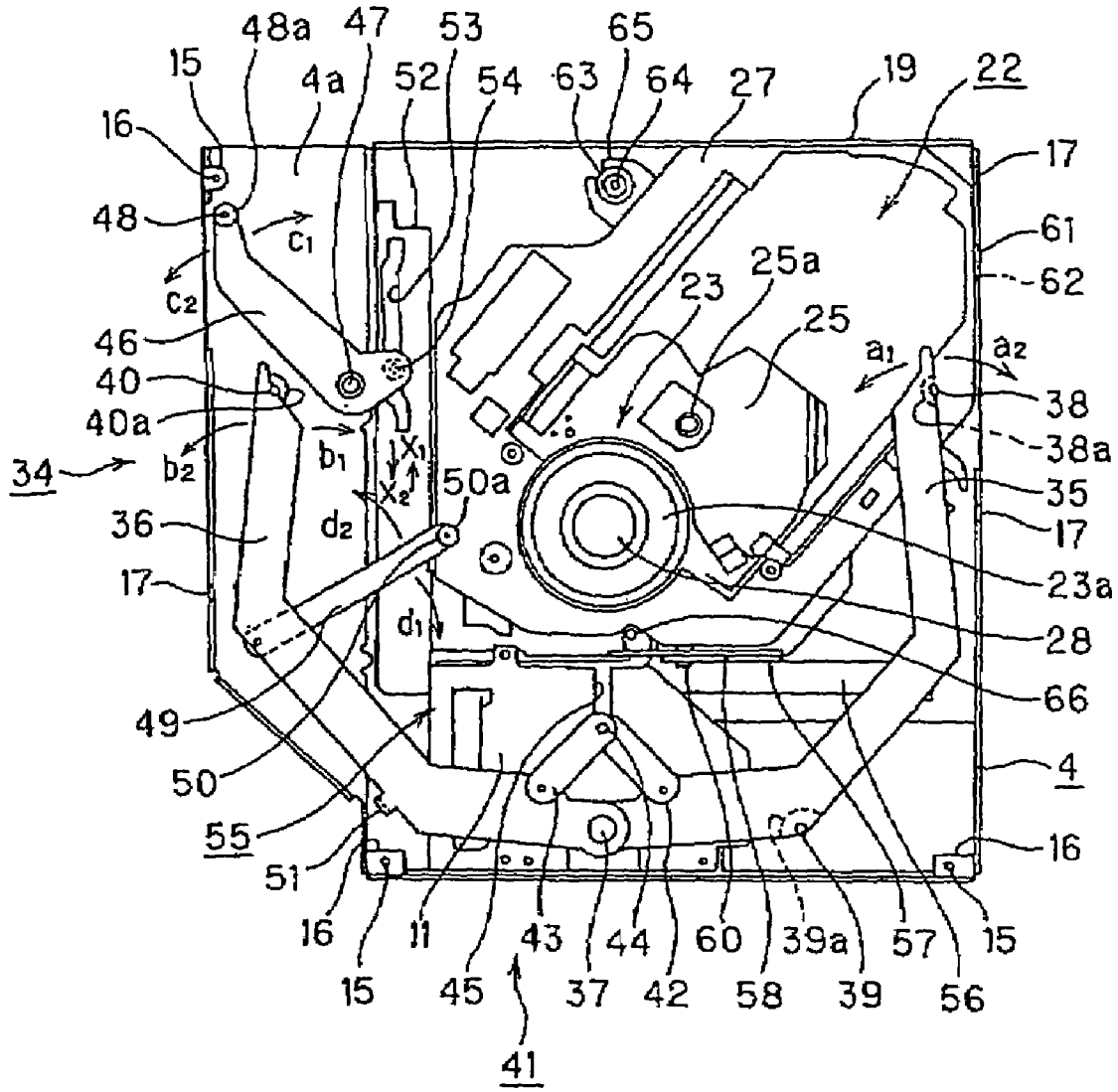
FIG. 4 is a plan view of the disc drive according to the present invention.

As shown in FIG. 4, the bottom case 4 is formed from a sheet metal to have the form of a flat housing. It has a bottom formed generally rectangular, and has formed at one of lateral sides thereof a wing portion 4a raised higher than the bottom and overhanging outwardly.

To the bottom of the bottom case 4, there is fixed with screws or the like a circuit board having mounted thereon electronic parts such as a IC chip of a driving control circuit and the like, connectors for electrical connection of the electronic parts, detection switches to detect movement of various portions, etc. (not shown). Also, a chassis 11 is screwed to the bottom of the bottom case 4. Above the circuit board, the chassis 11 is disposed to partition the inside of the bottom case 4 horizontally at a height generally equal to that of the wing portion 4a.

As shown in FIG. 2, the top cover 5 is fixed with screws to the bottom case 4. More specifically, in the peripheral portion of the top plate portion 5a, there is formed a plurality of screw insertion holes 13 through which screws 12 are inserted, respectively, as shown in FIG. 3. Also, on lateral plate portions 5b at the opposite lateral sides of the top cover 5, there is provided a plurality of guide pieces 14 bent at nearly right angles toward the top plate portion 5a. On the other hand, on the peripheral portion of the bottom case 4, there is provided a plurality of fixing pieces 15 bent inwardly at nearly right angles and each of the fixing pieces 15 has formed therein a screw hole 16 corresponding to the screw insertion hole 13 in the top cover 5 as shown in FIG. 4. Also, the bottom case 4 has formed in either lateral side plate portion thereof a plurality of guide recesses 17 that retain the plurality of guide pieces 14 on the top cover 5.

In fixing the top cover 5 to the bottom case 4, the top cover 5 is slid from the front to rear side with the plurality of guide pieces 14 of the top cover 5 being engaged in the plurality of guide recesses 17, respectively, of the bottom case 4. Thus, the top plate portion 5a of the top cover 5 closes the top opening of the bottom case 4. In this condition, the screws 12 are driven into the screw holes 16 in the bottom case 4 from the plurality of screw insertion holes 13 in the top cover 5. With these assembling operations, the housing 3 included in the device body shown in FIG. 2 is formed.

Note that after the assembling, labels (not shown) to cover the above-mentioned opening 6 and access windows 10 are attached to the top plate portion 5a of the top cover 5. Thus, dust or the like is prevented from coming into the housing 3.

As shown in FIG. 2, a flat front panel 18 having the form of an elongated rectangle is fixed to the front side of the housing 3. The front panel 18 has formed therein a disc slot 19 through which the optical disc 2 is horizontally put into or taken out of the disc drive 1. More particularly, the optical disc 2 is inserted into the housing 3 through the disc slot 19 and ejected to outside the housing 3 through the disc slot 19. The front panel 18 has provided on the front surface thereof a display 20 to indicate, by blinking, access to the optical disc 2 and an eject button 21 the user is to press for ejection of the optical disc 2.

Figure 5:
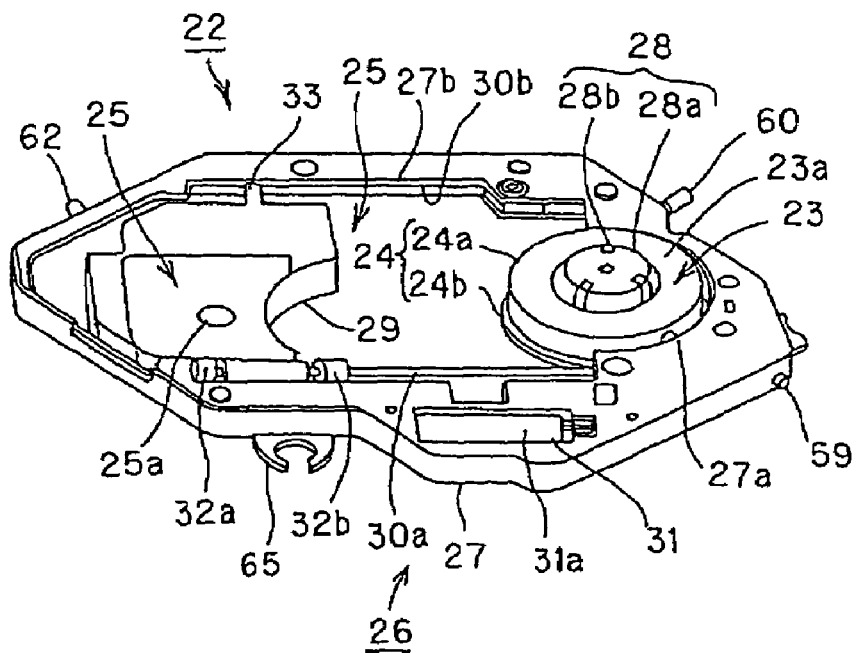
FIG. 5 is a perspective view of a base unit included in the disc drive according to the present invention.

As shown in FIGS. 4 and 5, the disc drive 1 includes a base unit 22 provided on the bottom of the bottom case 4 to form the drive body.

The base unit 22 includes a disc mount 23 on which the optical disc 2 inserted into the housing 3 through the disc slot 19 is set, a disc rotation driving mechanism 24 to rotate the optical disc 2 set on the disc mounted 23, an optical pickup 25 to write or read signals to the optical disc 2 being rotated by the disc rotation driving mechanism 24, and a pickup moving mechanism 26 to move the optical pickup 25 radially of the optical disc 2. These components of the base unit 22 are provided together on a base 27 to form an ultra-slim structure.

The base unit 22 is disposed nearer to the front side of the bottom case 4 than the chassis 11 so that the disc mount 23 is almost centered on the bottom of the bottom case 4. The base unit 22 can be lifted by a base lifting mechanism 55 that will be described in detail later. In the initial state, the base unit 22 is positioned at a level lower than the optical disc 2 inserted into the housing 3 through the disc slot 19.

The base 27 is formed by punching a sheet metal into a predetermined shape and bending it slightly downwardly along the periphery thereof. The base 27 has formed in the main side thereof a generally semicircular opening 27a through which a turn-table 23a of the disc mount 23 is exposed upward and a generally rectangular opening 27b contiguous to the opening 27a and through which an objective lens 25a of the optical pickup 25 is exposed upward. The turn-table 23a and objective lens 25a will be described in detail later. It should be noted that the base 27 has fixed to the upper side thereof an ornamental sheet (not shown) having formed therein openings corresponding to the table- and pickup-access openings 27a and 27b, respectively.

The disc mount 23 includes the turn-table 23a that is rotated by the disc rotation driving mechanism 24. A chucking mechanism 28 is provided at the center of the turn-table 23a to set the optical disc 2 in position. The chucking mechanism 28 includes an engagement projection 28a that is to engaged in the central hole 2a in the optical disc 2 and aligns the center of rotation of the optical disc 2 with that of the turn-table 23a, and a plurality of pressing/supporting pieces 28b that presses the inner wall of the central hole 2a of the optical disc 2, in which the engagement projection 28a is engaged, and supports the optical disc 2 for rotation of the latter with the turn-table 23a.

The disc rotation driving mechanism 24 includes a flat spindle motor 24a to rotate the optical disc 2 together with the turn-table 27a. The spindle motor 24a is screwed to the bottom of the base 27 with a support plate 24b laid between them in such a manner that the turn-table 23a fixed to the free end of the drive shaft projects slightly from the table-access opening 27a in the base 27.

The optical pickup 25 includes an optical block to irradiate a light beam emitted from a semiconductor laser as a light source to the signal recording surface of the optical disc 2 through the objective lens 25a. It detects return light from the signal recording surface of the optical disc 2 by means of a photodetector formed from a photo acceptance unit etc. and writes or reads signals to the optical disc 2.

Also, the optical pickup 25 includes an objective lens moving mechanism to move the objective lens 25a in a focusing direction parallel of the optical axis of the objective lens 25a and in a tracking direction that is a plane direction perpendicular to the optical axis of the objective lens 25a and is also perpendicular to the recording track on the optical disc. Based on a detection signal from the optical disc 2, detected by the above photodetector, the objective lens 25a is moved by the objective lens moving mechanism in the focusing and tracking directions to focus the objective lens 25a on the signal recording surface of the optical disc 2 (focus servo control) and have a light beam spot formed by the objective lens 25a track the recording track on the optical disc 2 (tracking servo control). It should be noted that the objective lens moving mechanism may be designed for adjustment of the tilt angle of the objective lens 25a in relation to the signal recording surface of the optical disc 2 to irradiate the light beam condensed by the objective lens 25a perpendicularly to the signal recording surface of the optical disc 2 as well as for the focusing and tracking servo control.

The pickup moving mechanism 26 includes a pickup base 29 having the optical pickup 25 mounted thereon, a pair of guide shafts 30a and 30b to support the pickup base 29 to be slidable radially of the optical disc 2, and a pickup base moving mechanism 31 to move the pickup base 29 supported on the pair of guide shafts 30a and 30b radially of the optical disc 2.

The pickup base 29 has a pair of guide pieces 32a and 32b formed at one side thereof and a guide piece 33 formed at the other side opposite to the one side. The guide pieces 32a and 32b have formed through them a guide hole through which one (30a) of a pair of guide shafts 30a and 30b is inserted, and the guide piece 33 has formed therein a guide recess in which the other guide shaft 30b is held. Thus, the pickup base 29 is supported slidably on the pair of guide shafts 30a and 30b.

The pair of guide shafts 30a and 30b is disposed on the bottom of the base 27 in parallel with the radius of the optical disc 2 to guide the pickup base 29 the optical pickup 25 faces through the pickup-access opening 27b in the base 27 between the outer and inner radii of the optical disc 2.

The pickup base moving mechanism 31 converts rotation of a drive motor 31a fixed to the base 27 into a linear force by means of a gear and rack (not shown) to move the pickup base 29 in a direction along the pair of guide shafts 30a and 30b, that is, radially of the optical disc 2.

As shown in FIG. 4, the disc drive 1 further includes a disc carrying mechanism 34 to carry the optical disc 2 between a position where the optical disc 2 is inserted or ejected through the disc slot 19 and a position where the optical disc 2 is set on the turn-table 23a of the disc mount 23.

The disc carrying mechanism 34 includes first and second pivoting arms 35 and 36 that are pivotable in a plane parallel to the main side of the optical disc 2 as a supporting member moved between the main side of the top plane portion 5a opposite to the disc mount 23 and that of the optical disc 2 inserted from the disc slot 19.

The first and second pivoting arms 35 and 36 are disposed to the right and left of the disc mount 23. The base ends of them positioned nearer to the rear side of the base unit 22 than the disc mount 23 are supported pivotably, and the free ends of them positioned nearer to the front side of the base unit 22 than the disc mount 23 are movable toward and/or away from each other in a plane parallel to the main side of the optical disc 2 inserted through the disc slot 19.

More specifically, the first pivoting arm 35 is formed from an elongated sheet metal, and located to one of the right and left of the turn-table 23a of the disc mount 23 (to the right as in FIG. 4, for example). It is supported at the base end thereof on a first spindle 37 provided on the chassis 11 to be pivotable in the directions of arrows a1 and a2. Also, the first pivoting arm 35 has provided at the free end thereof a first front-side abutment member 38 that abuts the periphery of the optical disc 2 inserted through the disc slot 19. The first front-side abutment member 38 is projected downward. Also, the first pivoting arm 35 has provided near the base end thereof a first rear-side abutment member 39 that abuts, together with the first front-side abutment member 38, the periphery of the optical disc 2 when positioning the optical disc 2 in place. The first rear-side abutment member 39 is also projected downward.

The first front-side abutment member 38 and first rear-side abutment member 39 are formed from a synthetic resin. The central portion of each of the members 38 and 39 that is to abut the periphery of the optical disc 2 inserted from the disc slot 19 is bent inwardly and widened at the ends thereof to form a flange 38a (39a) having a generally hourglass shape and which limits the optical disc 2 from moving in the direction of the thickness of the latter. It should be noted that in case each of the first front-side abutment member 38 and first rear-side abutment member 39 is of a structure that is put in contact with the main side of the optical disc 2, these members should desirably be formed from a softer resin than the optical disc 2. Also, the first front-side abutment member 38 and first rear-side abutment member 39 may be small-diameter rollers installed rotatably to the main side of the first pivoting arm 35 opposite to the disc mount 23.

On the other hand, the second pivoting arm 36 is also formed from an elongated sheet metal, and located to one of the right and left of the turn-table 23a of the disc mount 23 (to the left as in FIG. 4, for example). It is supported at the base end thereof on a first spindle 37 provided on the chassis 11 to be pivotable in the directions of arrows b1 and b2. Also, the second pivoting arm 36 has provided at the free end thereof a second front-side abutment member 40 that abuts the periphery of the optical disc 2 inserted through the disc slot 19. The second front-side abutment member 40 is projected downward.

The central portion of the second front-side abutment member 40 that is to abut the periphery of the optical disc 2 inserted from the disc slot 19 is bent inwardly and widened at the ends thereof to form a flange 40a having a generally hourglass shape and which limits the optical disc 2 from moving in the direction of the thickness of the latter. It should be noted that in case the second front-side abutment member 40 is of a structure that is put in contact with the main side of the optical disc 2, this member 40 should desirably be formed from a softer resin than the optical disc 2. Also, the second front-side abutment member 40 may be small-diameter rollers installed rotatably to the main side of the second pivoting arm 36 opposite to the disc mount 23.

As above, the first and second pivoting arms 35 and 36 are disposed generally symmetrically with respect to the turn-table 23a of the disc mount 23. Also, in this embodiment, since the centers of pivoting of the pivoting arms 35 and 36 are coincident with each other nearly at the center of the rear side rather than on the disc mount 23, the pivoting arms 35 and 36 can be simplified in structure. Also, the first and second pivoting arms 35 and 36 are supported slidably in the pivoting direction with the free ends thereof being engaged in the aforementioned guide recess 9 in the top plate portion 5a.

The disc carrying mechanism 34 includes an interlocking mechanism 41 that interlocks the first and second pivoting arms 35 and 36 with each other. Thus, the first and second pivoting arms 35 and 36 are pivotable in opposite directions (toward and/or away from each other), respectively, by means of the interlocking mechanism 41. More particularly, the interlocking mechanism 41 includes first and second link pieces 42 and 43 to link the first and second pivoting arms 35 and 36 with each other. The first and second linking arms 42 and 43 are formed from an elongated sheet metal. They are supported at one of the longitudinal ends thereof pivotably on the base ends of the first and second pivoting arms 35 and 36, respectively, and at the other longitudinal end pivotably on a second spindle 44. That is, the first and second pivoting arms 35 and 36 and the first and second link pieces 42 and 43 form together a pantographic mechanism. Also, the second spindle 44 is engaged in a guide recess 45 formed in a position nearer to the front side than the first spindle 37 of the chassis 11. The guide recess 45 is formed linear extending in the direction in which the optical disc 2 is inserted.

Therefore, as the second spindle 44 slides in the guide recess 45, the free ends of the first and second pivoting arms 35 and 36 are movable in opposite directions, respectively, by means of the first and second link pieces 42 and 43. Namely, the free ends of the first and second pivoting arms 35 and 36 can be pivoted by the interlocking mechanism 41 in directions toward and/or away from each other.

Also, at the base ends of the first and second pivoting arms 35 and 36, there is provided a torsional coil spring (not shown) to pull these pivoting arms 35 and 36 toward each other.

The disc carrying mechanism 34 includes, as an auxiliary loading means of helping the carrying of the optical disc 2 into the housing 3 from the disc slot 19, a third pivoting arm 46 pivotable in a plane parallel to the main side of the optical disc 2 inserted from the disc slot 19.

The third pivoting arm 46 is formed from an elongated sheet metal. It is provided to one of the right and left of the turn-table 23a of the disc mount 23 (to the left as in FIG. 4, for example) and in a position nearer to the front side than the second pivoting arm 36. It is supported at the base end thereof on a spindle 47 provided on the wing portion 4a to be pivotable in the directions of arrows c1 and c2. Also, the third pivoting arm 46 has provided at the free end thereof a third abutment member 48 projected upward and which abuts the periphery of the optical disc 2 inserted through the disc slot 19.

The third abutment member 48 is a small-diameter roller formed from a synthetic resin. It is installed rotatably on the main side of the third pivoting arm 46 opposite to the top plate portion 5a. The central portion of the third abutment member 48 that is to abut the periphery of the optical disc 2 inserted from the disc slot 19 is bent inwardly and widened at the ends thereof to form a flange 40a having a generally hourglass shape and which limits the optical disc 2 from moving in the direction of the thickness of the latter.

The disc carrying mechanism 34 includes, as an auxiliary ejecting mechanism to help the ejection of the optical disc 2 to outside the housing 3 from the disc slot 19, a fourth pivoting arm 49 pivotable in a plane parallel to the main side of the optical disc 2 inserted from the disc slot 19.

The fourth pivoting arm 49 is formed from an elongated sheet metal. It is supported at the middle of the second pivoting arm 36 to one of the right and left of the turn-table 23a of the disc mount 23 (to the left as in FIG. 4, for example) to be pivotable in the directions of arrows d1 and d2. Also, at the free end of the fourth pivoting arm 49, there is provided a fourth abutment member 50 projected upward and which abuts the rear peripheral side of the optical disc 2 inserted from the disc slot 19 2.

The fourth abutment member 50 is formed from a synthetic resin. The central portion of the fourth abutment member 50 that is to abut the periphery of the optical disc 2 inserted from the disc slot 19 is bent inwardly and widened at the ends thereof to form a flange 50a having a generally hourglass shape and which limits the optical disc 2 from moving in the direction of the thickness of the latter. The fourth abutment member 50 may be a small-diameter roller installed rotatably on the main side of the fourth pivoting arm 49 opposite to the top plate portion 5a.

Also, the second pivoting arm 36 has provided thereon a limiting piece 51 that limits the fourth pivoting arm 49 pivoted toward the rear side, that is, in the direction of arrow d1, from pivoting further toward the rear side.

The disc carrying mechanism 34 includes a driving lever 52 that puts the pivoting arms 35, 36, 46 and 49 having been described above into cooperation with each other. The driving lever 52 is formed from a resin to have the entire shape of a generally rectangular parallelepiped, and it is disposed on the bottom of the bottom case 4 and between one of the lateral sides of the bottom case 4 and the base unit 22. The driving lever 52 is located in a lower position than the optical disc 2 inserted into the housing 3 from the disc slot 19 and its upper surface is nearly as high as the bottom of the wing portion 4a. The driving lever 52 is slid by a driving mechanism (not shown) comprised of a drive motor and gear group provided on the bottom of the bottom case 4 in a selected one of the directions of arrows X1 and X2 in FIG. 4.

In conjunction with sliding of the driving lever 52, the disc carrying mechanism 34 will have the aforementioned second spindle 44 slid in the guide recess 45. Thus, the first and second pivoting arms 35 and 36 will be pivoted by the interlocking mechanism 41 in opposite directions, respectively. The third pivoting arm 46 has provided at the base end thereof a guide pin 54 that is to be engaged in the guide recess 53 formed on the upper surface of the driving lever 52. Thus, in conjunction with sliding of the driving lever 52, the third pivoting arm 46 will have the guide pin 54 thereof pivoted in the guide recess 53. Also, the fourth pivoting arm 49 will be pivoted by a linking mechanism (not shown) in conjunction with sliding of the driving lever 52.

In the disc carrying mechanism 34, the above first, second, third and fourth pivoting arms 35, 36, 46 and 49 work together to carry the optical disc 2 into the housing 3 from the disc slot 19 (loading), position the optical disc 2 in place (centering) and bring the optical disc 2 to outside the housing 3 from the disc slot 19 (ejection).

As shown in FIG. 4, the disc drive 1 includes the base lifting mechanism 55 that lifts the base 27 in conjunction with the aforementioned sliding of the driving lever 52. The base lifting mechanism 55 lifts the base 27 to a position where the base 27 is elevated to chuck the optical disc 2 positioned in place to the turn table 23a of the disc mount 23 (chucking position), a position where the base 27 is lowered to unchuck the optical disc 2 from the turn-table 23a of the disc mount 23 (unchucking position), or an intermediate position where the base 27 is positioned between the chucking and unchucking positions to write or read signals to or from the optical disc 2.

More specifically, on the lateral side of the aforementioned driving lever 52 opposite to the base 27, there are formed longitudinally cam grooves (not shown) corresponding to the above chucking position where the optical disc 2 is chucked to the turn-table 23a, unchucking position where the optical disc 2 is unchucked from the turn-table 23a and intermediate position where the optical disc 2 is set on the turn-table 23a for signal write or read thereto or therefrom, respectively.

Also, a cam lever 56 is disposed on the bottom of the bottom case 4 along the rear lateral side of the base 27. The cam lever 56 is formed from an elongated flat member. In conjunction with sliding of the driving lever 52 in a selected one of the directions of arrows X1 and X2 in FIG. 4, the cam lever 56 is slid in a direction generally perpendicular to the sliding direction of the driving lever 52. At the middle of the cam lever 56, there is provided a cam piece bent upward from the edge of the cam lever 56 opposite to the base 27. The cam piece 57 has formed longitudinally therein cam grooves (not shown) corresponding to the chucking position where the optical disc 2 is chucked to the turn-table 23a, unchucking position where the optical disc 2 is unchucked from the turn-table 23a, and intermediate position where the optical disc 2 is set on the turn-table 23a for write or read of signals thereto or therefrom.

Also, on the bottom of the bottom case 4, a bent piece 58 is formed along the rear lateral side of the base 27. The bent piece 58 has formed vertically a normal recess (not shown) to lift the base 27.

As shown in FIG. 5, the base 27 includes a first spindle 59 provided at a side of the disc mount 23 opposite to the driving lever 52 and supported being engaged in the cam groove formed on the lateral side of the driving lever 52, a second spindle 60 provided at a side of the disc mount 23 opposite to the cam lever 56 and supported being engaged in the cam groove in the cam piece 57 and normal recess in the bent piece 58, a third spindle 62 provided at a front lateral side opposite to the side opposite to the driving lever 52 and supported pivotably in a spindle hole 61 formed in the other lateral side of the bottom case 4, and a support portion 65 provided at a front lateral side opposite to the side opposite to the cam lever 56 and supported with a screw 64 on the bottom of the bottom case 4 on contact with an insulator 63 formed from an elastic material such as rubber.

In the base lifting mechanism 55, as the driving lever 52 and cam lever 56 slide, the first spindle 59 slides in the cam groove in the driving lever 52 and the second spindle 60 slides in the cam groove in the cam lever 56 and normal recess in the bent piece 58 to lift, in relation to the front side of the housing 3, the disc mount 23 of the base 27 to the chucking position where the optical disc 2 is chucked to the turn-table 23a, unchucking position where the optical disc 2 is unchucked from the turn-table 23a or intermediate position where the optical disc 2 is set on the turn-table 23a for write or read of signals to or from the optical disc 2.

Also, on the bottom of the bottom case 4, there is provided a push-up pin 66 included in the unchucking mechanism to unchuck the optical disc 2 from the turn-table 23a of the disc mount 23 when the base lifting mechanism 55 lowers the base 27 as shown in FIG. 4. The push-up pin 66 is provided near the disc mount 23 of the base unit 22, more specifically, at the rear side of the base 27 being nearest to the disc mount 23 to project upward from the bottom of the bottom case 4.

Figure 6:
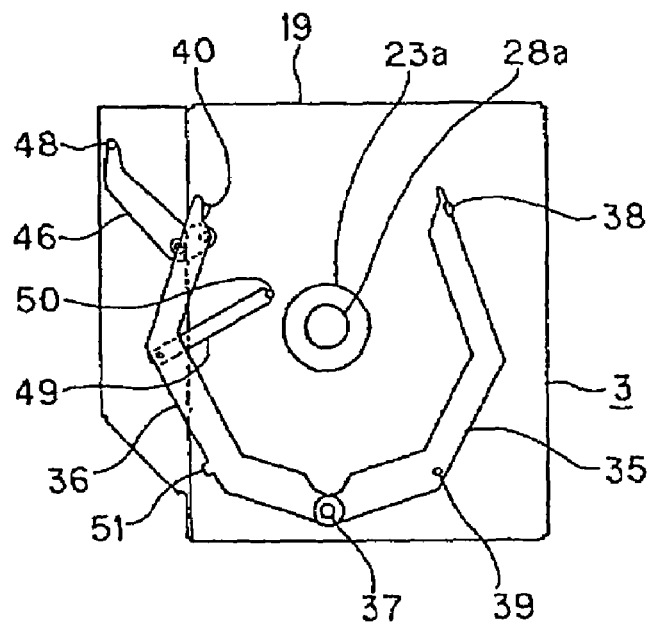
FIG. 6 is a plan view of the disc drive being in its initial state.

The disc drive 1 constructed as above operates as will be described in detail below:

As shown in FIG. 6, in the initial state of the disc drive 1 with no optical disc 2 being yet inserted, the first and second pivoting arms 35 and 36 are held with their respective free ends being opened to define a predetermined large angle between them. At this time, the third pivoting arm 46 is held with the free end thereof being located in a position outer than the base end and nearer to the front side than the base end. The fourth pivoting arm 49 is held with the free end thereof in a position inner than the base end and nearer to the front side than the base end. The driving lever 52 is positioned near the front side of the bottom case 4.

In the disc drive 1, even if any one of the optical discs 2A and 2B different in outside diameter from each other is inserted through the disc slot 19 of the housing 3, it can be brought into place (disc loading).

Figure 7:
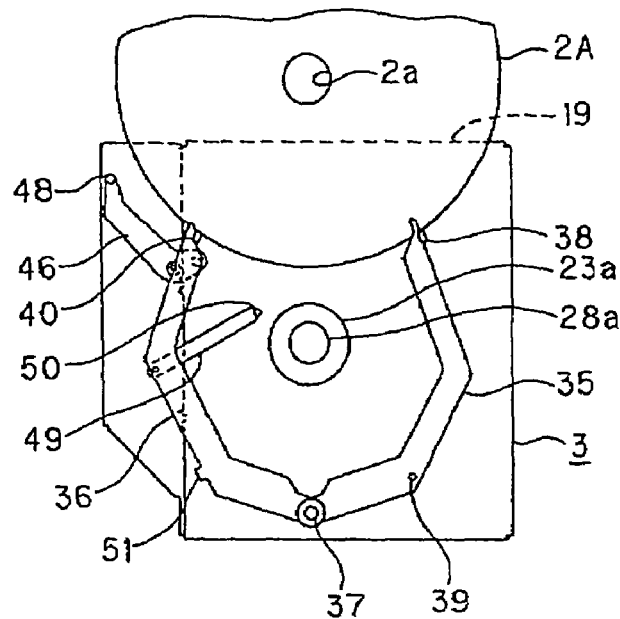
FIG. 7 is a plan view of the disc drive into which a large-diameter optical disc starts being inserted.

More particularly, in case a large-diameter optical disc 2A is inserted from the disc slot 19 into the housing 3, it will first abut at the rear peripheral side thereof the first and second front-side abutment members 38 and 40 of the first and second pivoting arms 35 and 36, respectively, as shown in FIG. 7.

Figure 8:
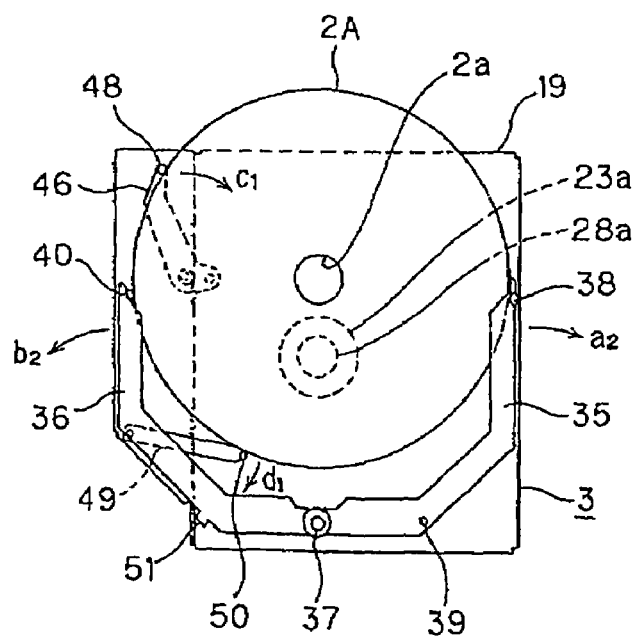
FIG. 8 is a plan view of the disc drive into which the large-diameter optical disc starts being carried.

Then, when the large-diameter optical disc 2A is further pushed from the above position into the housing 3 from the disc slot 19, it will be caught at the periphery thereof between the first and second front-side abutment members 38 and 40 of the first and second pivoting arms 35 and 36 as shown in FIG. 8. At this time, with the first and second front-side abutment members 38 and 40 being in abutment with the rear peripheral side of the optical disc 2A, the first and second pivoting arms 35 and 36 are pivoted against the force of the torsional coil spring, that is, in the directions of arrows a2 and b2, respectively, in FIG. 8.

Then, when the first and second pivoting arms 35 and 36 are pivoted over a predetermined distance away from each other, the detection switch provided on the circuit board to detect the initial position is pressed, to thereby have the driving lever 52 of the driving mechanism start sliding toward the rear side inside the device. Thus, the third pivoting arm 46 is pivoted in the direction of arrow c1 in FIG. 8. Also, since the third abutment member 48 is made to abut the front peripheral side of the large-diameter optical disc 2A, so the third pivoting arm 46 will push the front peripheral side of the optical disc 2A and bring the latter deeper into the housing 3.

Figures 9, 10:
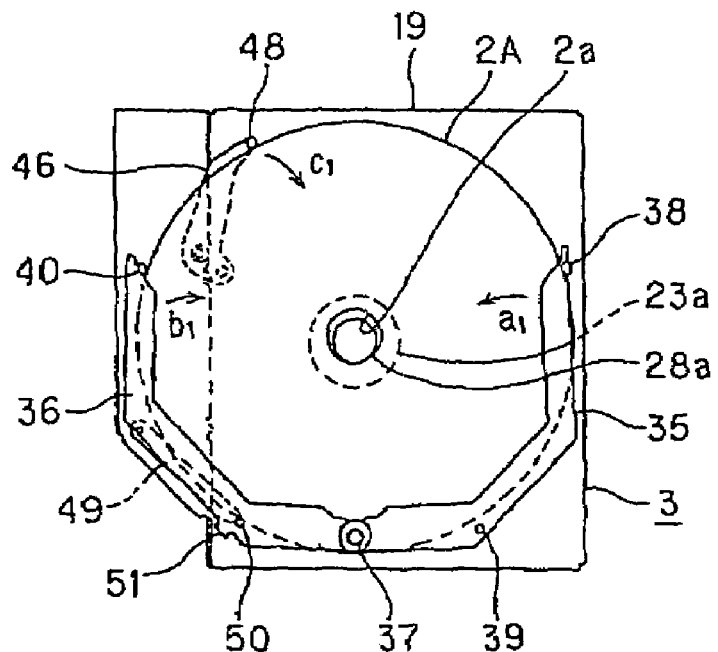
FIG. 9 is a plan view of the disc drive in which the large-diameter optical disc thus carried in is in transition to centering.
FIG. 10 is a plan view of the disc drive in which the large-diameter optical disc is centered on the turn-table.

Then, when the large-diameter optical disc 2A is carried into the housing 3 until its central hole 2a comes to a position nearer to the rear side than a line connecting the first and second front-side abutment members 38 and 40 to each other, the first and second front-side abutment members 38 and 40 are turned along the periphery of the optical disc 2A from the rear side to the front side, as shown in FIG. 9. Then, the first and second pivoting arms 35 and 36 are forced by the torsional coil spring to pivot toward each other, namely, in the directions of arrows a1 and b1, respectively, in FIG. 9, with the first and second front-side abutment members 38 and 40 being in abutment with the front peripheral side of the optical disc 2A. Thus, the first and second pivoting arms 35 and 36 will press the front peripheral side of the optical disc 2A to bring the optical disc 2A into position as shown in FIG. 10.

Also, being pressed with the fourth abutment member 50 being in abutment with the rear peripheral side of the large-diameter optical disc 2A, the fourth pivoting arm 49 is pivoted in the direction of arrow d1 in FIG. 8. Then, when the optical disc 2A is brought into place as shown in FIG. 10, the fourth pivoting arm 49 is put into abutment with the limiting piece 51 of the second pivoting arm 36 and thus limited from being further pivoted.

Figure 16:
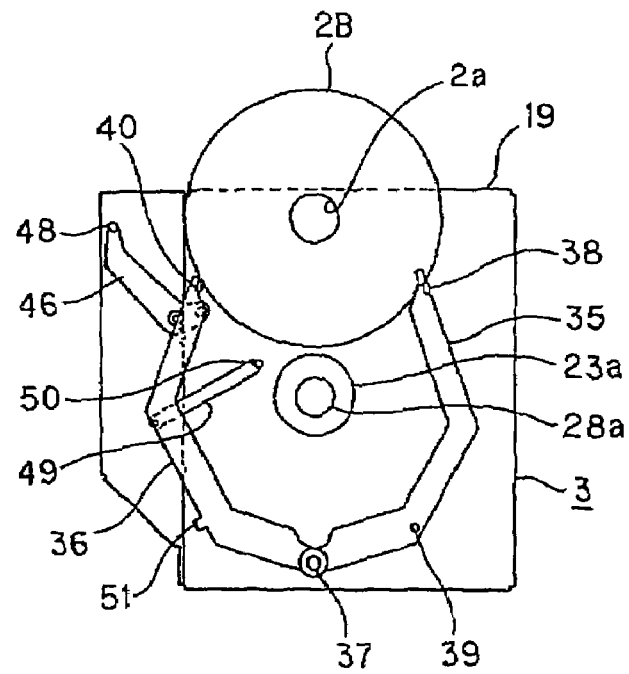
FIG. 16 is a plan view of the disc drive into which a small-diameter optical disc starts being inserted.

On the other hand, in case a small-diameter optical disc 2B is inserted into the housing 3 from the disc slot 19, it will first abut at the rear peripheral side thereof the first and second front-side abutment members 38 and 40 of the first and second pivoting arms 35 and 36, respectively, as shown in FIG. 16.

Figure 17:
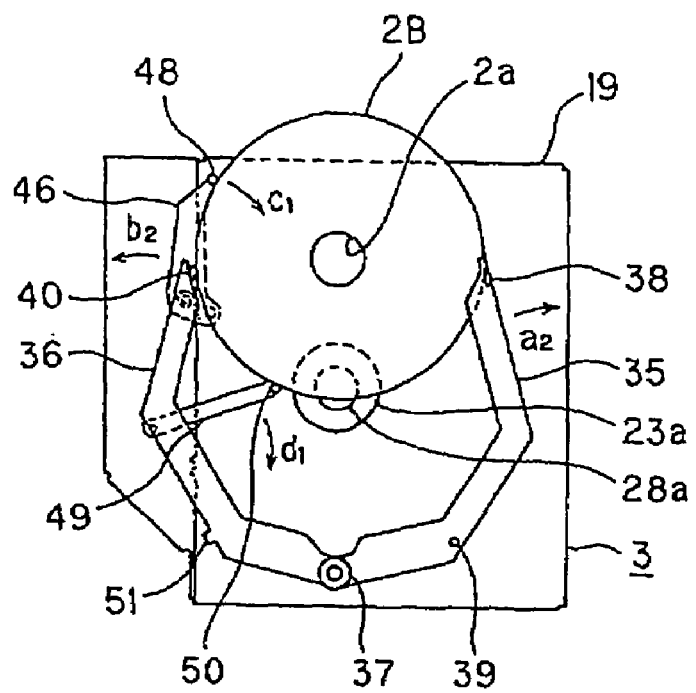
FIG. 17 is a plan view of the disc drive into which the small-diameter optical disc starts being carried.

Then, when the small-diameter optical disc 2B is further pushed from the above position into the housing 3 from the disc slot 19, it will be caught at the periphery thereof between the first and second front-side abutment members 38 and 40 of the first and second pivoting arms 35 and 36 as shown in FIG. 17. At this time, with the first and second front-side abutment members 38 and 40 being in abutment with the rear peripheral side of the optical disc 2B, the first and second pivoting arms 35 and 36 are pivoted against the force of the torsional coil spring, that is, in the directions of arrows a2 and b2, respectively, in FIG. 17.

Then, when the first and second pivoting arms 35 and 36 are pivoted over a predetermined distance away from each other, the detection switch provided on the circuit board to detect the initial position is pressed, to thereby have the driving lever 52 of the driving mechanism start sliding toward the rear side inside the device.

Thus, the third pivoting arm 46 is pivoted in the direction of arrow c1 in FIG. 17. Also, since the third abutment member 48 is made to abut the front peripheral side of the small-diameter optical disc 2B, so the third pivoting arm 46 will push the front peripheral side of the optical disc 2B and bring the latter deeper into the housing 3 from the disc slot 19.

Figure 18:
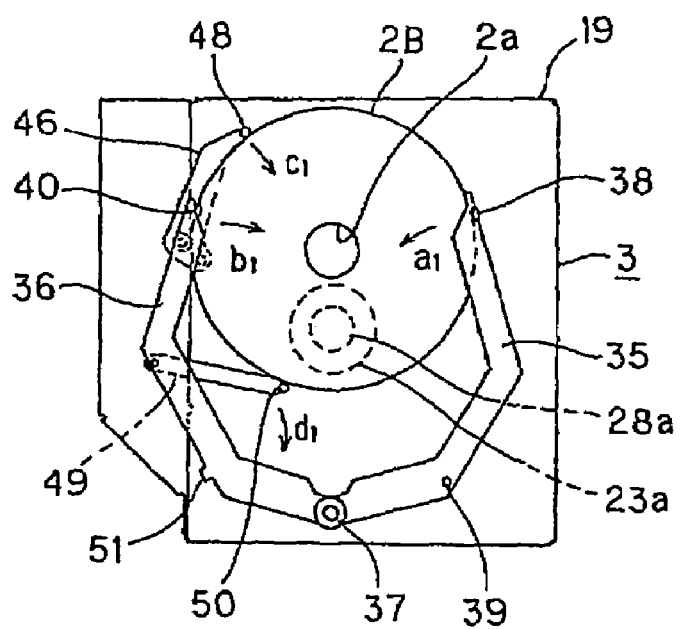
FIG. 18 is a plan view of the disc drive in which the small-diameter optical disc thus carried in is in transition to centering.

Then, when the small-diameter optical disc 2B is carried into the housing 3 until its central hole 2a comes to a position nearer to the rear side than a line connecting the first and second front-side abutment members 38 and 40 to each other, the first and second front-side abutment members 38 and 40 are turned along the periphery of the optical disc 2B from the rear side to the front side as shown in FIG. 18. Then, the first and second pivoting arms 35 and 36 are forced by the torsional coil spring to pivot toward each other, namely, in the directions of arrows a1 and b1, respectively, in FIG. 18 with the first and second front-side abutment members 38 and 40 being in abutment with the front peripheral side of the optical disc 2B.

Figure 19:
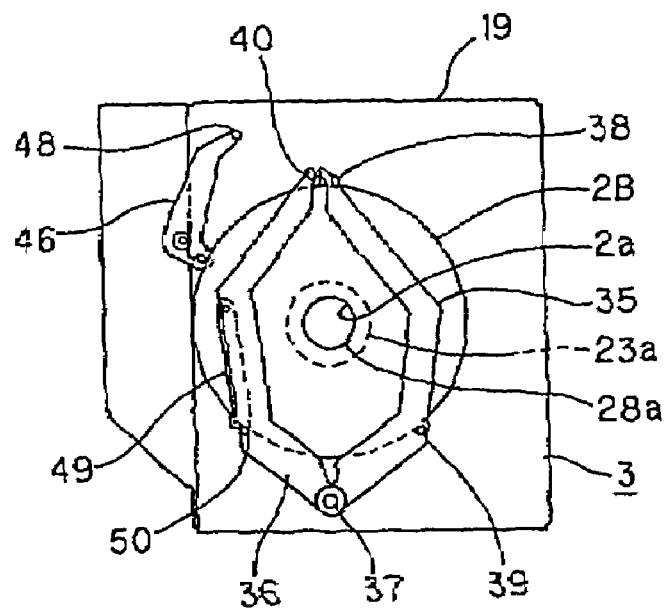
FIG. 19 is a plan view of the disc drive in which the small-diameter optical disc is centered on the turn-table.

Thus, the first and second pivoting arms 35 and 36 will press the front peripheral side of the optical disc 2B to bring the small-diameter optical disc 2B into position as shown in FIG. 19.

Also, being pressed with the fourth abutment member 50 being in abutment with the rear peripheral side of the small-diameter optical disc 2B, the fourth pivoting arm 49 is pivoted in the direction of arrow d1 in FIG. 18. Then, when the optical disc 2B is brought into place as shown in FIG. 19, the fourth pivoting arm 49 is put into abutment with the limiting piece 51 of the second pivoting arm 36 and thus limited from being further pivoted.

In the disc drive 1, when the optical disc 2A (2B different in outside diameter from 2A) has been brought into position, the first and second pivoting arms 35 and 36 catch the optical disc 2A (2B) inside the first front-side abutment member 38, first rear-side abutment member 39, second front-side abutment member 40 and fourth abutment member 50, and then positions it in place (disc centering) as shown in FIGS. 10 and 19. That is, the center hole 2a of the optical disc 2A (2B different in outside diameter from 2A) and engagement projection 28a of the turn-table 23a are aligned with each other in a direction perpendicular to the main side of the optical disc 2 (2A or 2B).

Next, in the disc drive 1, after the optical disc 2 is centered, the base 27 is elevated by the base lifting mechanism 55 and the optical disc 2 positioned in place is set on the turn-table 23a of the disc mount 23 (disc chucking).

Figure 26:
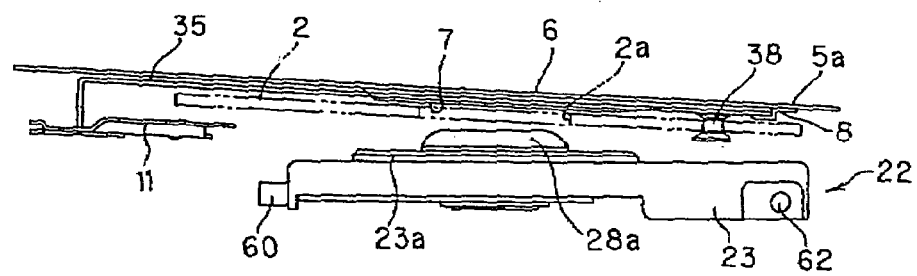
FIG. 26 is a side elevation of the base unit with the optical disc being unchucked.
Figure 27:
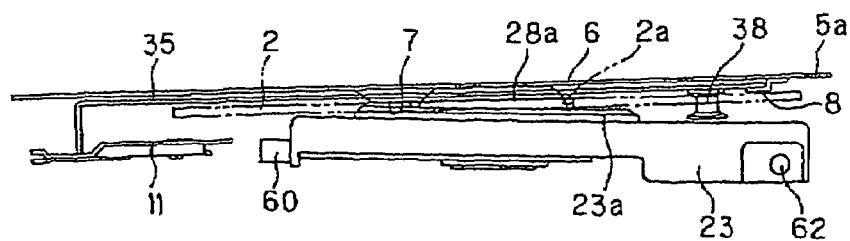
FIG. 27 is a side elevation of the base unit with the optical disc being chucked.

More specifically, when the base 27 is elevated by the base lifting mechanism 55 from the unchucking position shown in FIG. 26 to the chucking position shown in FIG. 27, the engagement projection 28a enters the central hole 2a of the optical disc 2 and the periphery of the central hole 2a of the optical disc 2 is pressed to the abutment projection 7 of the top plate portion 5a, so that the engagement projection 28a is engaged into the central hole 2a of the optical disc 2 and the plurality of pressing/supporting pieces 28b rest on the periphery of the central hole 2a of the optical disc 2. In this state, the optical disc 2 is held on the turn-table 23a. Then, the base 27 is lowered by the base lifting mechanism 55 to the intermediate position shown in FIG. 28 with the optical disc 2 being held on the turn-table 23a.

Figure 11:
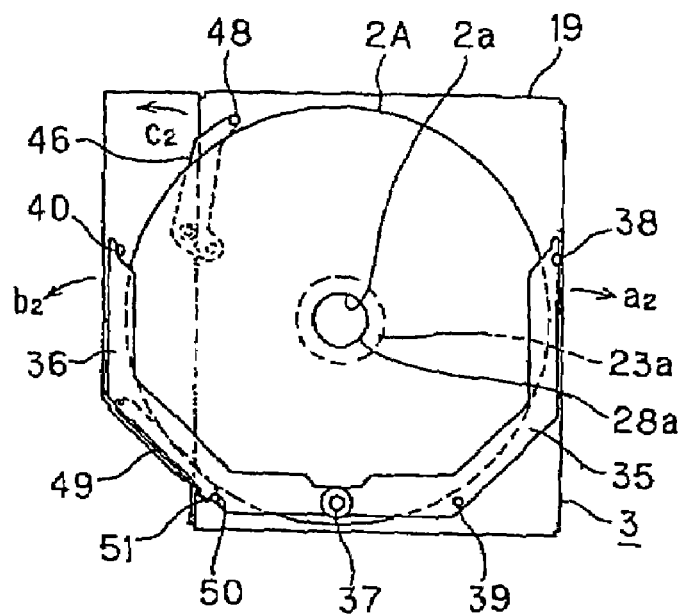
FIG. 11 is a plan view of the disc drive in which the large-diameter optical disc is chucked on the turn-table.
Figure 20:
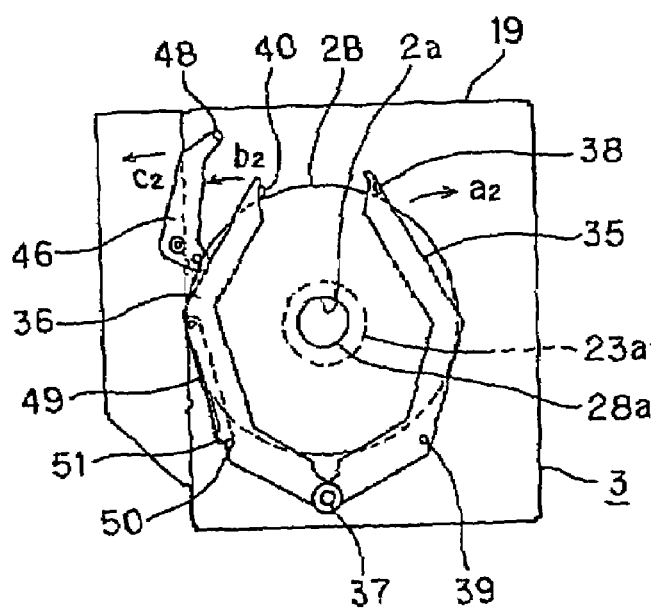
FIG. 20 is a plan view of the disc drive in which the small-diameter optical disc is chucked on the turn-table.

Also, in the disc drive 1, after completion of the aforementioned chucking operation, the first and second pivoting arms 35 and 36 are slightly pivoted in a direction away from each other, that is, in the directions of arrows a2 and b2, respectively, in FIGS. 11 and 20 in conjunction with sliding of the driving lever 52 toward the inner rear side of the housing 2. At this time, the fourth pivoting arm 49 will be pivoted along with the second pivoting arm 36 while being in abutment with the limiting piece 51. Also, the third pivoting arm 46 is slightly pivoted in the direction of arrow c2 in FIGS. 11 and 20 in conjunction with sliding of the driving lever 52 toward the inner rear side of the housing 3. Thus, the first front-side abutment member 38, first rear-side abutment member 39, second front-side abutment member 40, third abutment member 48 and fourth abutment member 50 are separated from the periphery of the optical disc 2A (2B) held on the turn table 23a.

Figure 28:
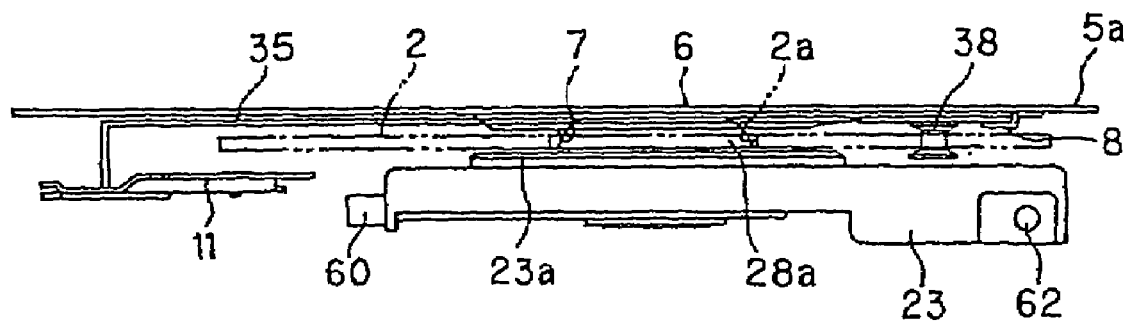
FIG. 28 is a side elevation of the based unit being in an intermediate position.

When the disc drive 1 in the state shown in FIGS. 11, 20 and 28 is supplied with a write or read command from the personal computer 1000, it will write or read information signals to or from the optical disc 2 according to the command. More specifically, the spindle motor 24a rotates the optical disc 2 along with the turn-table 23a and the optical pickup 25 is moved by the pickup moving mechanism 26 from the outer radius to inner radius. When the focus servo control and tracking servo control are applied, the optical pickup 25 will read TOC data recorded in the lead-in area of the optical disc 2. Thereafter, for writing information signals, the optical pickup 25 is moved to a predetermined address in a program area of the optical disc 2 according to the TOC data thus read. Also, for reading information signals, the optical pickup 25 is moved to an address in the program area where designated data is recorded. Thus, the optical pickup 25 writes or reads information signals to or from a desired recording track on the optical disc 2.

When the eject button 21 is pressed at the front panel 20 of the disc drive 1 or the disc drive 1 is supplied with an eject command from the personal computer 1000 in which the disc drive 1 is installed, the driving mechanism first starts sliding the driving lever 52 toward the front side according to the eject command.

Figure 12:
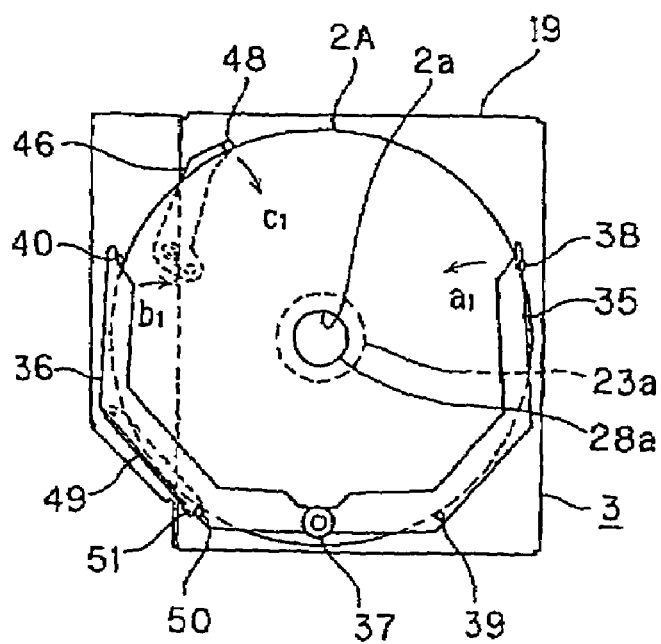
FIG. 12 is a plan view of the disc drive in which the large-diameter optical disc is unchucked.
Figure 21:
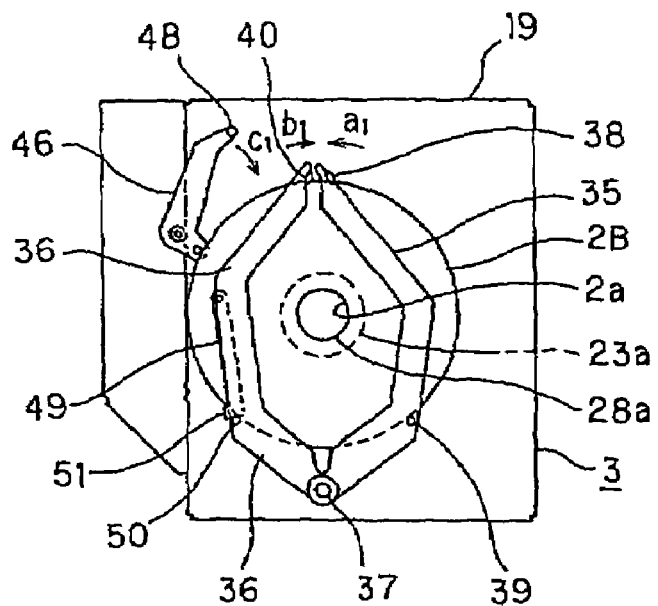
FIG. 21 is a plan view of the disc drive in which the small-diameter optical disc is unchucked.

Then, the first and second pivoting arms 35 and 36 are slightly moved toward each other, that is, in the directions of arrows a1 and b1, respectively, in FIG. 12 and 21 in conjunction with sliding of the driving lever 52 toward the front side. At this time, the fourth pivoting arm 49 is pivoted along with the second pivoting arm 36 while being in abutment with the limiting piece 51. Also, the third pivoting arm 46 is pivoted in the direction of arrow c1 in FIGS. 12 and 21 in conjunction with sliding of the driving lever 52 toward the front side of the housing 3.

Thus, the first front-side abutment member 38, first rear-side abutment member 39, second front-side abutment member 40, third abutment member 48 and fourth abutment member 50 are put into abutment with the periphery of the large-diameter optical disc 2A held on the turn-table 23a. It should be noted that in case the small-diameter optical disc 2B shown in FIG. 21 is used, the fourth abutment member 50 will be separated from the periphery of the optical disc 2B.

Next, in the disc drive 1, the base 27 is lowered by the base lifting mechanism 55 to the unchucking position to unchuck the optical disc 2 from the turn-table 23a of the disc mount 23.

More particularly, when the base 27 is lowered to the unchucking position, the free end of the push-up pin 66 abuts an inner-radial area, where no signals are recorded, of the optical disc 2 set on the turn-table 23a of the disc mount 23, pushes up the optical disc 2 and is separated from the turn-table 23a.

Next, in the disc drive 1, the optical disc 2A (2B) on the disc mount 23 is moved to outside the housing 3 through the disc slot 19 (disc ejection).

Figure 13:
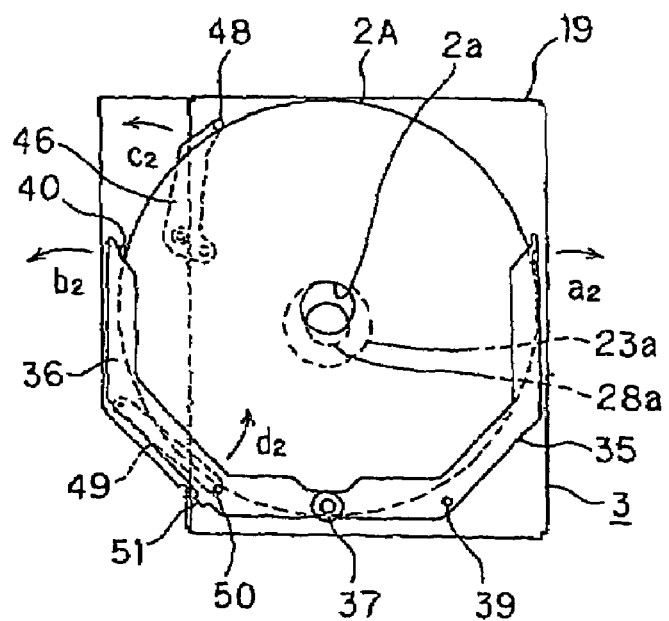
FIG. 13 is a plan view of the disc drive ready for ejection of the large-diameter optical disc.

More specifically, for ejection of the large-diameter optical disc 2A from the disc slot 19 in the housing 3, the fourth pivoting arm 49 is first pivoted in the direction of arrow d2 in FIG. 13 in conjunction with sliding of the driving lever 52 toward the front side as shown in FIG. 13. Also, with the fourth abutment member 50 being put into abutment with the rear peripheral side of the optical disc 2A, the fourth pivoting arm 49 will push the optical disc 2A to outside the housing 3 while pressing the rear peripheral side of the optical disc 2A.

Figure 14:
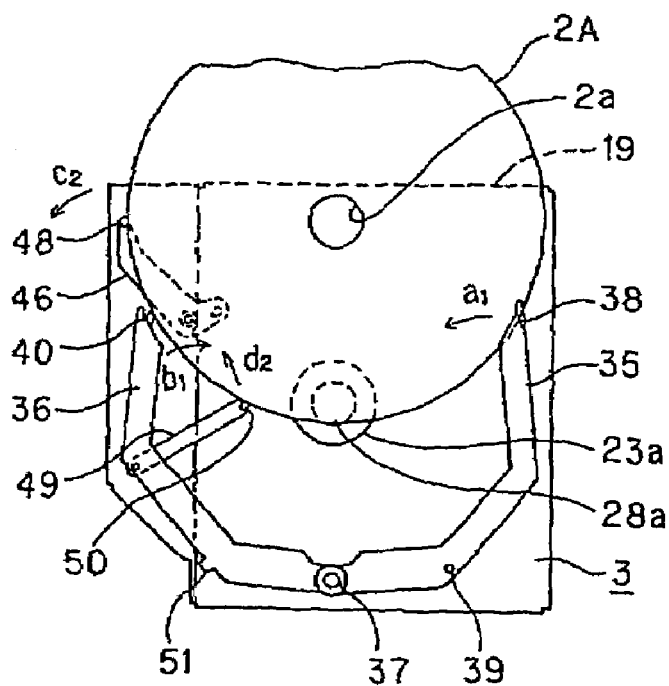
FIG. 14 is a plan view of the disc drive in which the large-diameter optical disc is in transition to ejection.

Then, when the large-diameter optical disc 2A is carried to outside the housing 3 until its central hole 2a comes to a position nearer to the front side than a line connecting the first and second front-side abutment members 38 and 40 to each other as shown in FIG. 14, the first and second front-side abutment members 38 and 40 are turned along the periphery of the optical disc 2A from the front side to the rear side. Then, the first and second pivoting arms 35 and 36 are forced by the torsional coil spring to pivot toward each other, namely, in the directions of arrows a1 and b1, respectively, in FIG. 14, with the first and second front-side abutment members 38 and 40 being in abutment with the rear peripheral side of the optical disc 2A.

Also, being pressed with the third abutment member 48 being in abutment with the rear peripheral side of the large-diameter optical disc 2A, the third pivoting arm 46 is pivoted in the direction of arrow c2 in FIG. 14.

Figure 15:
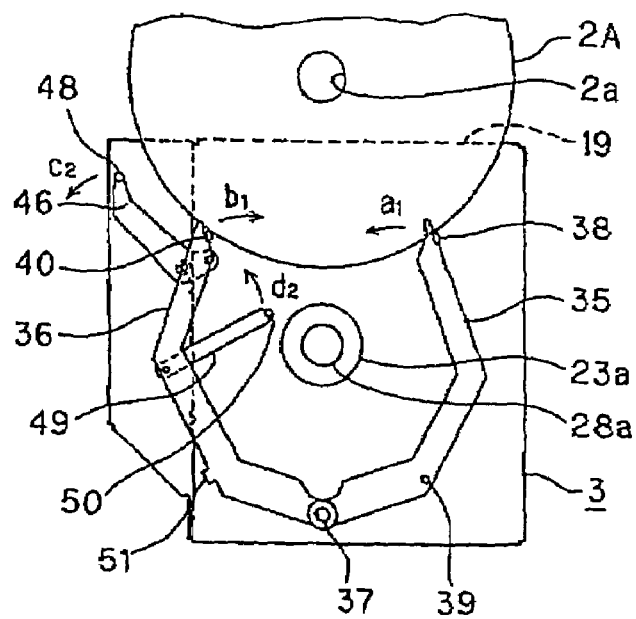
FIG. 15 is a plan view of the disc drive from which the large-diameter optical disc has been ejected.

Then, while pressing the large-diameter optical disc 2A at the rear peripheral side, the first and second pivoting arms 35 and 36 will push out the optical disc 2A to the disc insertion/ejection position shown in FIG. 15, that is, until the central hole 2a of the optical disc 2A is exposed outside the housing 3 from the disc slot 19.

Figure 22:
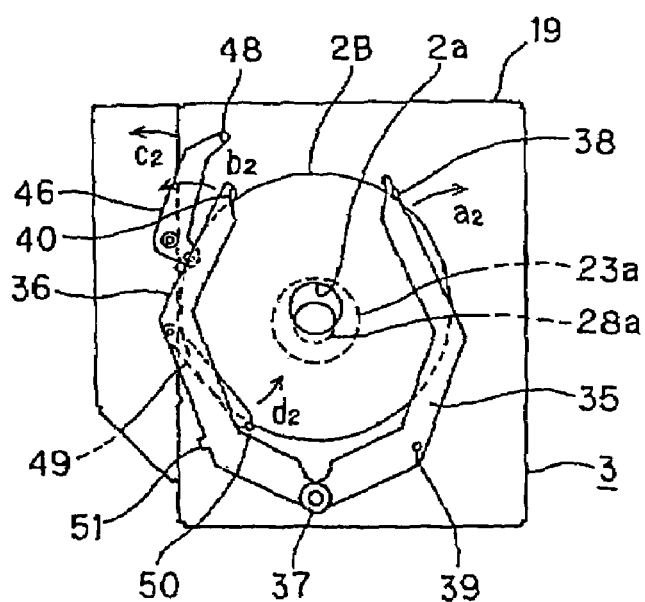
FIG. 22 is a plan view of the disc drive ready for ejection of the small-diameter optical disc.

On the other hand, to eject a small-diameter optical disc 2B from the disc slot 19 in the housing 3, the fourth pivoting arm 49 is first pivoted in the direction of arrow d2 in FIG. 22 in conjunction with sliding of the driving lever 52 to the front side. Also, the fourth abutment member 50 is put into abutment with the rear peripheral side of the optical disc 2B and so the fourth pivoting arm 49 will push the rear peripheral side of the optical disc 2B to push out the latter to outside the housing 3.

Figure 23:
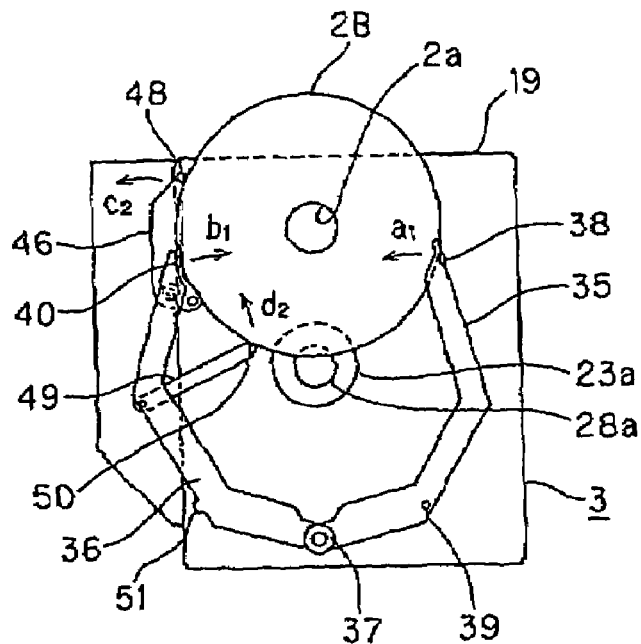
FIG. 23 is a plan view of the disc drive in which the small-diameter optical disc is in transition to ejection.

Then, when the small-diameter optical disc 2B is moved to outside the housing 3 until the central hole 2a of the optical disc 2 takes a position nearer to the front side than a line connecting the first and second front-side abutment members 38 and 40, the first and second front-side abutment members 38 and 40 will be turned along the periphery of the optical disc 2B from the front side to rear side, as shown in FIG. 23. Then, with the first and second front-side abutment members 38 and 40 being in abutment with the rear peripheral side of the optical disc 2B, the first and second pivoting arms 35 and 36 are forced by the torsional coil spring to pivot toward each other, that is, in the directions of arrows a1 and b1, respectively, in FIG. 23.

Also, the third pivoting arm 46 is pushed to pivot in the direction of arrow c2 in FIG. 23 with the third abutment member 48 being in abutment with the periphery of the small-diameter optical disc 2B.

Figure 24:
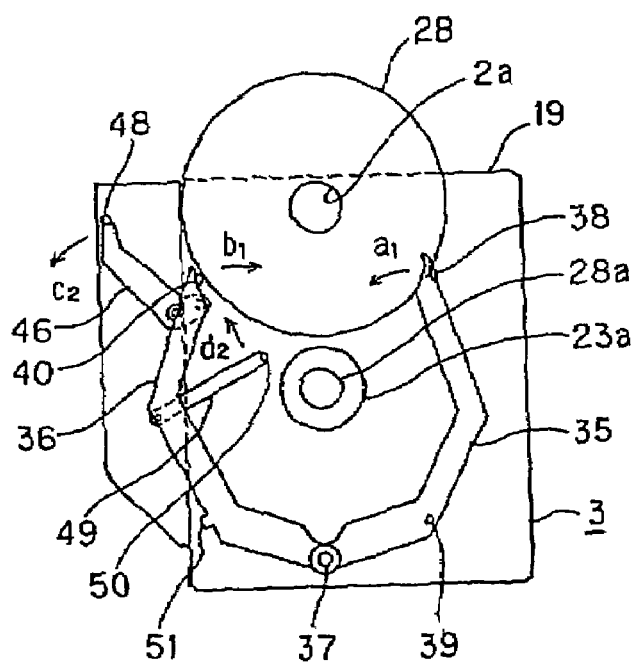
FIG. 24 is a plan view of the disc drive from which the small-diameter optical disc has been ejected.

Then, while pressing the small-diameter optical disc 2B at the rear peripheral side, the first and second pivoting arms 35 and 36 will push out the optical disc 2B to the disc insertion/ejection position shown in FIG. 24.

Figure 25:
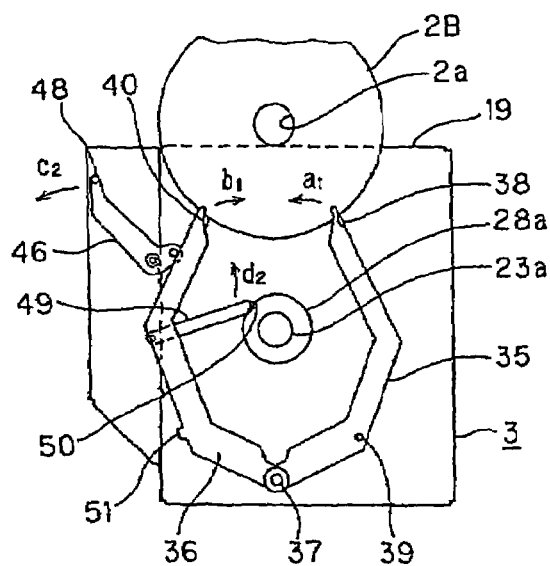
FIG. 25 is a plan view of the disc drive ready for ejecting the small-diameter optical disc.

Note that the small-diameter optical disc 2B can be pushed out from the disc slot 19 to a position where its central hole 2a is exposed outside the housing 3 by further pivoting the first and second pivoting arms 35 and 36 toward each other, that is, in the directions of arrows a1 and b1, respectively, in FIG. 25.

As above, in the disc drive 1, one of the optical discs 2A and 2B different in outside diameter from each other can be positioned in place by catching the optical disc 2A (2B) inside the first front-side abutment member 38, first rear-side abutment member 39, second front-side abutment member 40 and fourth abutment member 50 when the optical disc 2A (2B) is carried into place by the first and second pivoting arms 35 and 36 (disc centering).

Figure 29:
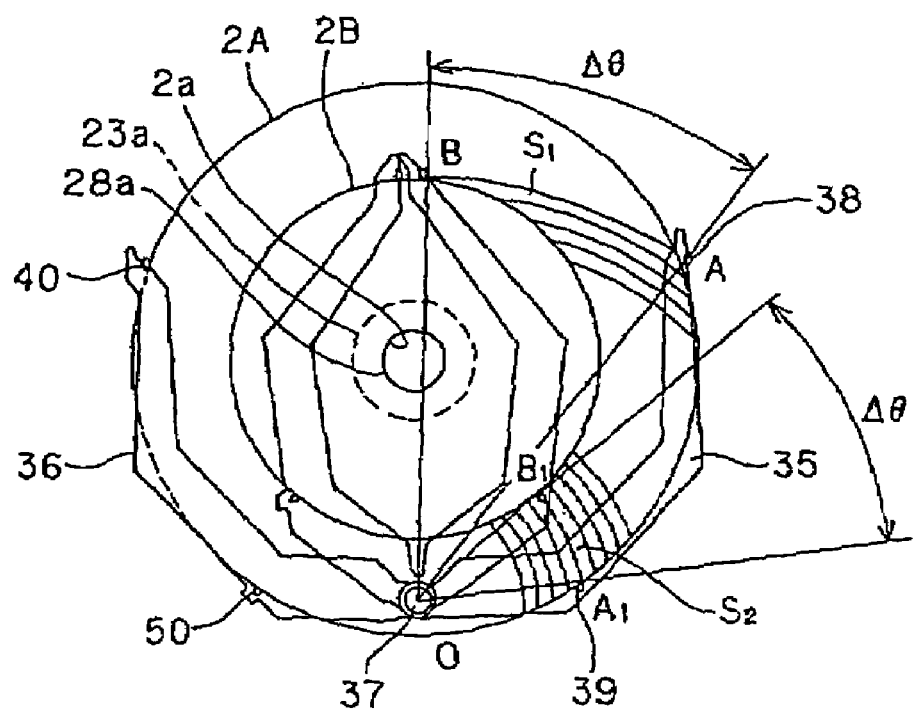
FIG. 29 is a plan view of the disc drive in which a large-diameter optical disc and small-diameter optical disc are centered on the turn-table.

Note here that as schematically illustrated in FIG. 29, the first and second pivoting arms 35 and 36 are located generally symmetrically with respect to the turn-table 23a of the disc mount 23 and are thus pivotable toward and/or away from each other about a center of pivoting O in a position nearer to the rear side than the turn-table 23a.

Also, note that of the four abutment members 38, 39, 40 and 50 that abut the periphery of each of the optical discs 2A and 2B different in outside diameter from each other, the first front-side abutment member 38 of the first pivoting arm 35, positioned nearer to the front side than the turn-table 23a, and the first rear-side abutment member 39 of the first pivoting arm 35, positioned nearer to the rear side than the turn-table 23a, second front-side abutment member 40 of the second pivoting arm 36, positioned nearer to the front side than the turn-table 23a, and the fourth abutment member 50 of the second pivoting arm 36, positioned nearer to the rear side than the turn-table 23a, are generally symmetrical with each other with respect to a center line through the center of the turn-table 23a and center of pivoting O along the direction in which the optical disc 2 is inserted.

Note here that the first and second pivoting arms 35 and 36 are pivoted through one angle about the center of pivoting O when centering the large-diameter optical disc 2A of 12 cm in diameter while the first and second pivoting arms 35 and 36 are pivoted through another angle about the center of pivoting O when centering the optical disc of 8 cm in diameter. Namely, the angle of pivoting the first and second pivoting arms 35 and 36 in centering the optical disc 2A is different by Δθ from that in centering the optical disc 2A.

Therefore, by presetting the locations of the four abutment members 38, 39, 40 and 50 with the angular difference Δθ taken in consideration, these abutment members 38, 39, 40 and 50 can be put into abutment with the periphery of one of the optical discs 2A and 2B different in outside diameter from each other when centering the optical disc.

More specifically, on the assumption that an arc taking, as the center thereof, the center of pivoting O passing before the turn-table 23a is taken as S1, points of contact of the arc S1 with the large-diameter optical disc 2A and small-diameter optical disc 2B, respectively, are taken as A and B, respectively, an arc taking, as the center thereof, the center of pivoting O passing behind the turn-table 23a is taken as S2 (S1>S2) and the points of contact of the arc S2 with the optical disc 2A and optical disc 2B, respectively, are taken as A' and B', respectively, the two arcs S1 and S2 satisfying the relation that the angle AOB=A'OB'=Δθ will exist within a predetermined range of radius. The disc drive 1 is designed so that the four abutment members 38, 39, 40 and 50 are disposed in a position satisfying the above relation.

Note that in a position near the arc S1, the smaller the radius, the smaller angular difference Δθ is, while the larger the radius, the larger the radius, the larger angular difference Δθ is. A point a little outer than the arc S1, namely, a position where the arc S1 cannot be in contact with the periphery of the small-diameter optical disc 2B, is the design limit. On the other hand, in a position near the arc S2, the smaller the radius, the larger the angular difference Δθ is, while the larger the radius the smaller the angular difference Δθ is. The angular difference Δθ has a minimum value which is also the design limit.

Also, in actual designing of the disc drive, there will be set radii of the arcs S1 and S2 and an angular difference Δθ, most preferable within the range of design freedom. The radii and angular difference can easily be determined in drawing with CAD software or the like.

In the disc drive 1, when the first and second pivoting arms 35 and 36 has caught one of the optical discs 2A and 2B different in outside diameter from each other inside the first front-side abutment member 38, first rear-side abutment member 39, second front-side abutment member 40 and fourth abutment member 50, the central portion (central hole 2a) of the optical disc 2A (2B) and central portion of the disc mount 23 (engagement projection 28a of the turn-table 23a) can be aligned with each other in a direction perpendicular to the main side of the optical disc 2. That is, the optical disc 2A (2B) can be centered in place appropriately and stably.

Also, in the disc drive 1, the first and second pivoting arms 35 and 36 bring and center the optical disc 2A (2B) into place. In other words, the optical disc 2 brought in by the third pivoting arm 46 is further brought into place while being centered by the first and second pivoting arms 35 and 36.

Therefore, in the disc drive 1, it is possible to make appropriate and stable loading of one of the optical discs 2A and 2B different in outside diameter from each other into place irrespectively of the difference in outside diameter between the optical discs 2A and 2B inserted from the disc slot 19.

More specifically, the radius of the large-diameter optical disc 2A is 6 cm, while that of the small-diameter optical disc 2B is 4 cm. Therefore, the small-diameter optical disc 2B has to be pushed into the housing 3 from the disc slot 19 over an extra distance of about 2 cm (difference in outside diameter) in comparison with the optical disc 2A. The carrying distance from the disc slot 19 to a position where the optical disc is to be set is different between the large- and small-diameter optical discs 2A and 2B. That is, the stroke from the disc slot 19 to the position to where the optical disc 2B will be carried will be about 2 cm shorter than such a stroke over which the optical disc 2A is carried.

On this account, in the disc drive 1 according to the present invention, the small-diameter optical disc 2B is pushed into the housing 3 by the third pivoting arm 46 until the central hole 2a of the optical disc 2B is brought to a position nearer to the rear side than a line connecting the first and second front-side abutment members 38 and 40, in order to eliminate the difference in stroke due to the difference in outside diameter between the large- and small-diameter optical discs 2A and 2B. It should be noted that the small-diameter optical disc 2B once pushed in over an extra distance of about 10 mm (as an actual margin) in comparison with the large-diameter optical disc 2A can be brought in more stably.

Next, the first and second pivoting arms 35 and 36 are pivoted under the force of the torsional coil spring in a direction toward each other, so that the small-diameter optical disc 2B caught between the first and second front-side abutment members 38 and 40 will be brought into place.

At this time, the difference in stroke due to the difference in outside diameter between the large- and small-diameter optical discs 2A and 2B will be absorbed depending upon the distance between the first and second pivoting arms 35 and 36. Thus, each of the optical discs 2A and 2B can positively be brought into place.

Also, the disc drive 1 is designed such that when the large-diameter optical disc 2A is centered, the third abutment member 48 of the third pivoting arm 46 can also be put into abutment with the periphery of the optical disc 2A. That is, a total of five abutment members 38, 39, 40, 48 and 50 will abut the periphery of the optical disc 2A.

Note here that at the time of centering, the optical disc 2 should be held at the periphery thereof at a minimum of three points around the turn-table 23a, namely, at a total of three or more of a point of the first pivoting arm 35 nearer to the front side than the turn-table 23a, a point of the first pivoting arm 35 nearer to the rear side than the turn-table 23a, a point of the second pivoting arm 36 nearer to the front side than the turn-table 23a and a point of the second pivoting arm 36 nearer to the rear side than the turn-table 23a.

Therefore, the disc drive 1 according to the present invention is not always limited to the aforementioned structure if the above-mentioned requirements are met but it may be designed so that the third abutment member 48 is separated from the periphery of the large-diameter optical disc 2A being centered or that the optical disc 2 being centered is held at three points.

Figure 30:
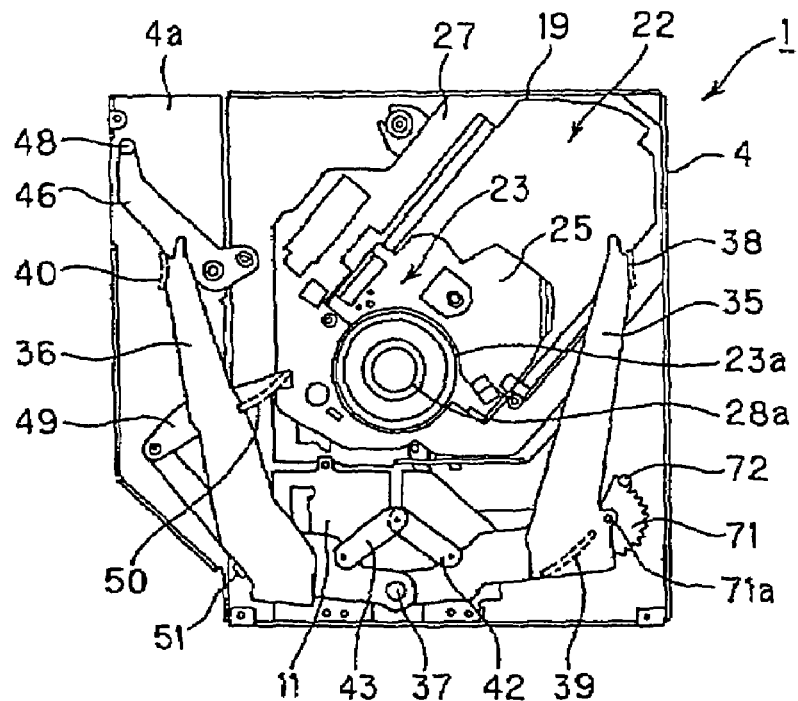
FIG. 30 is a plan view of a variant of the disc drive according to the present invention.

Also, in the disc drive 1 according to the present invention, the abutment members 38, 39, 40 and 50 abutting the periphery of the optical disc 2 being centered may be shaped nearly circular, for example, as shown in FIG. 30. It should be noted that the radius of this circle should desirably be smaller than that of the large-diameter optical disc 2A.

In this case, the disc loading by the first and second pivoting arms 35 and 36 can be started at a position nearer to the front side and the disc 2 once ejected can be moved from the disc slot 19 over an increased distance.

Figure 31:
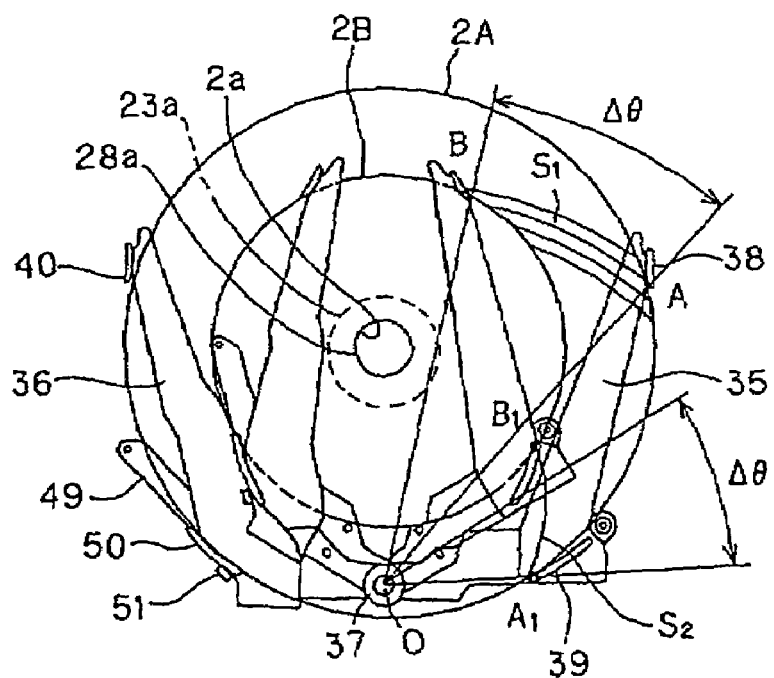
FIG. 31 is a plan view of the disc drive in FIG. 30 in which a large-diameter optical disc and small-diameter optical disc are centered on the turn-table.

Also in this case, when centering the large-diameter optical disc 2A, the periphery of the latter will abut the rear ends (point A1 in FIG. 31) of the first rear-side abutment member 39 and fourth abutment member 50, each shaped like an arc, as schematically illustrated in FIG. 31. On the other hand, when centering the small-diameter optical disc 2B, the periphery of the latter will abut the front ends (point B1 in FIG. 31) of the first rear-side abutment member 39 and fourth abutment member 50, each shaped like an arc.

Therefore, the longer the arc of the first rear-side abutment member 39 and fourth abutment member 50, the smaller $A1OB1=\Delta\theta$ is. Also, as the angular difference $\Delta\theta$ is smaller, the first and second pivoting arms 35 and 36 will be pivoted in a smaller range. Thus, for example, the dead space can be reduced by reducing the distance over which the pivoting arms 35 and 36 are passed, the mechanical stress can be reduced by reducing the driving stroke of the driving lever 52 that drives the pivoting arms 35 and 36, and other merits can be assured.

By shaping the first rear-side abutment member 39 and fourth abutment member 50 to be generally arcuate, the angular difference $\Delta\theta$ can be set in a wider range, whereby it is possible to design the disc drive with a higher freedom.

Figure 32:
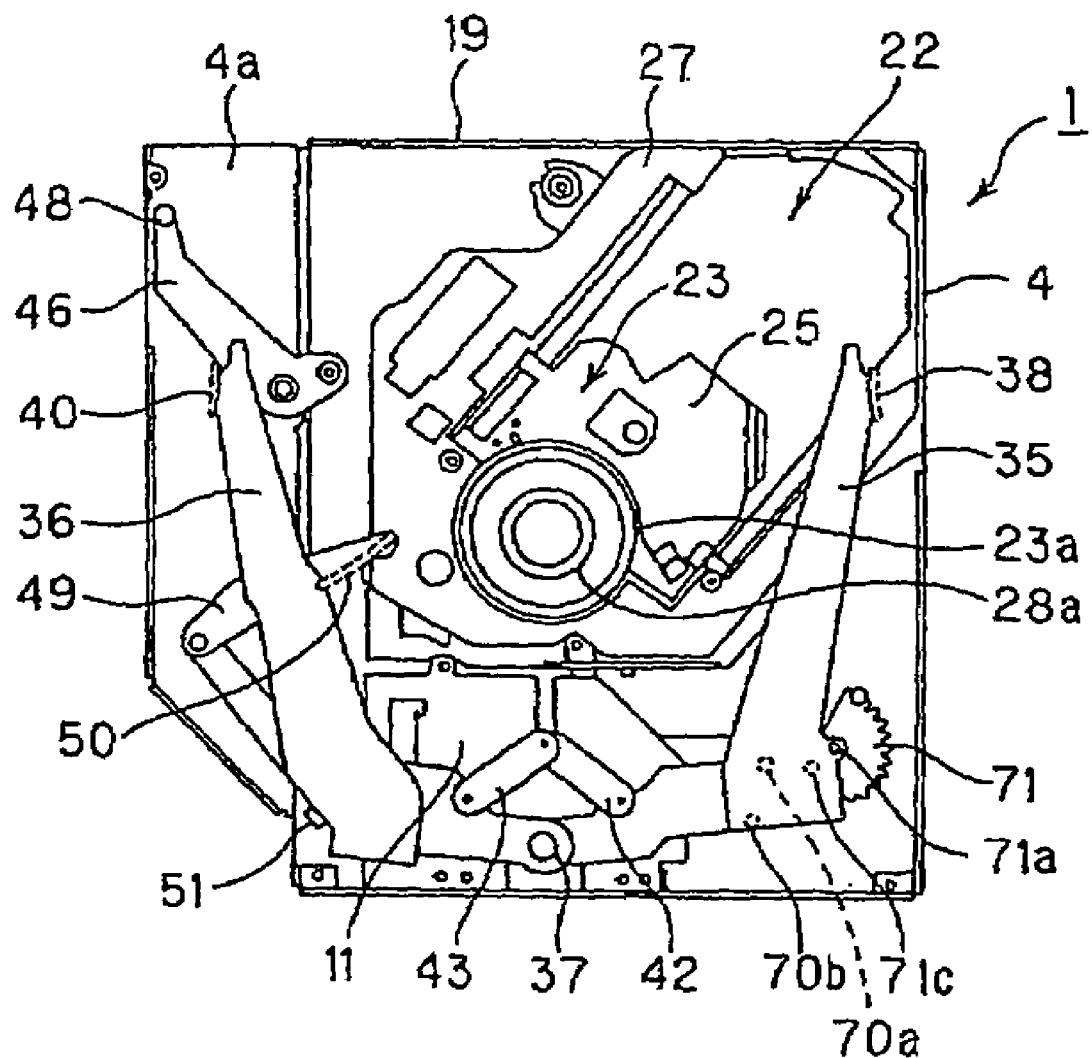
FIG. 32 is a plan view of another variant of the disc drive according to the present invention.

Also in the disc drive 1 according to the present invention, a plurality of abutment members may be disposed at respective points where they are to abut the periphery of the optical disc 2 being centered as shown in FIG. 32. It should be noted that in this embodiment, an abutment member 70a dedicated for carrying in the optical disc and a centering abutment member 70b are located in positions, respectively, of the first pivoting arm 35, nearer to the rear side than the turn-table 23a, in lieu of the aforementioned first rear-side abutment member 39.

Note that although the fourth abutment member 50 may be composed of a plurality of abutment pieces, since it is moved along the periphery of the optical disc 2 at the time of disc loading and ejection, it may be composed of rollers with only the contiguous arcuate portion or free end thereof being separated in order to prevent the fourth pivoting arm 49 from being discontinuously moved due to the divided abutment pieces.

Also, as an ejection aid means for aiding the ejection of the optical disc 2, a fifth pivoting member 71 pivotable in a plane parallel to the main side of the optical disc 2 inserted from the disc slot 19 may be installed pivotably on the first pivoting arm 35 with a spindle 71a being laid between them as shown in FIGS. 30 and 32. Also, the fifth pivoting arm 71 has provided thereon a fifth abutment member 71c projecting upward and which abuts the rear peripheral side of the optical disc 2 inserted from the disc slot 19. Thus, the optical disc 2 can be ejected more positively.

Also, in the disc drive 1 according to the present invention, the first and second pivoting arms 35 and 36 are pivoted between the main side of the top plate portion 5a opposite to the disc mount 23 and that of the optical disc 2 inserted from the disc slot 19.

Thus, the optical disc 2 can be loaded, centered and ejected appropriately and stable without being influenced by the clearance between the optical disc 2 inserted from the disc slot 19 and the base 27.

Especially even after there is made chucking of the small-diameter one (2B) of the optical discs 2A and 2B onto the turn-table 23a by elevating the base 27 after centering the optical disc 2B, it is possible to avoid collision between the first and second pivoting arms 35 and 36 and the base 27.

Therefore, according to the present invention, the disc drive 1 as a whole can be designed smaller, more lightweight and slimmer without being influenced by the clearance between the optical disc 2 and base 27, that permits to load the optical discs 2 different in outside diameter from each other but is narrow for chucking of the optical disc onto the turntable 23a.

In the disc drive 1 according to the present invention, the first and second pivoting arms 35 and 36 are supported slidably with their free ends being engaged in the guide recess 9 in the guide member 8 provided on the top plate portion 5a. Thus, the first and second pivoting arms 35 and 36 can be pivoted stably between the main side of the top plate portion 5a opposite to the disc mount 23 and that of the optical disc 2 inserted from the disc slot 19.

Further, inside the housing 3, the guide member 8 is installed to the front side of the top plate portion 5a to serve as a reinforcing rib. Thus, the top cover 5 will have an improved rigidity. Thus, it is possible to prevent the rigidity of the top cover 5 near the disc slot 19 from being lowered, and improve the operation reliability when the optical disc 2 is set on the turn-table 23a of the disc mount 23 by elevating the base 27 as above.

As above, the disc drive 1 according to the present invention is constructed simply but can selectively load the optical discs 2A and 2B different in outside diameter from each other. It needs no adapter for equalizing the small-diameter optical disc 2B in size with the large-diameter optical disc 2A when loading the small-diameter optical disc 2B and is thus easier to operate. Also, it is highly reliable on the operation thereof, and can be manufactured with a reduced cost.

The disc driver 1 according to the present invention can be formed from a considerably smaller number of parts than the conventional slot-in type disc drives in which the optical discs 2A and 2B different in outside diameter from each other can be loaded selectively. According to the present invention, the disc drive 1 can be designed more compact, lightweight and slimmer. Especially, an ultra-slim slot-in type disc drive for installation in the notebook personal computer 1000 or the like can be designed to have a thickness of 12.7 mm or 9.5 mm.

Next, the control system for the disc drive 1 according to the present invention will be described in detail. It should be noted that in the following illustration and explanation, the functional members equivalent to those in the aforementioned disc drive 1 will be indicated with the same reference numerals as those used in the illustration and explanation of the disc drive.

Figure 33:
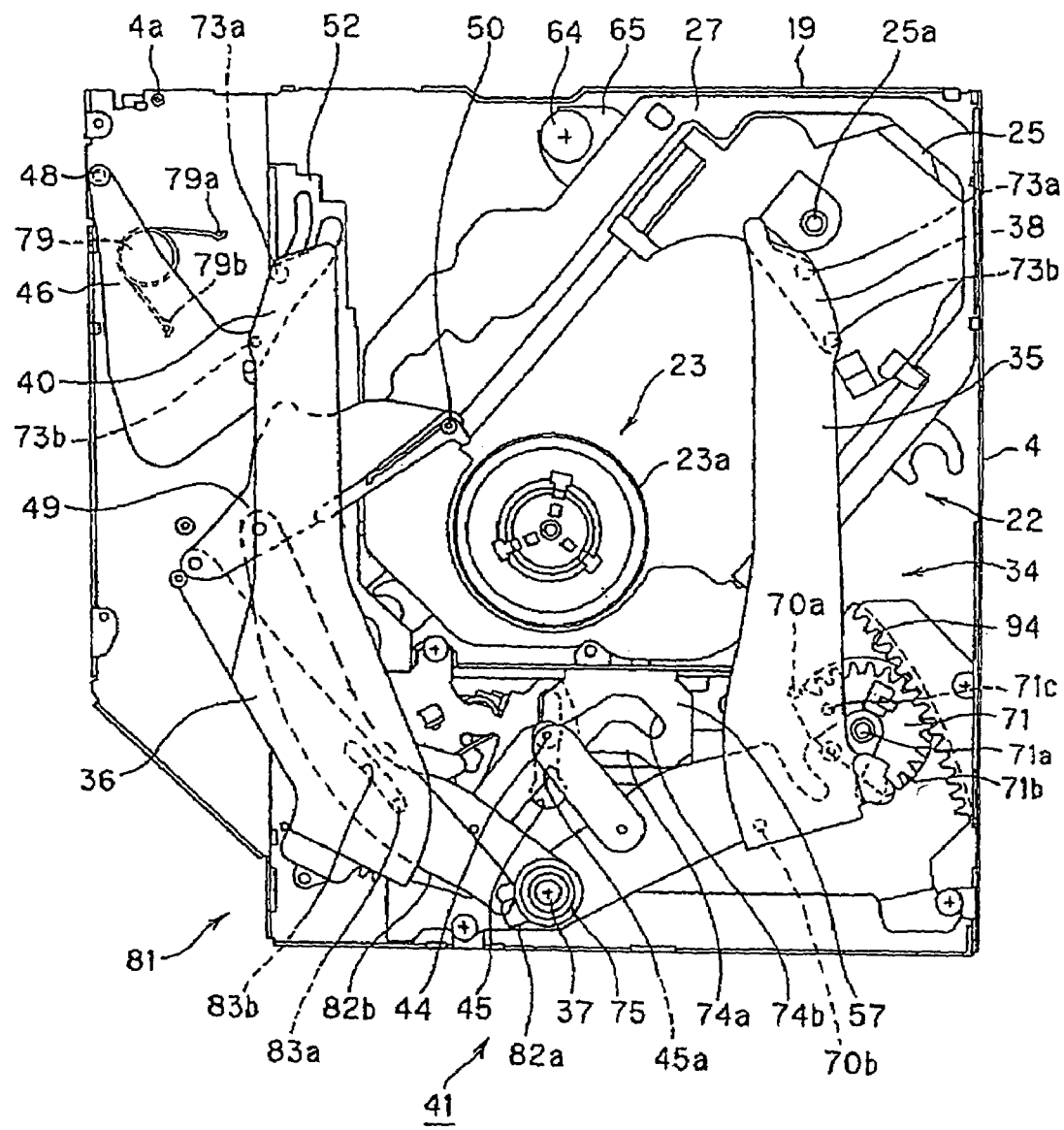
FIG. 33 is a plan view of the disc drive with the top cover thereof being removed.

The first and second ones (35 and 36) of the first to fourth pivoting arms 35, 36, 46 and 49 included in the disc carrying mechanism 34 have a pair of front and rear rotating rollers 73a and 73b installed pivotably on their respective first and second front-side abutment members 38 and 40 as shown in FIG. 33. Of this pair of rotating rollers 73a and 73b, the one (73a) located at the front side of the housing 3 abuts the periphery of the optical disc 2 during disc loading and ejection, while the rotating roller 73b located at the rear side of the housing 3 abuts the periphery of the optical disc 2 during the disc centering. Since the rotating rollers 73a and 73b in pair are different in function from each other as above, the optical disc 2A (2B) can be loaded, centered and ejected positively and stably by the first and second pivoting arms 35 and 36.

Figure 34:
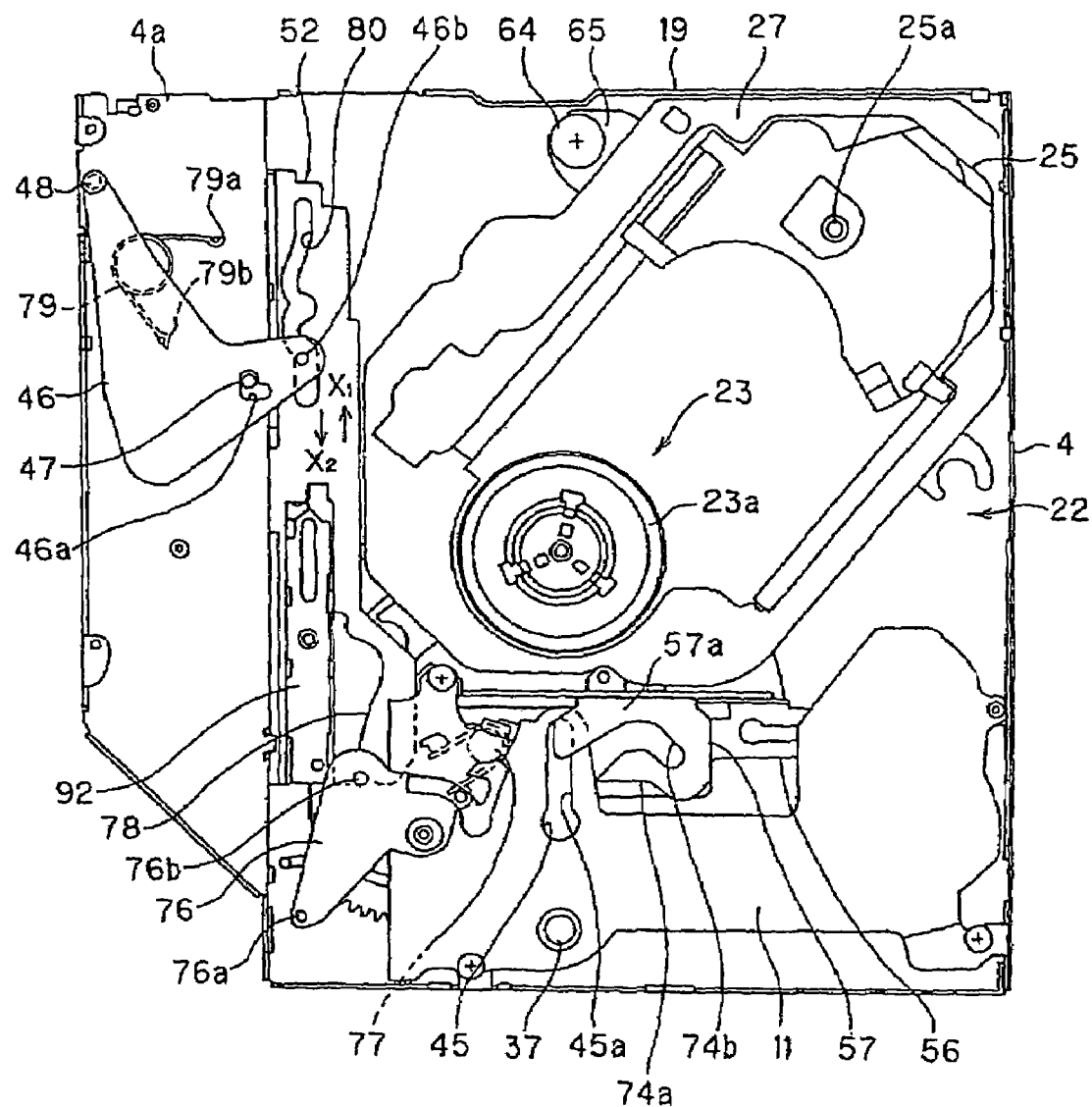
FIG. 34 is a plan view of the disc drive having some parts thereof being removed.
Figure 35:
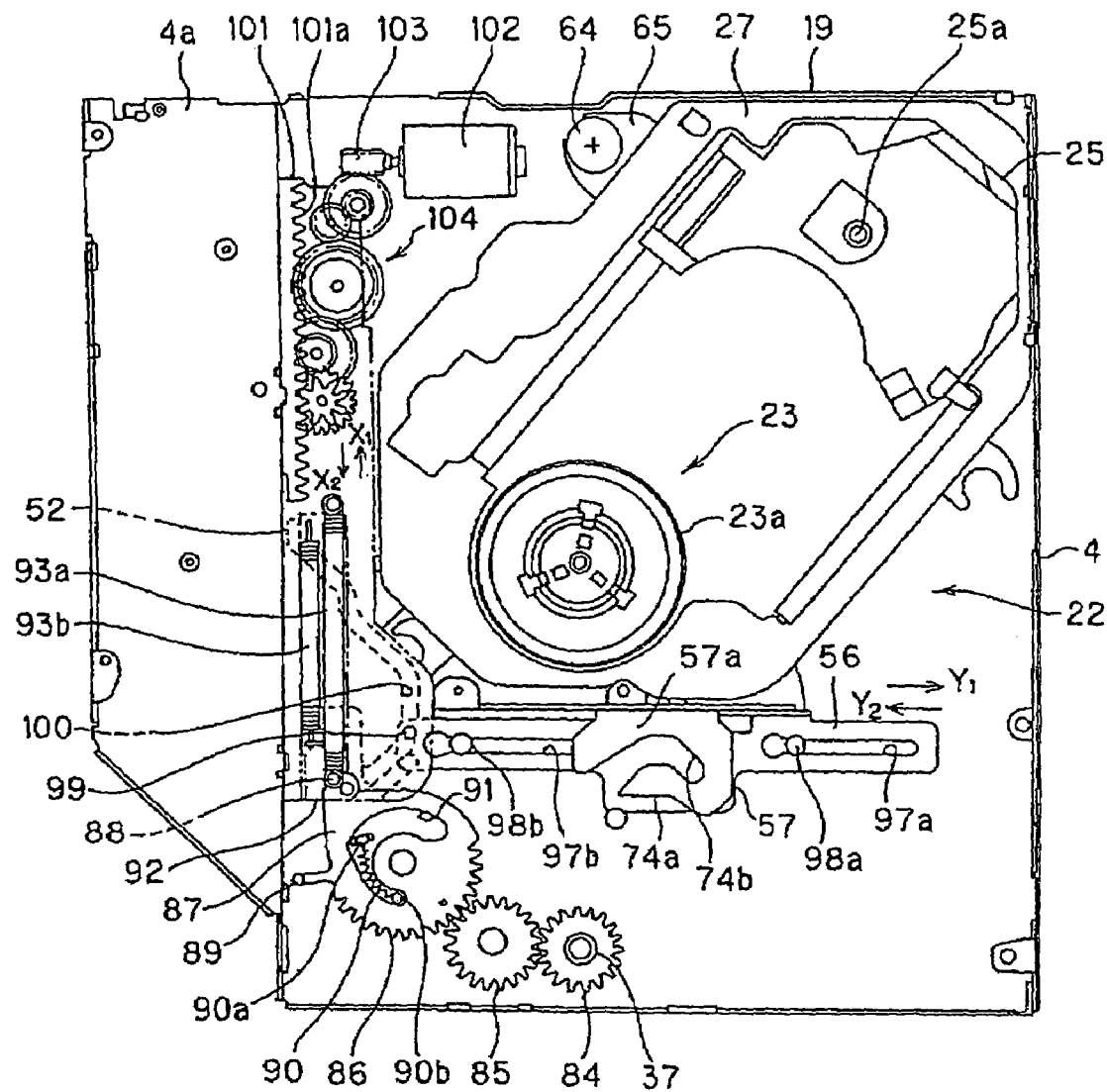
FIG. 35 is a plan view of the disc drive having further parts thereof being removed.

Also, in the interlocking mechanism 41, the first and second pivoting arms 35 and 36 have to be pivoted correspondingly to each of the optical discs 2A and 2B different in outside diameter from each other as shown in FIGS. 33, 34 and 35. On this account, the cam piece 57 bent upward at the middle of the cam lever 56 is further bent horizontally to have a generally "C" shape. The cam piece 57 has formed in the horizontal surface 57a thereof a first cam 74a for the large-diameter optical disc 2A and a second cam 74b for the small-diameter optical disc 2B. The second cam 74b is formed by cutting the portion of the horizontal surface 57a, nearer to the front side than the firs cam 74a.

The angle defined between the first and second pivoting arms 35 and 36 when the large-diameter optical disc 2A is inserted from the disc slot 19 in the housing 3 is different from that when the small-diameter optical disc 2B is inserted from the disc slot 19. In the interlocking mechanism 41, the second spindle 44 is selectively engaged on the first cam 74a or second cam 74b depending upon the angular difference.

More specifically, in case the large-diameter optical disc 2A is inserted, the second spindle 44 will be engaged on the first cam 74a and slide in the guide recess 45 in conjunction with the horizontal sliding of the cam lever 56. Thus, the first and second pivoting arms 35 and 36 can be pivoted toward and/or away from each other correspondingly to the outside diameter of the optical disc 2A.

On the other hand, in case the small-diameter optical disc 2B is inserted, the second spindle 44 will be engaged on the second cam 74b and slide in the guide recess 45 in conjunction with the horizontal sliding of the cam lever 56. Thus, the first and second pivoting arms 35 and 36 can be pivoted toward and or away from each other correspondingly to the outside diameter of the small-diameter optical disc 2B.

Also the disc carrying mechanism 34 includes a first torsional coil spring 75 as a member for forcing the first and second pivoting arms 35 and 36 toward each other as shown in FIG. 33. The first torsional coil spring 75 is not illustrated in detail but it is engaged at one end thereof on the base end of the first pivoting arm 35 with the coil portion thereof being fitted on the first spindle 37 and at the other end on the second pivoting arm 36, so that it forces the first and second pivoting arms 35 and 36 toward each other.

Figure 57:
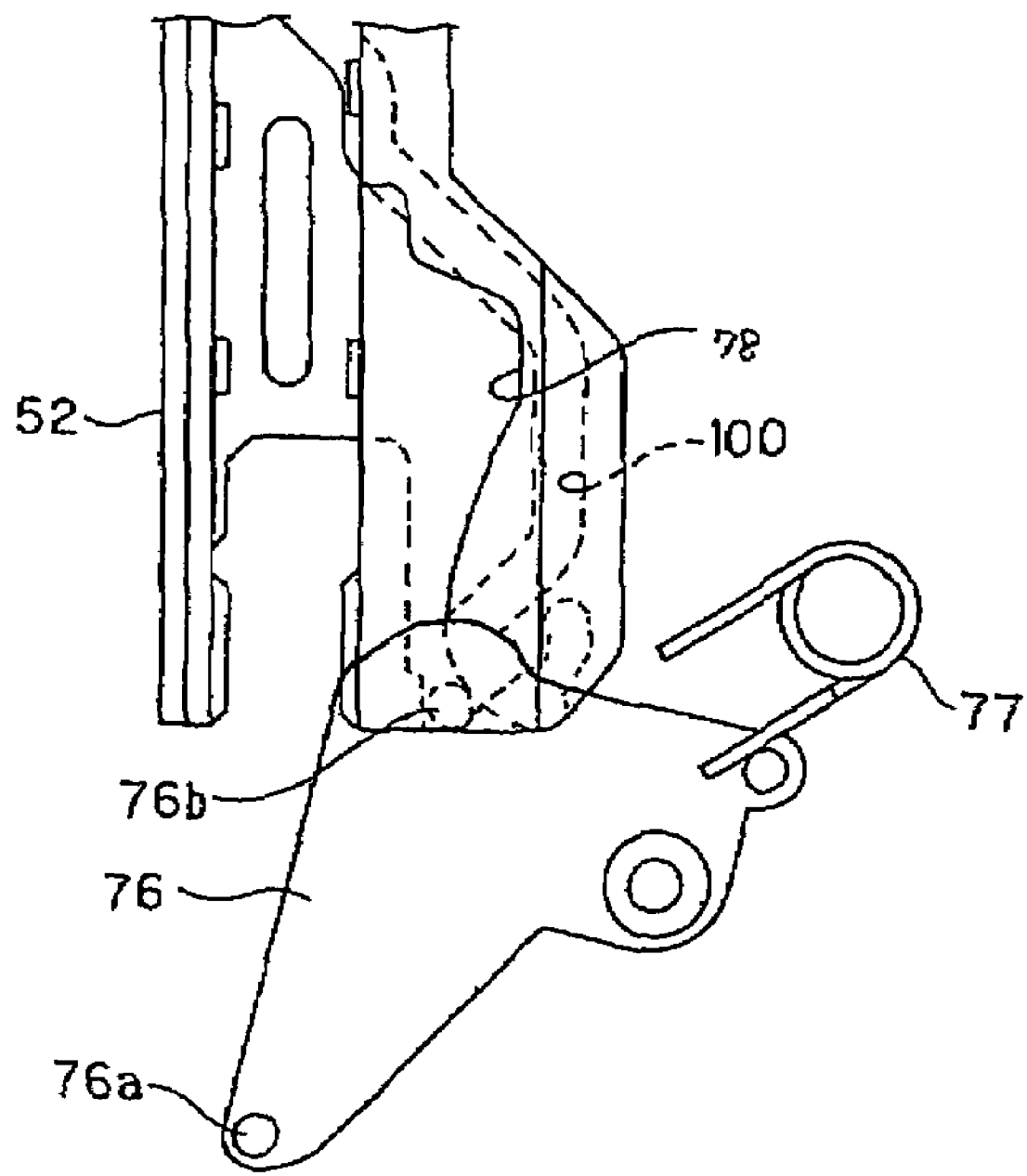
FIG. 57 is a plan view of a substantial part, showing the engagement of the pressing lever and driving lever with each other.

Also, the disc carrying mechanism 34 includes a forcing selecting mechanism to select either forcing, or no forcing, of the first and second pivoting arms 35 and 36 toward each other. The forcing selecting mechanism includes, as shown in FIGS. 34 and 57, a pushing lever 76 to press the second pivoting arm 36 and a second torsional coil spring 77 to force the pushing lever 76 in a direction of pivoting the first and second pivoting arms 35 and 36 toward each other.

The pushing lever 76 has provided at one end thereof an abutment pin 76a that abuts the second pivoting arm 36, and at the other end a cam pin 76b that is engaged in a cam groove 78 formed in the upper surface of the driving lever 52 shown in FIGS. 37A to 37D. The pushing lever 76 is born on the chassis 11 to be pivotable between a position where the abutment pin 76a abuts the second pivoting arm 36 and a position where the cam pin 76b is parked being separated from the second pivoting arm 36.

As shown in FIG. 34, the second torsional coil spring 77 is engaged at one end thereof on the chassis 11 with the coil portion thereof being supported on the chassis 11 while being engaged and at the other end on the pushing lever 76, to force the abutment pin 76a of the pushing lever 76 in a direction of abutting the second pivoting arm 36.

In the disc carrying mechanism 34, when the driving lever 52 is slid to the rear end of the housing 3 while the cam pin 76b of the pushing lever 76 is being slid in the cam groove 78 in the driving lever 52 in conjunction with sliding of the driving lever 52 toward the rear side in the direction of arrow X2 in FIG. 34, the driving lever 52 is pivoted against the force of the second torsional coil spring 77 to the parking position, so that the first and second pivoting arms 35 and 36, having been forced toward each other with the second pivoting arm 36 being pushed by the pushing lever 76 (forced state), will not be forced any more (not-forced state).

As shown in FIGS. 33 and 34, the third pivoting arm 46 is forced by a torsional coil spring 79 disposed on the wing portion 4a. The torsional coil spring 79 is engaged at one end thereof on an engagement pin 79a of the wing portion 4a and at the other end on an engagement pin 79b provided on the bottom of the third pivoting arm 46, with the result that the third pivoting arm 46 can selectively be forced in a direction of abutting the periphery of the optical disc 2 or in a direction of leaving the periphery of the optical disc 2.

Also, the third pivoting arm 46 has a generally L-shaped spindle hole 46a in which the spindle 47 is inserted and a cam pin 76b that is engaged in a cam groove 80 formed in the upper surface of the driving lever 52 as shown in FIG. 37. The third pivoting arm 46 is pivoted with the cam pin 46b sliding in the cam groove 80 in conjunction with sliding of the driving lever 52 as shown in FIGS. 56A to 56F. Also, the third pivoting arm 46 has the center of pivoting thereof shifted depending upon a position the spindle 47 in the spindle hole 46a takes.

The fourth pivoting arm 49 is pivoted in conjunction with sliding of the driving lever 52 via a linking mechanism 81 shown in FIG. 33.

More specifically, the linking mechanism 81 has a crank mechanism including a crank arm 82a supported pivotably on the first spindle 37 and a connecting arm 82b that connects the crank arm 82a and fourth pivoting arm 49. The connecting arm 82b has formed therein an elongated hole 83b in which a guide pin 83a provided on the second pivoting arm 36 is inserted. The crank mechanism has the crank arm 82a thereof pivoted in conjunction with pivoting of the fourth pivoting arm 49.

Also, the linking mechanism 81 has provided on the bottom of the bottom case 4, a first gear 84 pivoted via the crank arm 82a, second gear 85 that is in mesh with the first gear 84, and a pivoting control member 87 having formed thereon a third gear 86 that is in mesh with the second gear 85 as shown in FIG. 35.

The pivoting control member 87 is provided to pivot the fourth pivoting arm 49 in conjunction with sliding of the driving lever 52, and it includes an engagement pin 88 that is in mesh with a sliding member 92, which will be described in detail later, of the driving lever 52, and a positioning pin 89 that abuts the rear end of the driving lever 52 at the time of recording or playback to position the driving lever 52.

The pivoting control member 87 is forced by an extension coil spring 90 as a forcing member in one of the pivoting directions, namely, clockwise herein as shown in FIG. 35. The extension coil spring 90 is engaged at one end thereof on an engagement pin 90a provided at the bottom of the bottom case 4 and at the other end on an engagement pin 90b provided on the pivoting control member 87 to force the latter in one of the pivoting directions. It should be noted that the pivoting control member 87 has formed therein a generally arcuate slit 91 to relieve the engagement pin 90a.

On the other hand, at the rear side of the driving lever 52, there is installed a sliding member 92 slidable toward and/or away from the driving lever 52. The sliding member 92 is forced toward the front side by first and second extension coil springs 93a and 93b. When the engagement pin 88 of the pivoting control member 87 is engaged on the rear end, the sliding member 92 pivots the pivoting control member 87 in conjunction with sliding of the driving lever 52.

The first and second extension coil springs 93a and 93b are engaged at the ends thereof located at the front side of the housing 3 on the driving lever 52 and at the rear end thereof on the sliding member 92 to force the sliding member 92 toward the front side of the driving lever 52 in the direction of arrow X1 in FIG. 35. Of these extension coil springs 93a and 93b, the first one (93a) is provided to move the driving lever 52 and sliding member 92 together and has a force of about 200 to 300 gf. On the other hand, the second extension coil spring 93b is provided to protect the mechanism if the optical disc 2 cannot normally be ejected, and it has a force of about 400 to 600 gf.

In the linking mechanism 81, when the fourth pivoting arm 49 is pivoted toward the inner rear side of the housing 3 when loading the optical disc 2, the first gear 84 is pivoted by means of the aforementioned crank mechanism 82. Then, the first, second and third gears 84, 85 and 86 are put into mesh with each other, and the pivoting control member 87 is pivoted against the force of the extension coil spring 90 in the other of the pivoting directions (counterclockwise herein as shown in FIG. 35). Thus, the driving lever 52 can be slid toward the rear side in the direction of arrow X2 in FIG. 35 in conjunction with pivoting of the fourth pivoting arm 49 toward the rear side.

On the other hand, for ejecting the optical disc 2, the driving lever 52 is slid toward the front side in the direction of arrow X1 in FIG. 35, so that the pivoting control member 87 is pivoted in one of the pivoting directions (clockwise as shown in FIG. 35). Thus, with the third, second and first gears 86, 85 and 84 being put into mesh with each other, the fourth pivoting arm 46 can be pivoted toward the front side of the housing 3 by means of the crank mechanism 82.

As shown in FIG. 33, the fifth pivoting member 71 has a gear portion 71b formed on a predetermined peripheral area thereof. The gear portion 71b is put into mesh with a rack 94 disposed on the chassis 11, and the fifth pivoting member 71 is pivoted in conjunction with pivoting of the first pivoting arm 35.

Figures 37A, 37B, 37C, 37D:
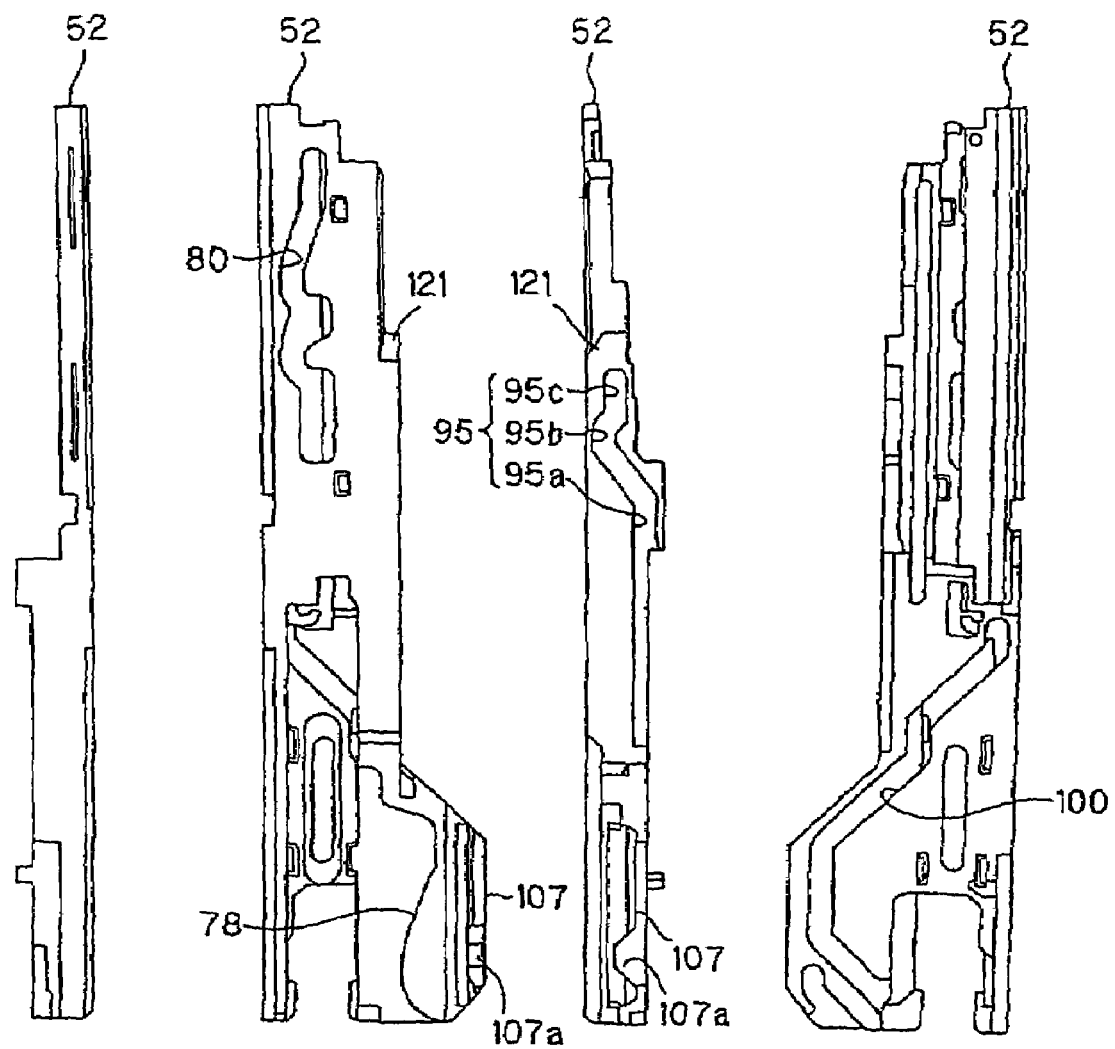
FIG. 37A is a plan view, from one side, of the driving lever.
FIG. 37B is a plan view, from above, of the driving lever.
FIG. 37C is a side elevation, from the other side, of the driving lever.
FIG. 37D is a plan view, from below, of the driving lever.

For elevation and lowering of the base unit 22 by the base lifting mechanism 55, a first cam groove 95 is formed on the lateral side of the driving lever 52 opposite to the base 31 as shown in FIG. 37C. The first cam groove 95 includes a first horizontal surface 95a on which the base unit 22 is to be placed for unchucking, a top surface 95b on which the base unit 22 is to be placed for chucking, and a second horizontal surface 95c on which the base unit 22 is to be placed in the intermediate position.

Figures 38A, 38B:
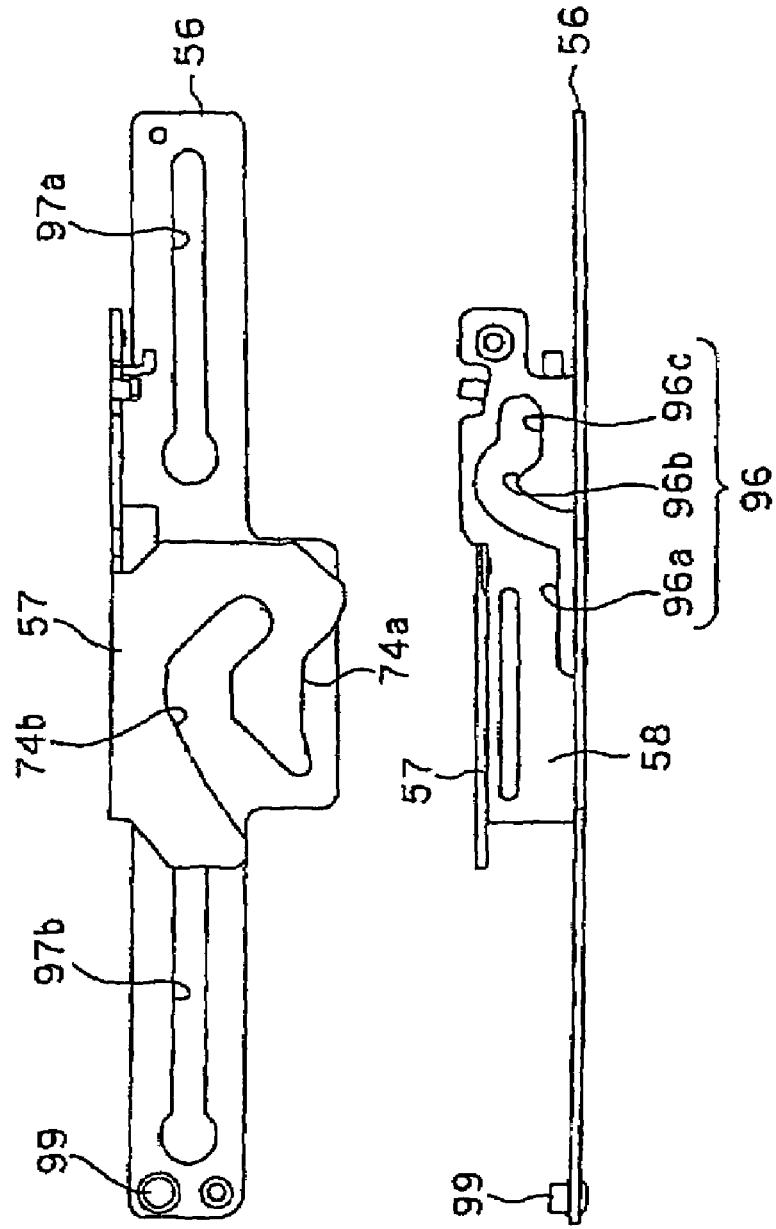
FIG. 38A is a plane view of the cam lever.
FIG. 38B is a side elevation of the cam lever.

On the other hand, the cam piece 57 of the cam lever 56 has a second cam groove 96 formed therein as shown in FIG. 38B. The second cam groove 96 includes a first horizontal surface 96a on which the base unit 22 is to be placed for unchucking, a top surface 96b on which the base unit 22 is to be placed for chucking, and a second horizontal surface 96c on which the base unit 22 is to be placed in the intermediate position.

Note here that the cam lever 56 has formed in the main side thereof a pair of guide recesses 97a and 97b. With a pair of headed guide pins 98a and 98b projecting from the bottom of the bottom case 4 shown in FIG. 35 is engaged in the guide recesses 97a and 97b, the cam lever 56 is supported slidably along the rear lateral side of the base unit 22 in the rightward and leftward directions of arrows Y1 and Y2, shown in FIG. 35, generally perpendicular to the sliding direction of the driving lever 52.

Also, in a position where the cam lever 56 and driving lever 52 intersect each other, there is provided a guide pin 99 projecting upward. On the other hand, on the bottom of the driving lever 52 shown in FIG. 37D, there is formed a guide recess 100 in which the guide pin 99 is to be engaged. As shown in FIG. 35, with the guide pin 99 being slid in the guide recess 100 in conjunction with sliding of the driving lever 52 in the directions of arrows X1 and X2 in FIG. 35, the cam lever 56 is slid in a direction perpendicular to the sliding direction of the driving lever 52.

As shown in FIG. 5, the base 27 includes the first spindle 59 located at the lateral side of the disc mount 23 opposite to the driving lever 52 and supported being engaged in the first cam groove 95 in the driving lever 52, second spindle 60 located at the lateral side of the disc mount 23 opposite to the cam lever 56 and supported being engaged in the second cam groove 96 of the cam piece 57 and in the normal slit in the bent piece 58, third spindle 62 located at the front lateral side opposite to the lateral side opposite to the driving lever 52 and supported pivotably in the spindle hole 61 formed in the other lateral side of the bottom case 4, and a fixing support 65 located at the front lateral side opposite to the lateral side opposite to the cam lever 56 and supported on the screw 64 at the bottom of the bottom case 4 on contact with the insulator 63 formed from a viscoelastic material such as rubber.

Therefore, in the base lifting mechanism 55, with the first spindle 59 being slid in the first cam groove 95 in the driving lever 52 and the second spindle 60 being slid in the second cam groove 96 in the cam lever 56 and in the normal slit in the bent piece 58, both in conjunction with sliding of the driving lever 52 and cam lever 56, the base 27 is elevated and lowered in relation to the front side of the disc mount 23 among the position where the optical disc 2 is chucked to the turn-table 23a, position where the optical disc 2 is unchucked from the turn-table 23a and intermediate position.

Figure 58A:
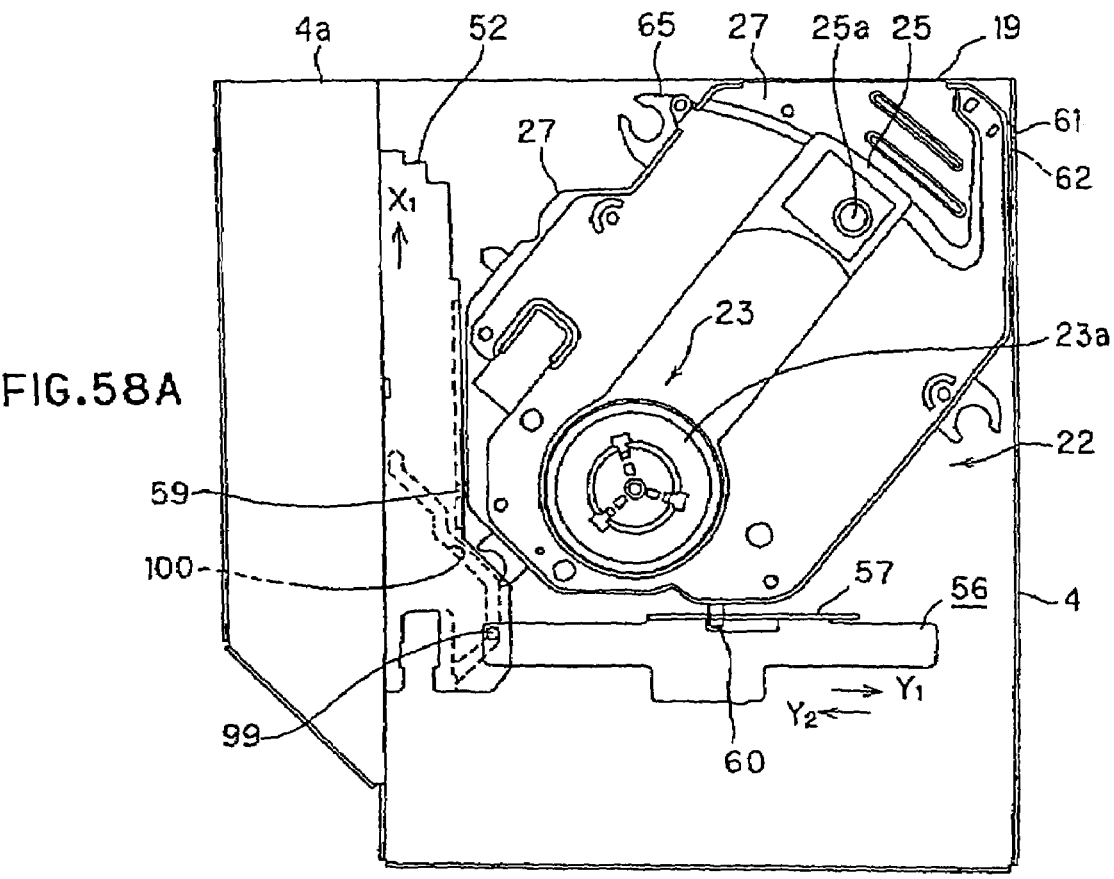
Figure 58B:
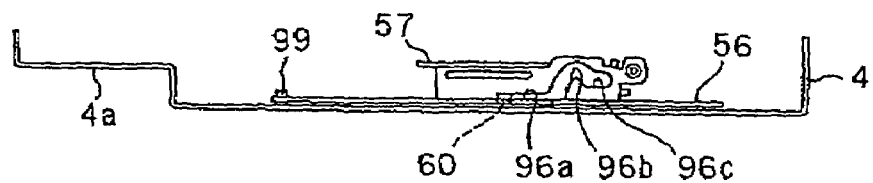
Figure 58C:
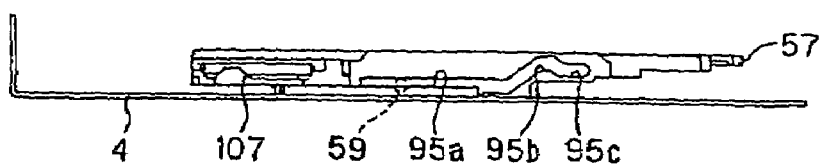
Figure 58D:
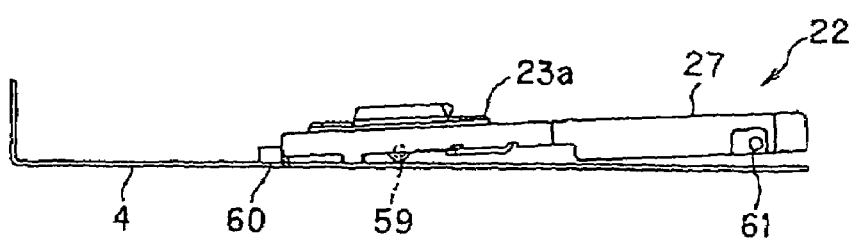

More specifically, with the base 27 being in the unchucking position shown in FIGS. 58A to 58D, the cam lever 56 is slid toward the front side in the direction of arrow Y1 in conjunction with sliding of the driving lever 52 toward the front side of the driving lever 52 in the direction of arrow X1 as shown in FIG. 58A, so that the first spindle 59 will be positioned on the first horizontal surface 95a in the first cam groove 95 while the second spindle 60 will be positioned on the first horizontal surface 95a in the second cam groove 96, as shown in FIG. 58C. Thus, the base unit 22 is lowered to the unchucking position as shown in FIG. 58D.

Figure 59A:
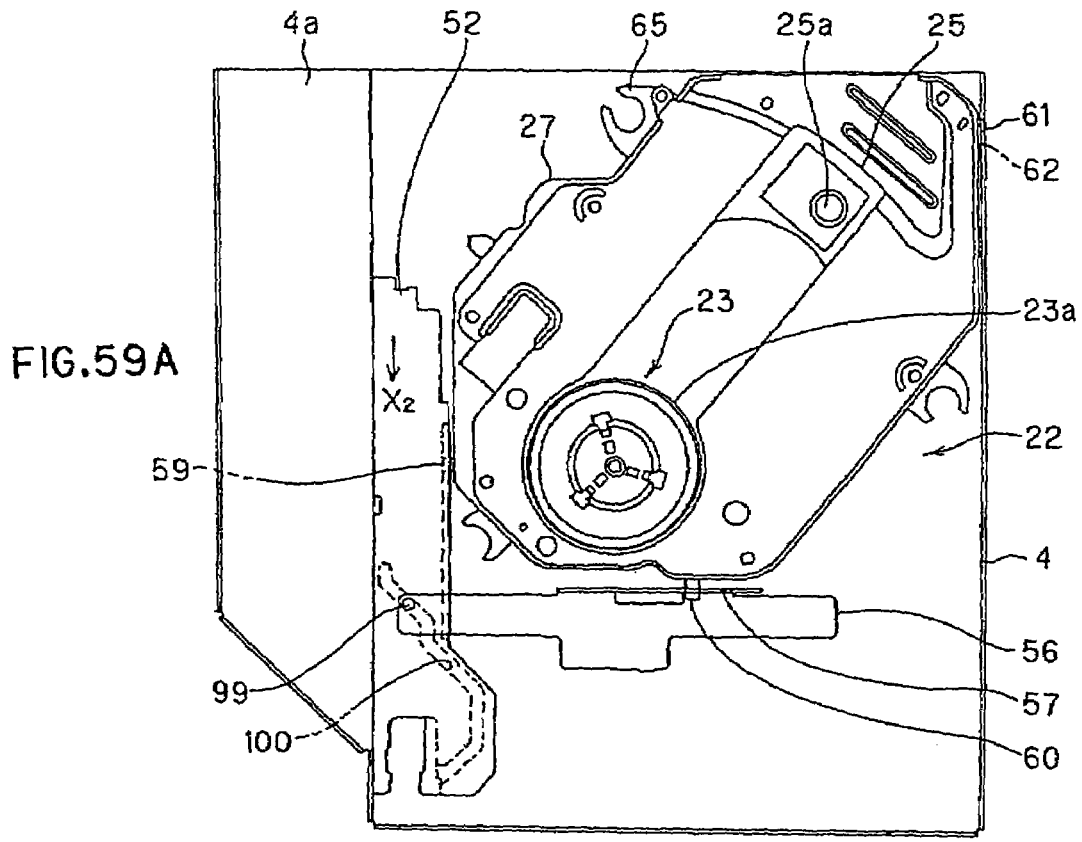
Figure 59B:
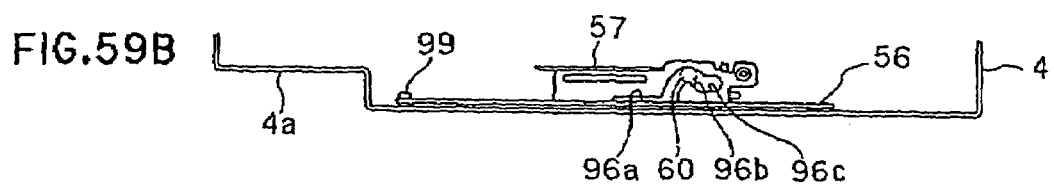
Figure 59C:
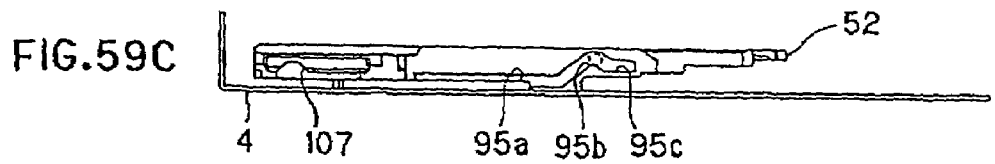
Figure 59D:
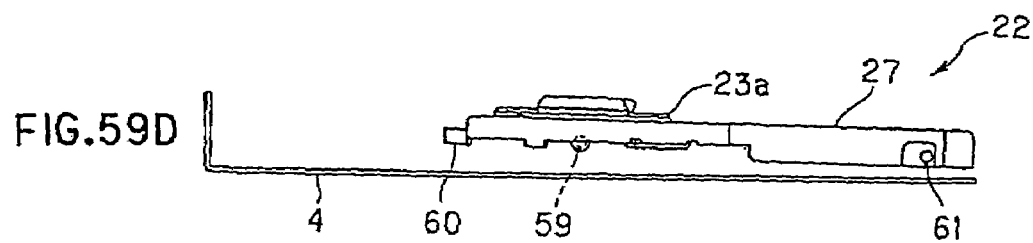

Also, with the base 27 being in the chucking position shown in FIGS. 59A to 59D, the cam lever 56 is slid in the direction of arrow Y2 in conjunction with sliding of the driving lever 52 in the direction of arrow X2 in FIG. 58A, so that the first spindle 59 will be positioned on the top surface 95b in the first cam groove 95 while the second spindle 60 will be positioned on the top surface 96b in the second cam groove 96, as shown in FIG. 59C. Thus, the base unit 22 is elevated to the chucking position as shown in FIG. 59D.

Figure 60A:
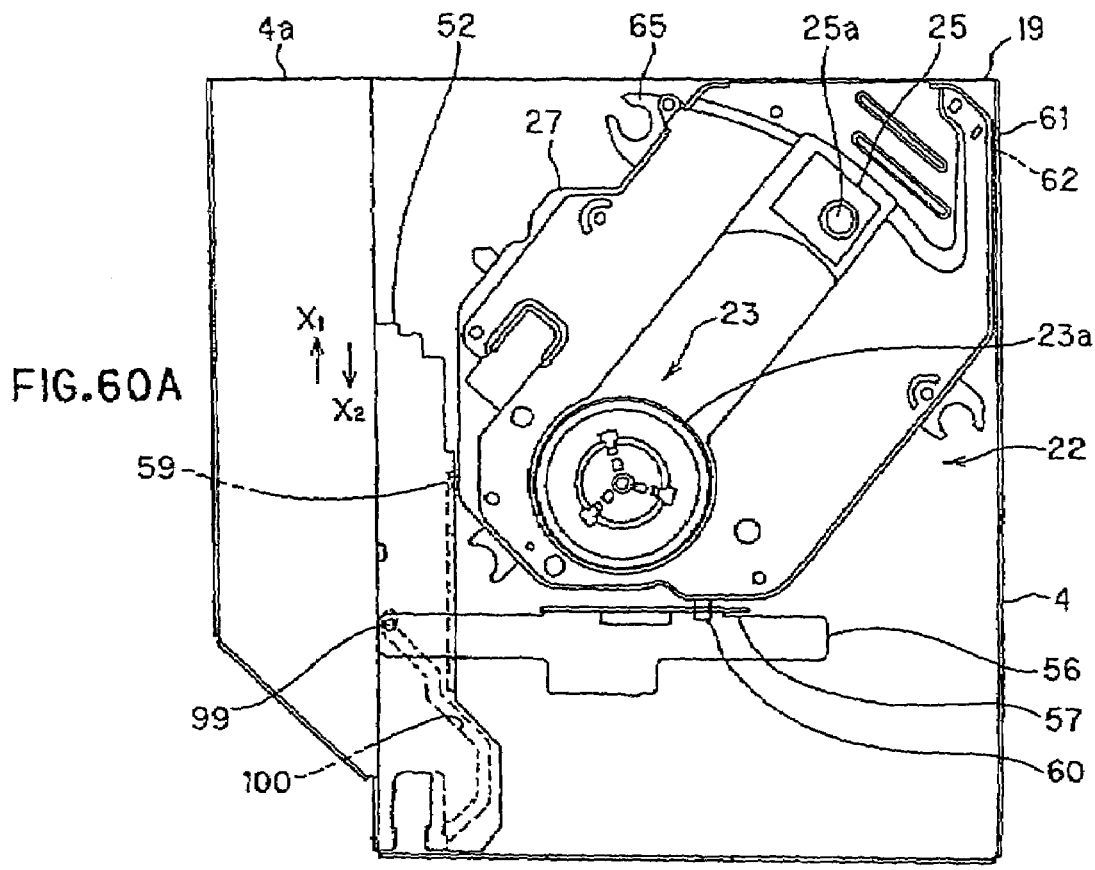
Figure 60B:
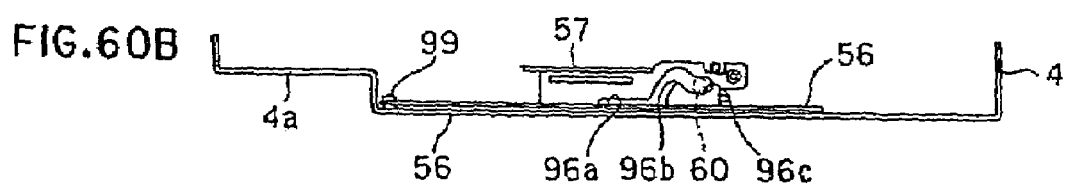
Figure 60C:
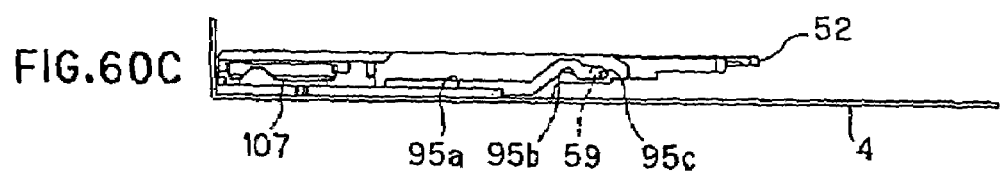
Figure 60D:
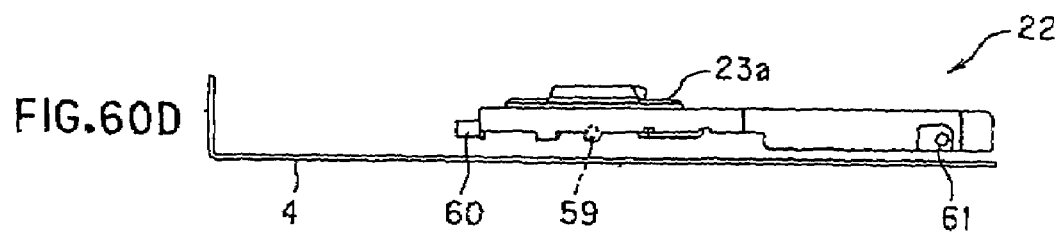

Also, with the base 27 being in the intermediate position shown in FIGS. 60A to 60D, the cam lever 56 is slid to the left end in the direction of arrow Y2 in FIG. 60A in conjunction with sliding of the driving lever 52 to the rear end in the direction of arrow X2 in FIG. 60A, so that the first spindle 59 will be positioned on the second horizontal surface 95c in the first cam groove 95 while the second spindle 60 will be positioned on the second horizontal surface 96c in the second cam groove 96 as shown in FIG. 60C. Thus, the base unit 22 is lowered to the intermediate position between the unchucking and chucking positions shown in FIG. 60D.

Figures 39A, 39B:
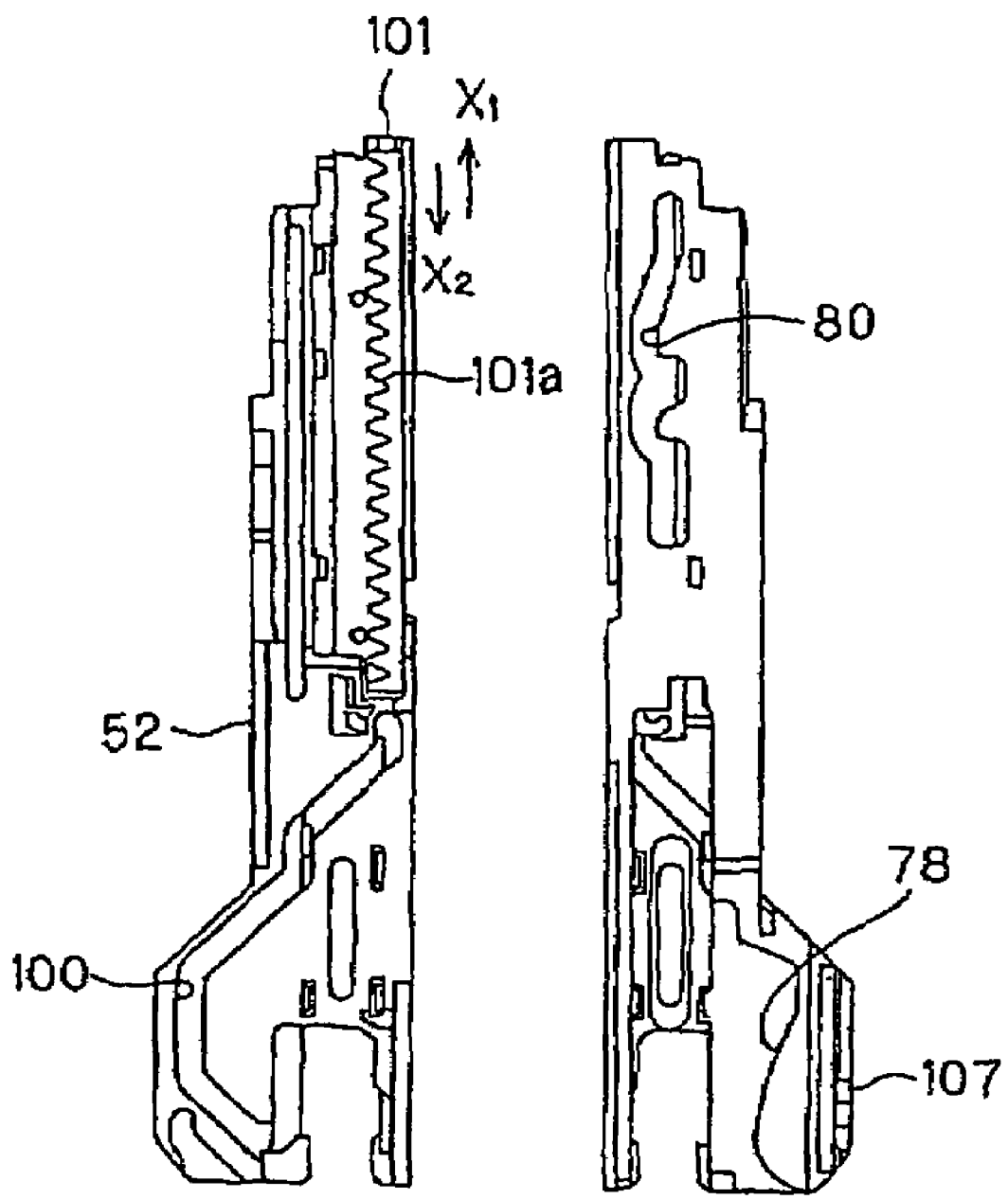
FIG. 39A is a plane view, from below, of the driving lever in operation to load the optical disc.
FIG. 39B is a plan view of the driver lever.
Figures 40A, 40B:
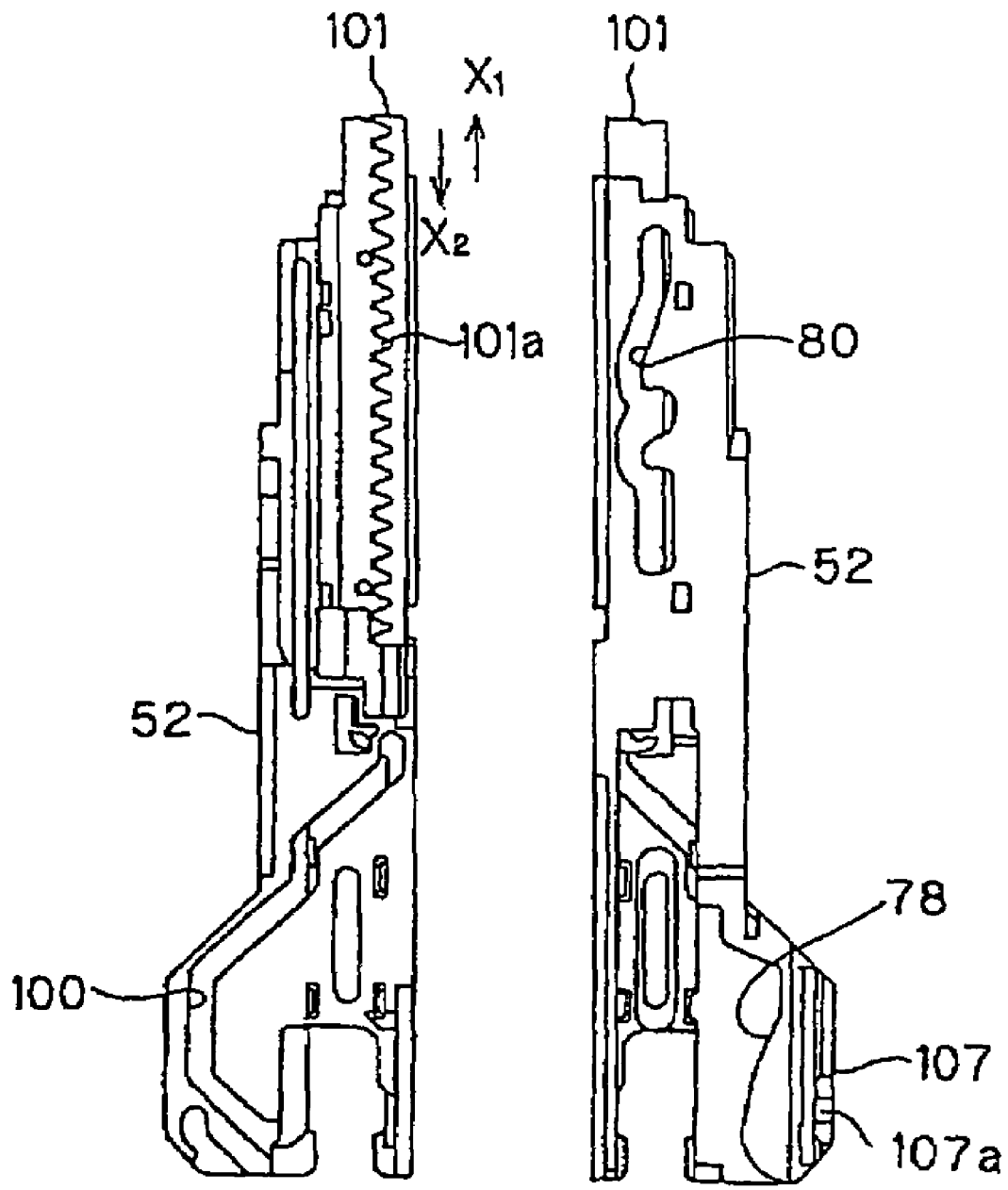
FIG. 40A is a plan view, from below, of the driving lever in operation to eject the optical disc.
FIG. 40B is a plan view of the driving lever.

At the front side of the driving lever 52, there is installed a rack member 101 slidable back and forth in the two directions of arrows X1 ands X2 in FIGS. 39A and 40A over a predetermined stroke in relation to the driving lever 52 as shown in FIGS. 39A, 39B, 40A and 40B. The rack member 101 has a rack 101a formed thereon in the back-and-forth direction. On the other hand, on the bottom of the bottom case 4, there are disposed a drive motor 102 included in the driving mechanism, a worm gear 103 fixed to the rotating shaft of the drive motor 102, and a gear train 104 to transmit the power of the drive motor from the worm gear 103 to the rack 101a as shown in FIG. 35.

Therefore, with the drive motor 102 being made to run in one direction as shown in FIG. 35, the driving mechanism moves the driving lever 52 and rack member 101 together toward the rear side in the direction of arrow X2 in FIGS. 35 and 39 with the rack member 101 being drawn in by means of the worm gear 103, hear train 104 and rack 101a toward the rear side of the driving lever 52 in the direction of arrow X2 in FIG. 35. On the other hand, with the drive motor 102 being made to run in the other direction as shown in FIG. 40, the driving mechanism moves the driving lever 52 and rack member 101 together toward the front side in the direction of arrow X1 in FIGS. 35 and 40A with the rack member 101 being drawn out by means of the worm gear 103, hear train 104 and rack 101a toward the front side of the driving lever 52 in the direction of arrow X1 in FIG. 35.

Figure 36:
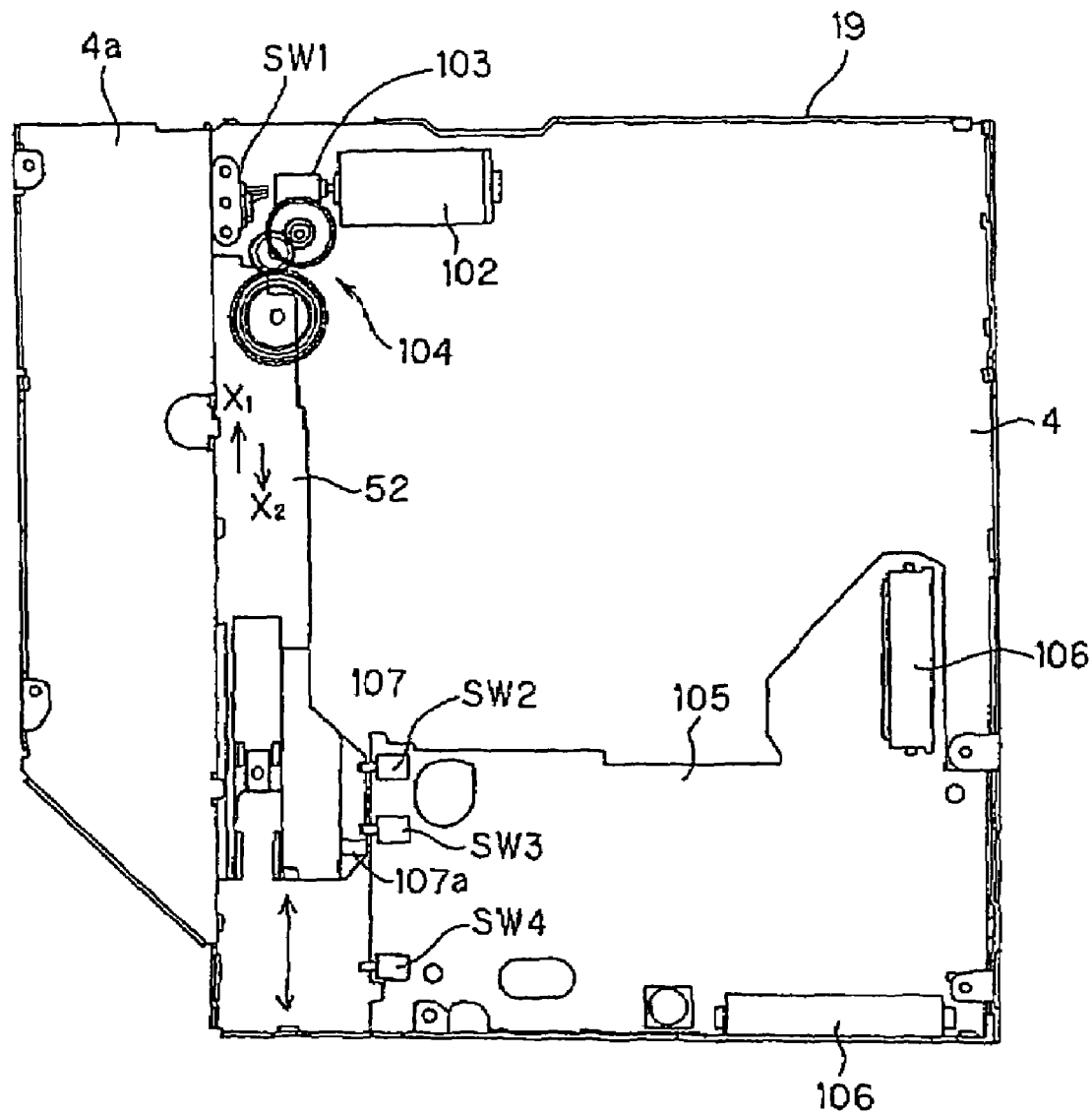
FIG. 36 is a plan view of the disc drive, showing the physical relation between the driving lever and detection switch.

Also, on the bottom of the bottom case 4, there is disposed a circuit board 105 having a driving control circuit formed thereon for various kinds of control as shown in FIG. 36. The circuit board 105 is screwed to the rear-side bottom of the bottom case 4. On the bottom of the bottom case 4 and circuit board 105, there are disposed electronic parts (not shown) such as IC chip etc. included in the driving control circuit, connector 106 for electrical connection between the component parts, first to fourth detection switches SW1, SW2, SW3 and SW4 for detection of movement of the components.

The driving control circuit detects the position of the driving lever 52 driven by the aforementioned driving mechanism on the basis of detection signals supplied from the first to fourth detection switches SW1 to SW4 actuated when the driving lever 52 is moved, and controls the driving mechanism to move the driving lever 52.

Of the four detection switches, the first one SW1 is disposed at the front end of the bottom case 4. The first detection switch SW1 is actuated by the front end of the driving lever 52 to detect when the driving lever 52 is moved to its initial position or is in the initial position, that is, when the disc drive 1 is in its initial state.

On the other hand, the other detection switches SW2, SW3 and SW4 are disposed at the end of the circuit board 9 opposite to the driving lever 52 in parallel with each other in the directions of arrows X1 and X2 in FIG. 36 in which the driving lever 52 is moved. These detection switches SW2, SW3 and SW4 are turned on and off by an actuator 107a provided at a portion of a cam 107 provided on the lateral side of the driving lever 52 as shown in FIGS. 37B and 37C when the driving lever 52 is moved in the direction of arrow X1 or X2 in FIG. 36.

Note here that the second detection switch SW2 is to be actuated by the actuator 107a on the driving lever 12 when the driving lever 52 has been moved to a position where the optical disc 2 loaded in the disc drive is ejected, the third detection switch SW3 is to be actuated by the actuator 107a when the driving lever 52 has been moved to a position where the optical disc 2 is inserted into the disc drive and the fourth detection switch SW4 is to be actuated by the actuator 107a when the driving lever 52 has been moved to a position where information signals can be written to or read from the optical disc 2 chucked on the turn-table 23a.

Figure 61:
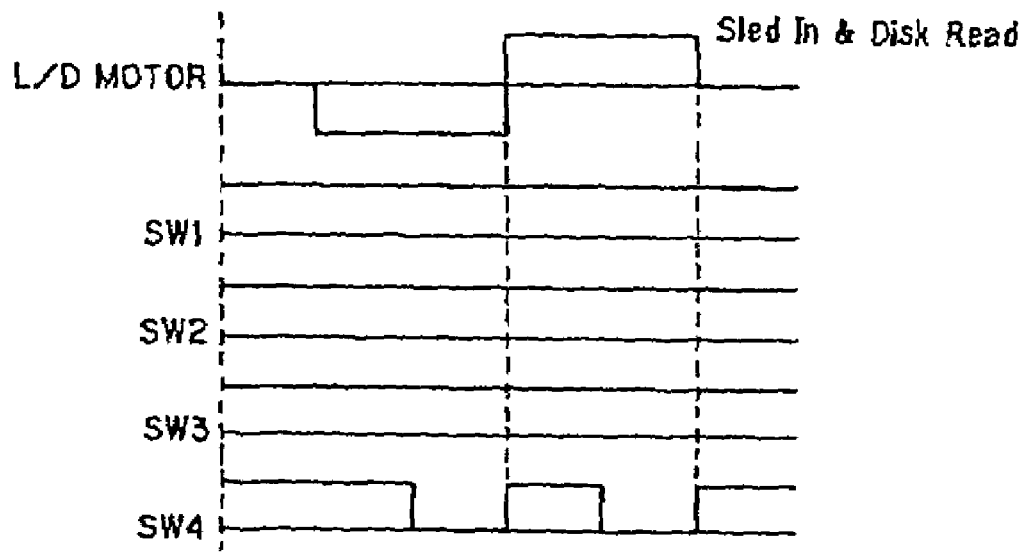
FIG. 61 diagrammatically illustrates the selection of one of the first, second, third and fourth switches at the initial operation with an optical disc being inserted in the disc drive.

The disc drive 1 constructed as above is controlled as will be described in detail below:

When the disc drive 1 is out of operation with no power supply thereto with the optical disc 2 being inserted to a position inside the disc drive 1 where the disc drive 1 can write or read information signals to or from the optical disc 2, the driving lever 52 is controlled according to a timing diagram shown in FIG. 61. When the disc drive 1 is out of operation with no power supply thereto without any optical disc 2 being loaded in the disc drive 1, the driving lever 52 is controlled according to a timing diagram shown in FIG. 62.

Note that when the power is supplied to the disc drive 1, the drive motor 102 is made to run in the other direction to move the driving lever 52 in the direction of arrow X1 in FIG. 36 irrespectively of whether the optical disc 2 is inserted or not inserted in the disc drive 1. At this time, when it is detected that the fourth detection switch SW4 is turned on by the actuator 107a as shown in FIG. 61, it is meant that the driving lever 52 is drawn in toward the inner rear side in the disc drive 1 and the optical disc 2 is inserted to a position where information signals can be written to or read from the optical disc 2.

Note here that when it is detected that the fourth detection switch SW4 is actuated and the optical disc 2 is in the position where information signals can be written to or read from the optical disc 2, the drive motor 102 having been made to run in the other direction is switched to run in the one direction, the driving lever 52 is moved in the direction of arrow X2 in FIG. 36 and the base unit 22 once moved to a position where the optical disc is to be chucked is moved to the intermediate position, thereby permitting to write or read information signals to or from the optical disc 2.

When a write or read command is supplied from the disc drive 1 or personal computer 1000 in the above state, namely, with the optical pickup being ready to make write to or read from the optical disc 2, information signals are written to or read from the optical disc 2.

Figure 62:
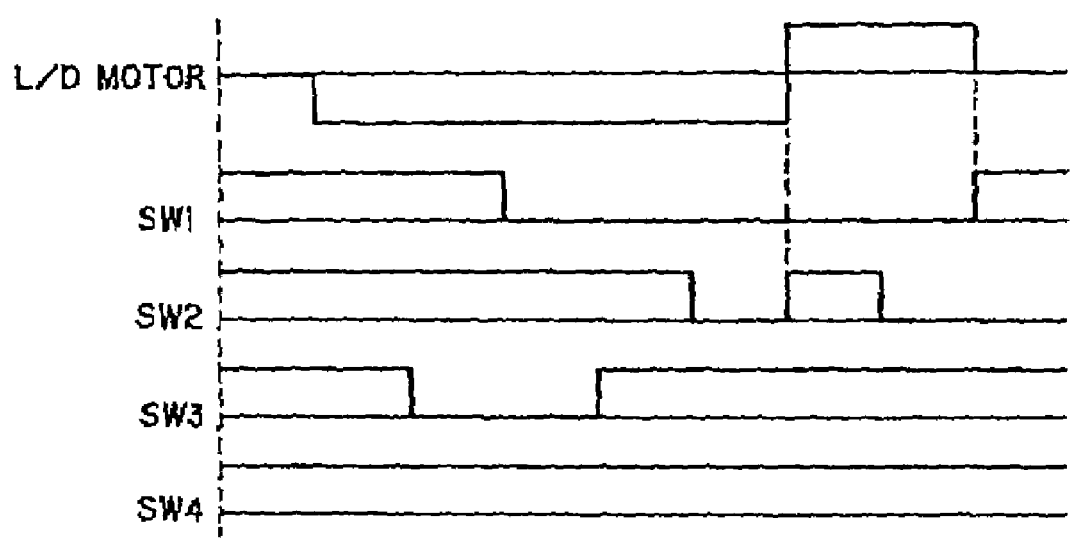
FIG. 62 diagrammatically illustrates the selection of one of the first, second, third and fourth switches at the initial operation with no optical disc being inserted in the disc drive.

Also when no power is supplied to the disc drive 1 with no optical disc 2 being loaded in the disc drive 1, the drive motor 102 is made to run in the other direction as in FIG. 62 to move the driving lever 52 once in the direction of arrow X1 in FIG. 36. While the movement of the driving lever 52 is being controlled, the first, second and third detection switches SW1, SW2 and SW3 are controlled according to the timing diagram shown in FIG. 62. When the second detection switch SW2 once turned off is turned on again, the drive motor 102 is made to run in the one direction to move the driving lever 52 in the direction of arrow X1 in FIG. 36 to actuate the first detection switch SW1. Then, the drive motor 102 is stopped from running and the driving lever 52 is set in its initial position at the front side of the housing 3.

Figure 63:
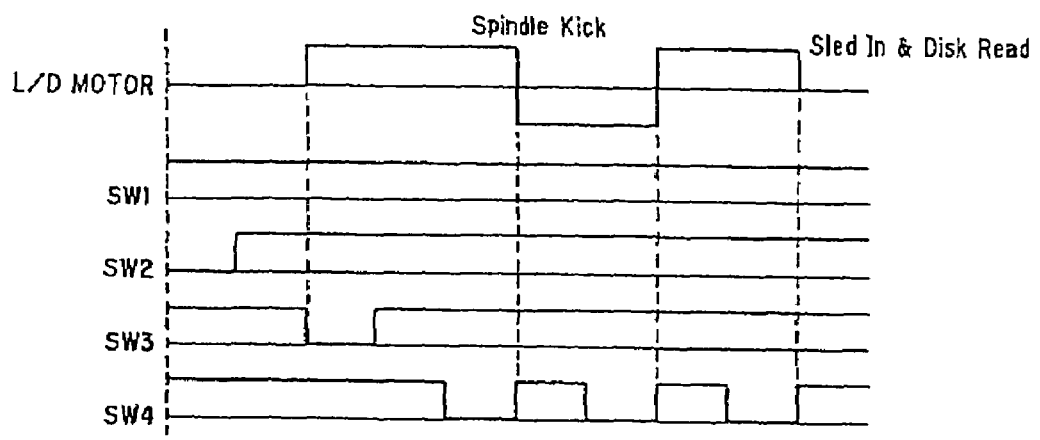
FIG. 63 diagrammatically illustrates the selection of one of the first, second, third and fourth switches when an optical disc is loaded into the disc drive.

The disc drive 1 will be supplied with the power, the position of the driving lever 52 is controlled according to the timing diagram shown in FIG. 62 and the disc drive 1 be initialized for enabling the optical disc 2 to be inserted and then the large-diameter optical disc 2A be inserted through the disc slot 19 in the housing 3, as will be described below:

First, when the large-diameter optical disc 2A is inserted from the disc slot 19 of the housing 3, the movement of the driving lever 52 is controlled according to the timing diagram shown in FIG. 63 to load the optical disc 2A as shown in FIGS. 41 to 44.

Figure 41:
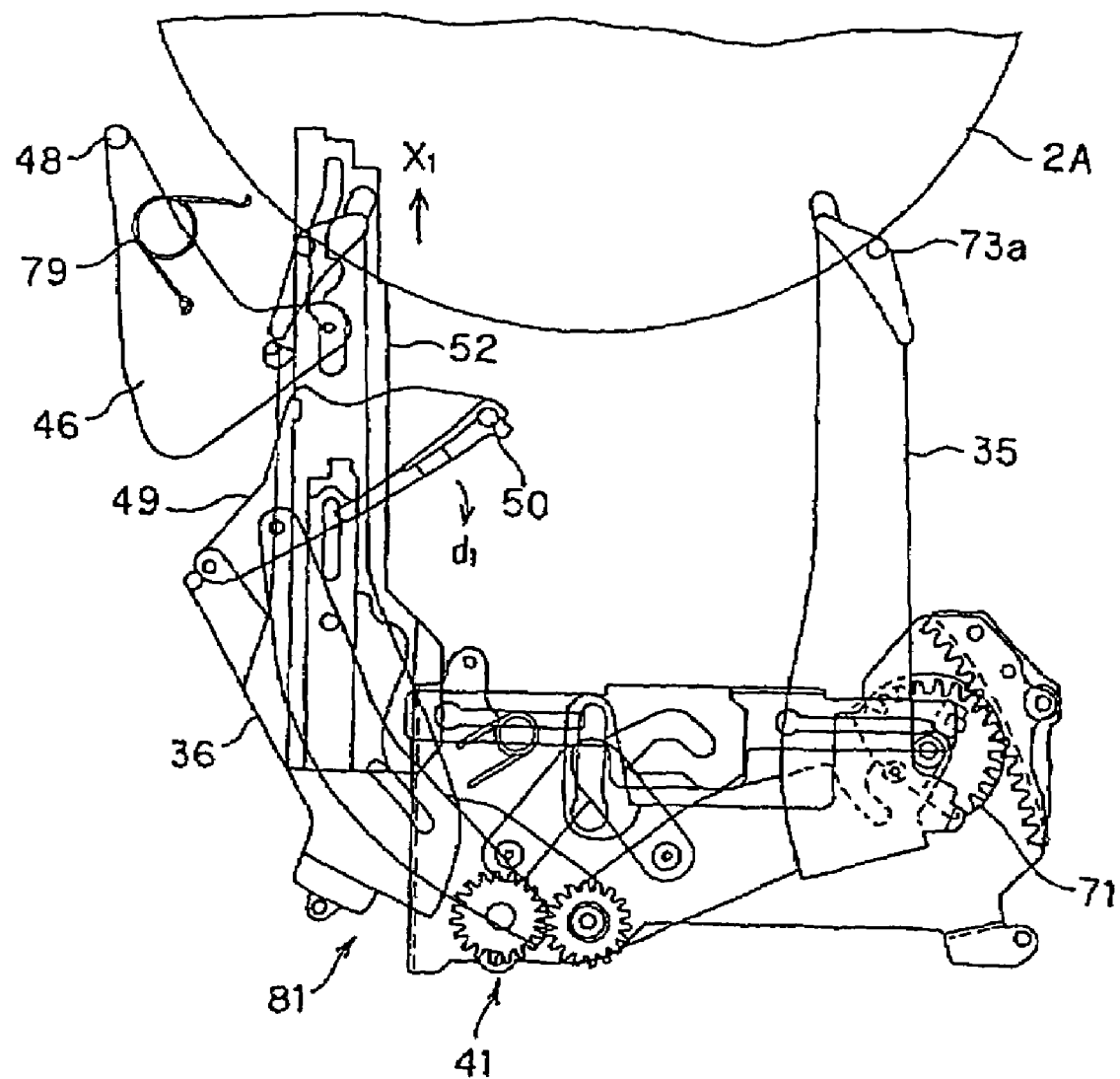
FIG. 41 is a plan view of the disc drive into which a large-diameter optical disc is being inserted.

More particularly, first in the initial state in which the large-diameter optical disc 2A is inserted as shown in FIG. 41, the abutment pin 76a of the pushing lever 76 shown in FIG. 34 is put into abutment with the driving lever 52 that is thus forced toward the front side in the direction of arrow X1 in FIG. 41. Also, the cam pin 76b of the pushing lever 76 presses the cam groove 78 in the driving lever 52 in which there will thus develop a thrust for movement of the driving lever 52 to the front side in the direction of arrow X1 in FIG. 41.

Figure 42:
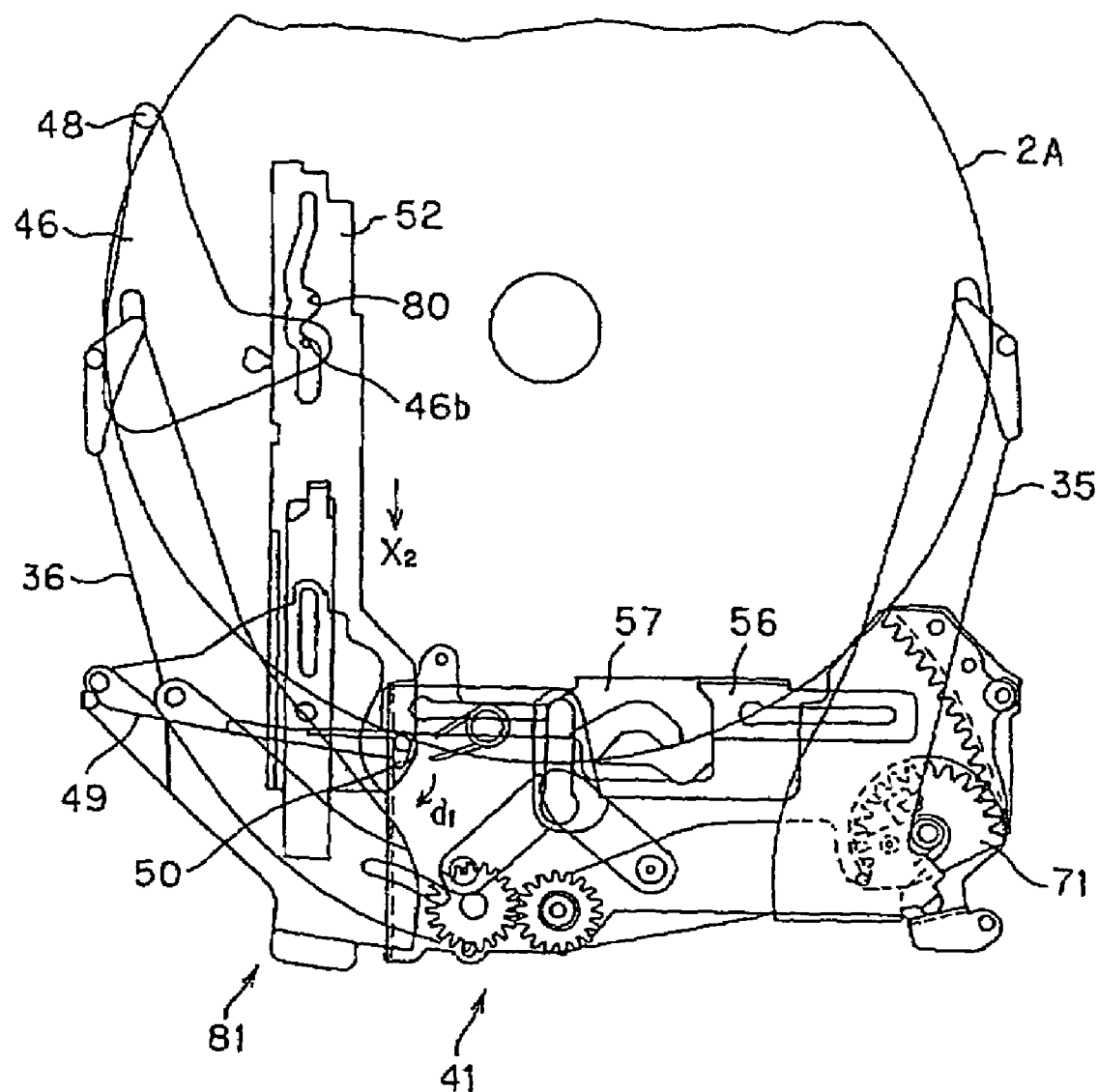
FIG. 42 is a plan view of the disc drive into which the large-diameter optical disc is being loaded.

Next, for loading the large-diameter optical disc 2A shown in FIG. 42, when the fourth pivoting arm 49 pressed to the optical disc 2A is moved toward the rear side in the direction of arrow d1, the driving lever 52 is slid by the linking mechanism 81 toward the rear side in the direction of arrow X2 in FIG. 42. At this time, the cam pin 46b of the third pivoting arm 46 will be limited from moving in the cam groove 80 in the driving lever 52. Thus, the sliding member 92 is moved in relation to the driving lever 52 toward the rear side in the direction of arrow X2 in FIG. 35 against the force of the first extension coil spring 93a. Then, when the third pivoting arm 46 takes a predetermined angular position, that is, when the optical disc 2A can be drawn in, the driving lever 52 is moved over a predetermined stroke toward the rear side in the direction of arrow X2 in FIG. 42, it is detected by the driving control circuit when the third detection switch SW3 is switched to another state, the drive motor 102 is made to run in the one direction, and the driving lever 52 is moved by the drive motor 102 in the direction of arrow X2 in FIG. 36.

Figure 43:
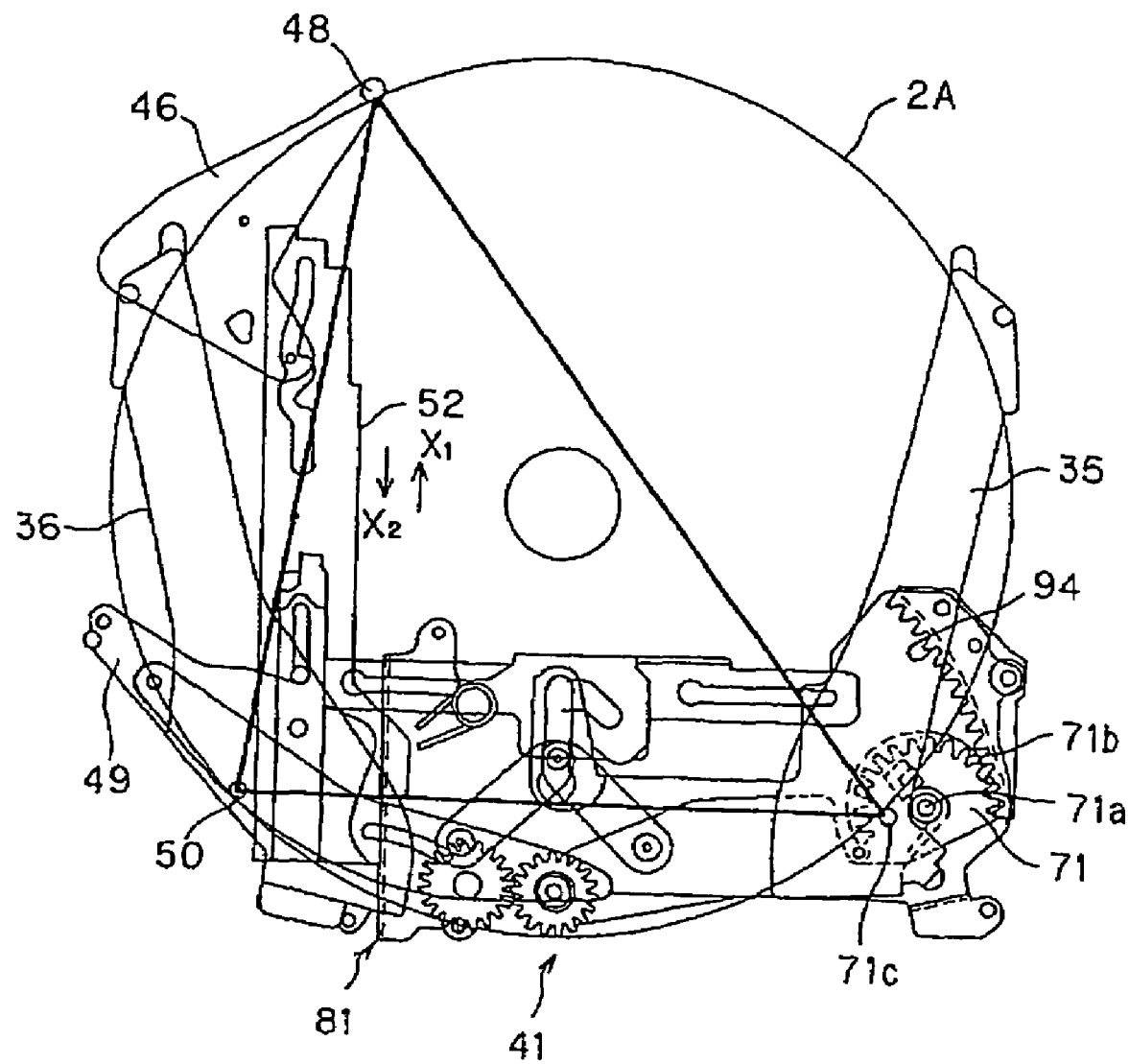
FIG. 43 is a plan view of the disc drive in which the loaded large-diameter optical disc is centered.
Figure 44:
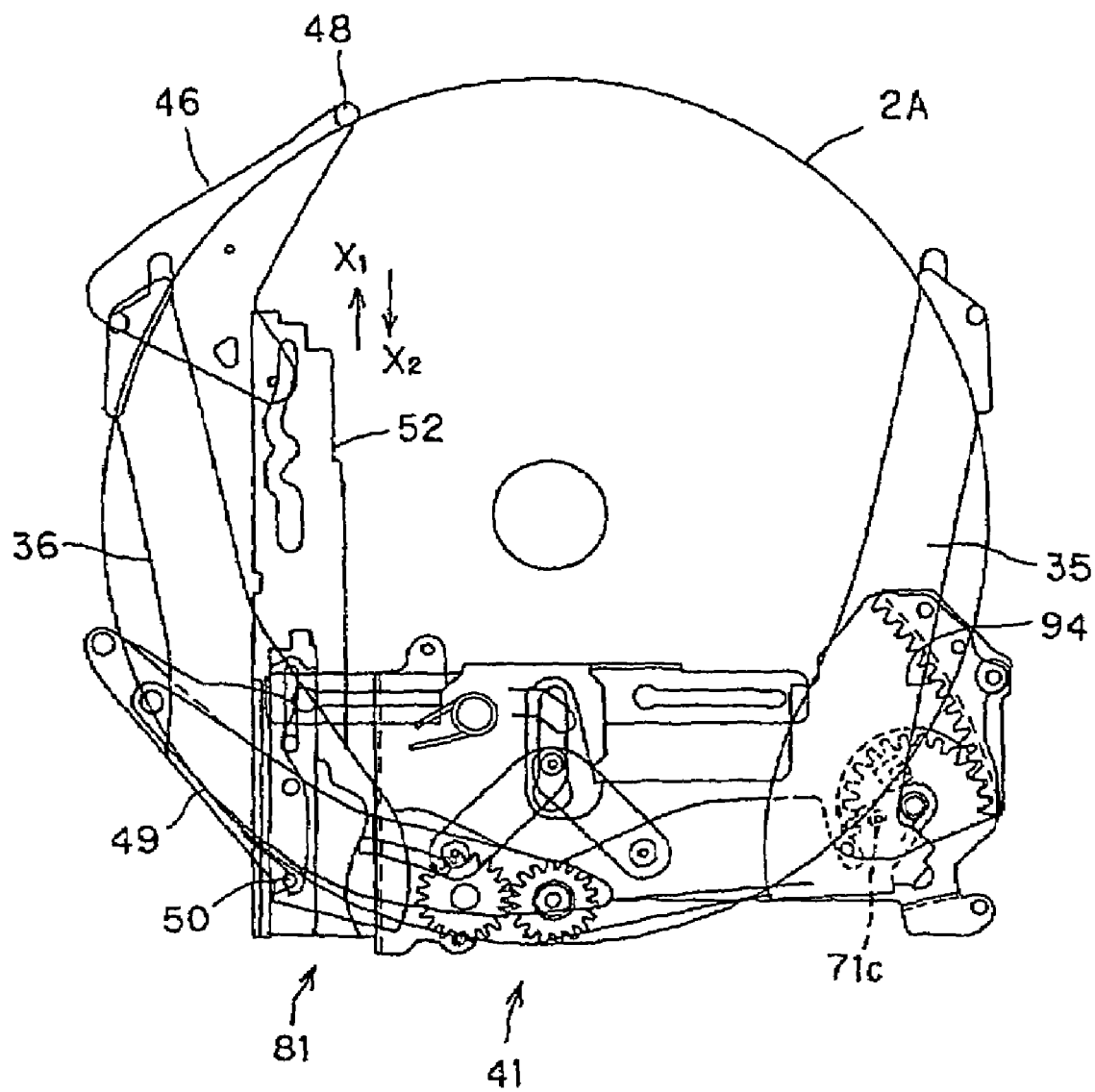
FIG. 44 is a plan view of the disc drive in which the large-diameter optical disc is chucked on the turn-table.

Then, with the large-diameter optical disc 2A being centered for the chucking mechanism 28 to be engaged in the central hole 2a, the optical disc 2A is centered among the third abutment member 48 of the third pivoting arm 46, fourth abutment member 50 of the fourth pivoting arm 49 and fifth abutment member 71c of the fifth pivoting member 71 as shown in FIG. 43. Thus the optical disc 2A is completely chucked as shown in FIG. 44. This disc chucking is effected with the drive motor 102 is made to change its running direction from the one direction to the other direction as shown in FIG. 63 to control the position of driving lever 52 for lifting the base unit 22.

Note that in the disc drive 1, the base unit 22 is elevated to the chucking position for a first chucking to set the large-diameter optical disc 2A on the turn-table 23a, the base unit 22 is lowered to the intermediate position and the spindle motor 24a rotates the optical disc 2A. After the optical disc 2A has the phase thereof shifted, the base unit 22 is elevated to the chucking position again and a second chucking is made to set the optical disc 2A on the turn-table 23a.

Figure 45:
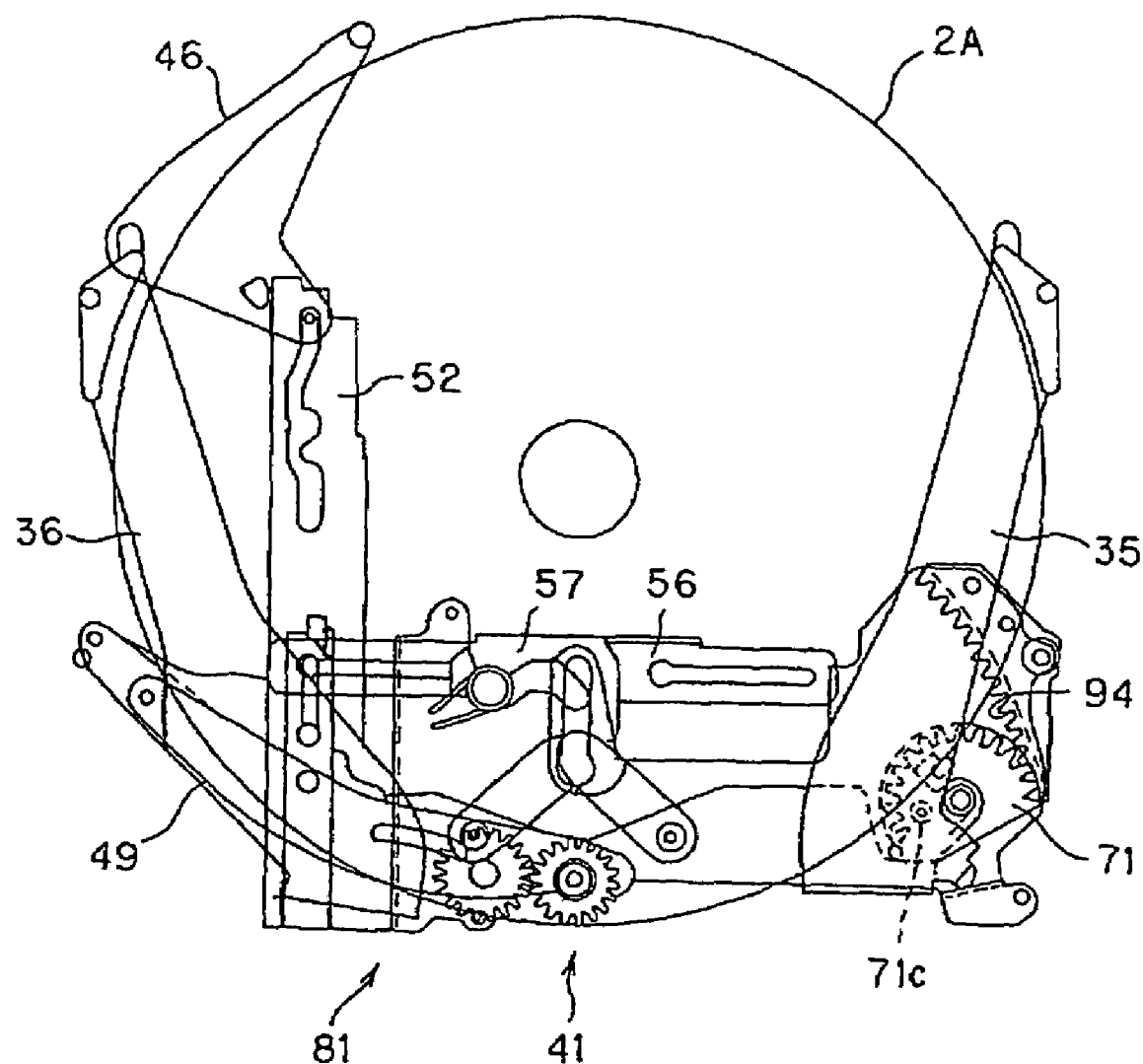
FIG. 45 is a plan view of the disc drive ready for writing or reading information signals to or from the large-diameter optical disc.

Next, for writing or reading information signals to or from the large-diameter optical disc 2A shown in FIG. 45, the third abutment member 48 of the third pivoting arm 46, fourth abutment member 50 of the fourth pivoting arm 49 and the fifth abutment member 71c of the fifth pivoting member 71 leave the periphery of the optical disc 2A.

Figure 46:
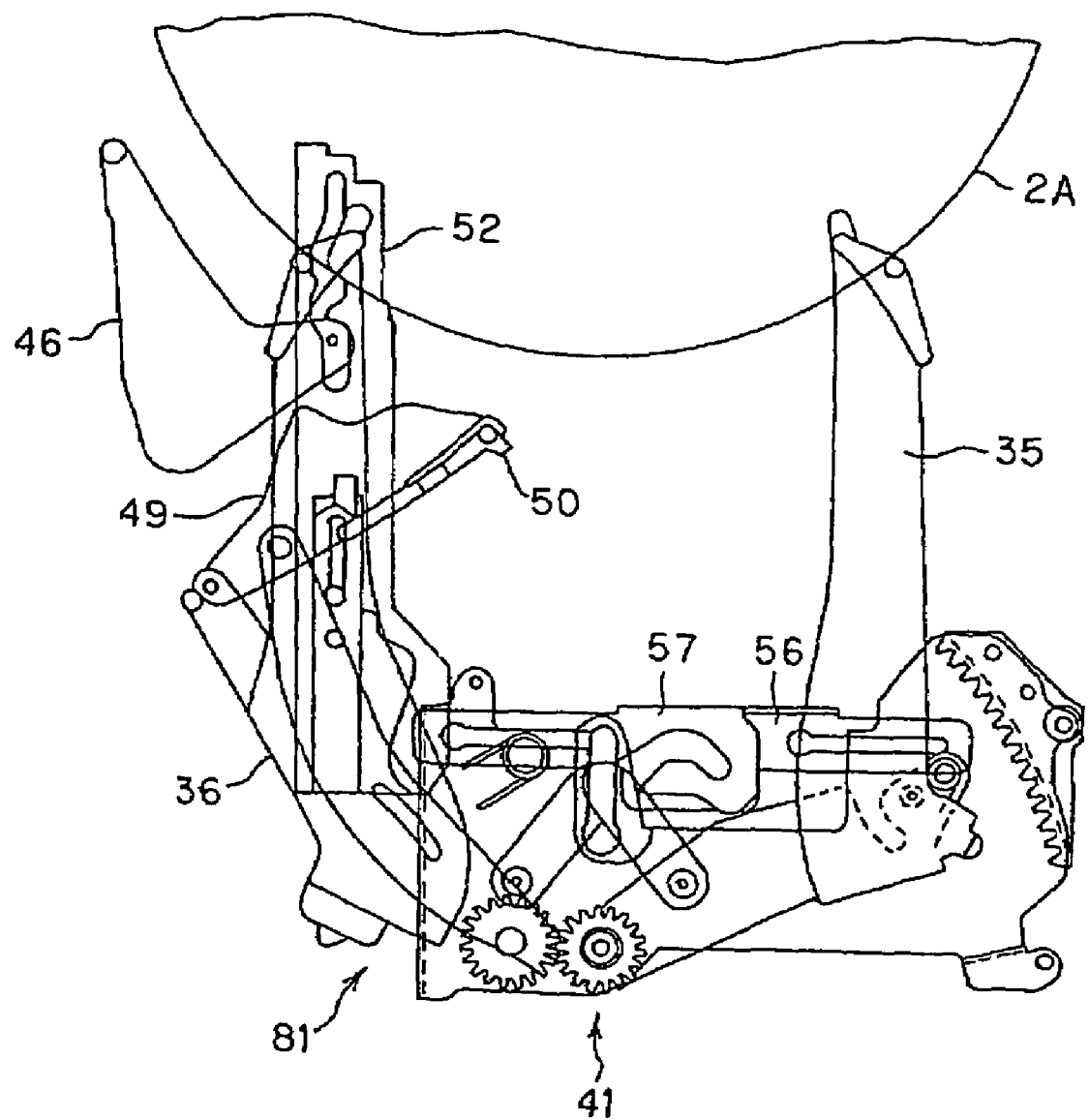
FIG. 46 is a plan view of the disc drive ready for ejection of the large-diameter optical disc.
Figure 47:
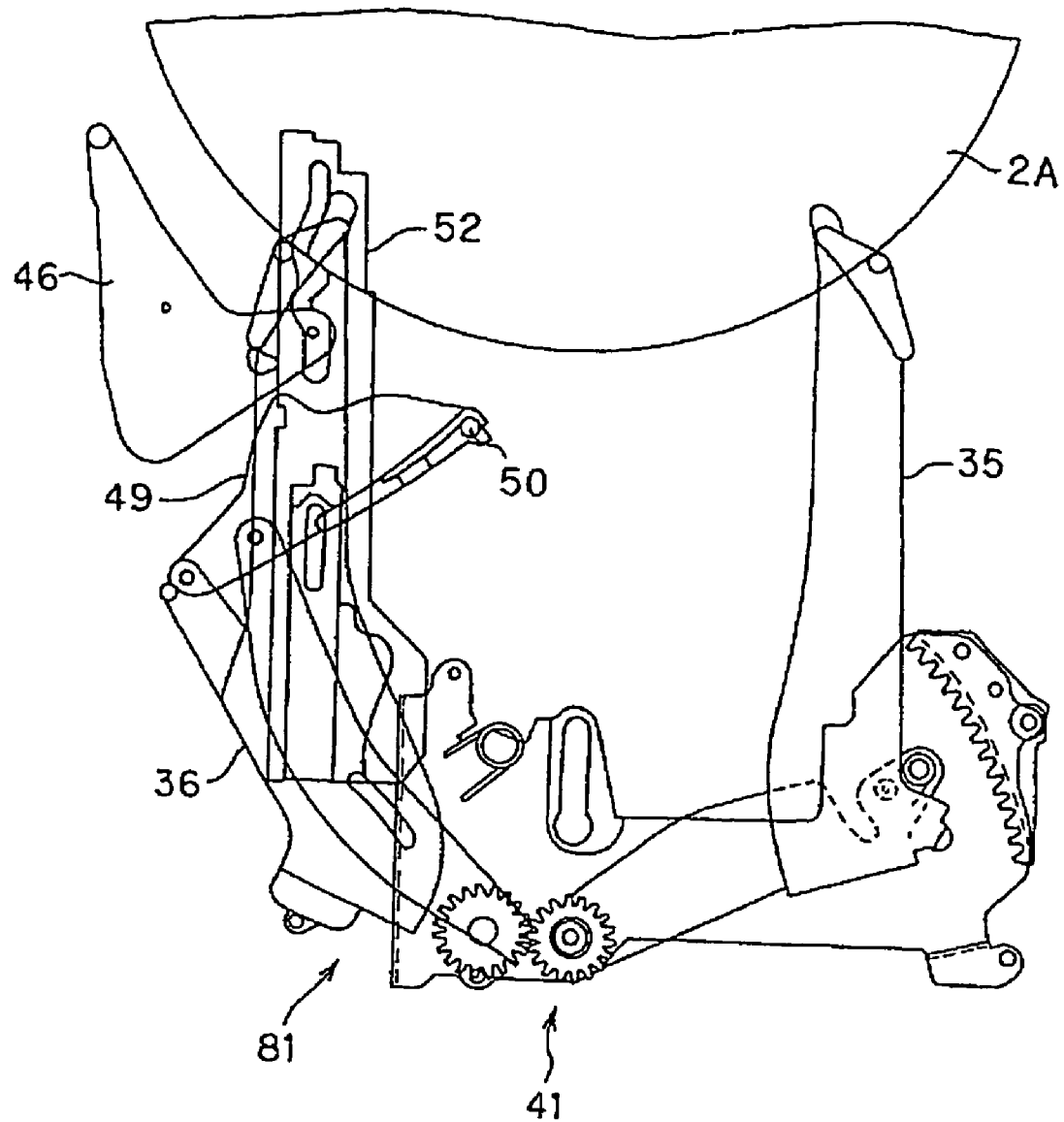
FIG. 47 is a plan view of the disc drive from which the large-diameter optical disc has been ejected.
Figure 64:
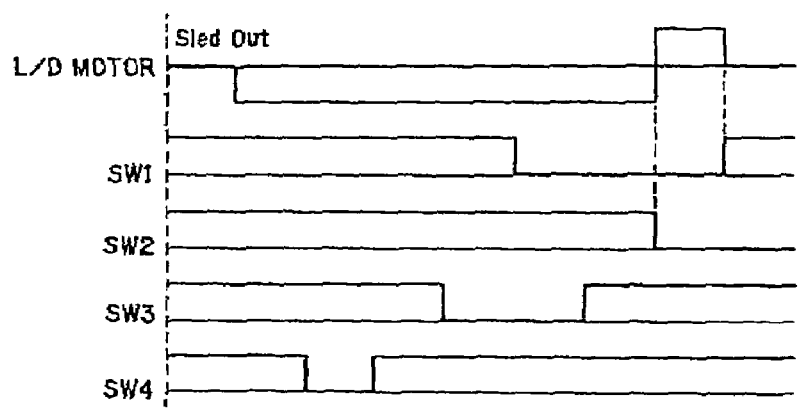
FIG. 64 diagrammatically illustrates the selection of one of the first, second, third and fourth switches when a large-diameter optical disc is ejected from the disc drive.

On the other hand, in the disc drive 1, the large-diameter optical disc 2A is ejected from on the turn-table 23a as shown in FIGS. 46 and 47 by controlling the running direction of the drive motor 102 and controlling the movement of the driving lever 52 according to the timing diagram shown in FIG. 64.

For ejecting the large-diameter optical disc 2A, the spindle 47 in the spindle hole 46a in the third pivoting arm 46 is shifted to another position as shown in FIG. 34 to pivot the third pivoting arm 46 in a direction away from the periphery of the optical disc 2A in an earlier timing than in the disc loading as shown in FIG. 46.

Figure 56:
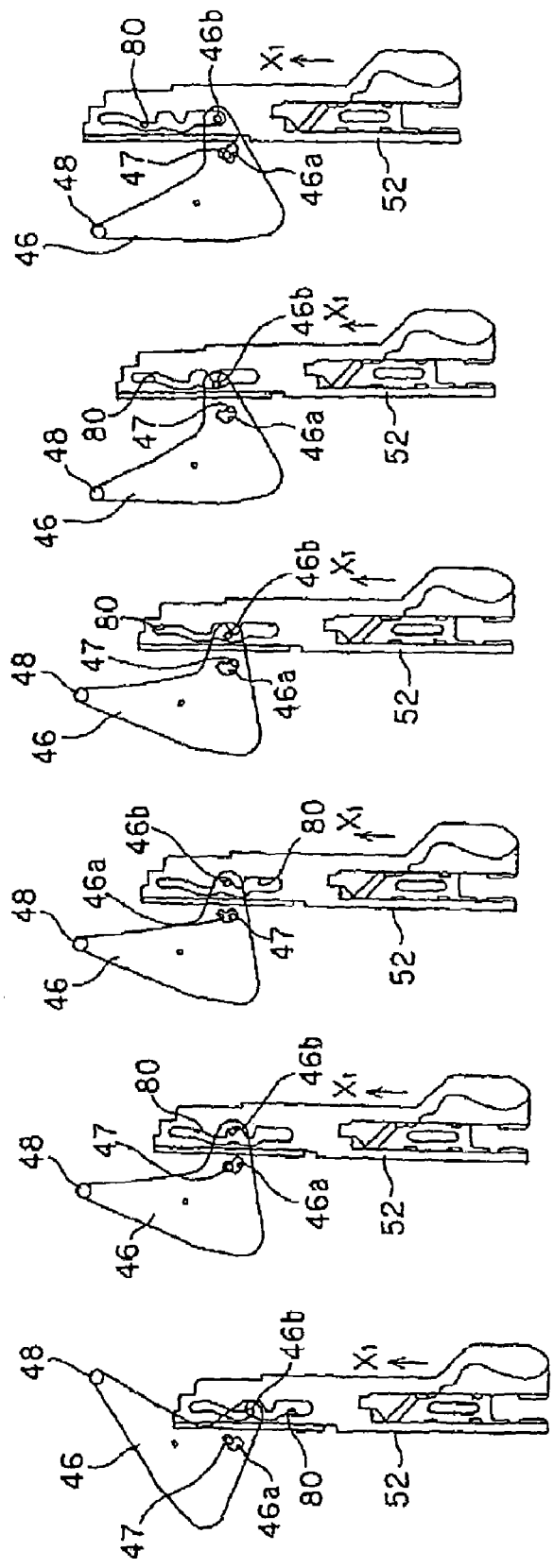
FIGS. 56A to 56F are plan views showing actions of the third pivot arm for ejecting an optical disc.

More specifically, the third pivoting arm 46 is first pivoted from the state shown in FIG. 56A to a state shown in FIG. 56B in conjunction with sliding of the driving lever 52 toward the front side in the direction of arrow X1. At this time, the cam pin 46b slides in a portion, bent to the right in the place of the drawing, of the cam groove 80, so that the third pivoting arm 46 is pivoted counterclockwise.

In the state shown in FIG. 56C, the cam pin 44b abuts the inclined surface in the cam groove 80, so that the third pivoting arm 46 is pressed to the left in the drawing. At this time, the spindle 47 passes by the lower straight line portion of an L-shaped portion of the spindle hole 46a. Then, the large-diameter optical disc 2A is ready for ejection.

Next, in the state shown in FIG. 56D, the spindle 47 is shifted to the right end of the L-shaped portion of the spindle hole 46a, so that the third pivoting arm 46 is fully opened taking the right end of the spindle hole 46a as the center of pivoting.

Then, in the state shown in FIG. 56E, the third pivoting arm 46 is forced by the torsional coil spring 79 and thus the spindle 47 is shifted to the left end of the L-shaped portion of the spindle hole 46a. The state before the loading is restored as shown in FIG. 56F.

In the disc drive 1, the above-mentioned shifting of the center of pivoting of the third pivoting arm 46 permits to prevent the third pivoting arm 46 from abruptly being opened from the state in which the second extension coil spring 93b is extended for the disc ejection, which assures stable ejection of the large-diameter optical disc 2A.

On the contrary, when the small-diameter optical disc 2B is introduced from the disc slot 19 in the housing 3, the movement of the driving lever 52 is controlled according to the timing diagram shown in FIG. 63 as in the insertion of the large-diameter optical disc 2A and the optical disc 2B is loaded as shown in FIGS. 48 to 52.

Figure 48:
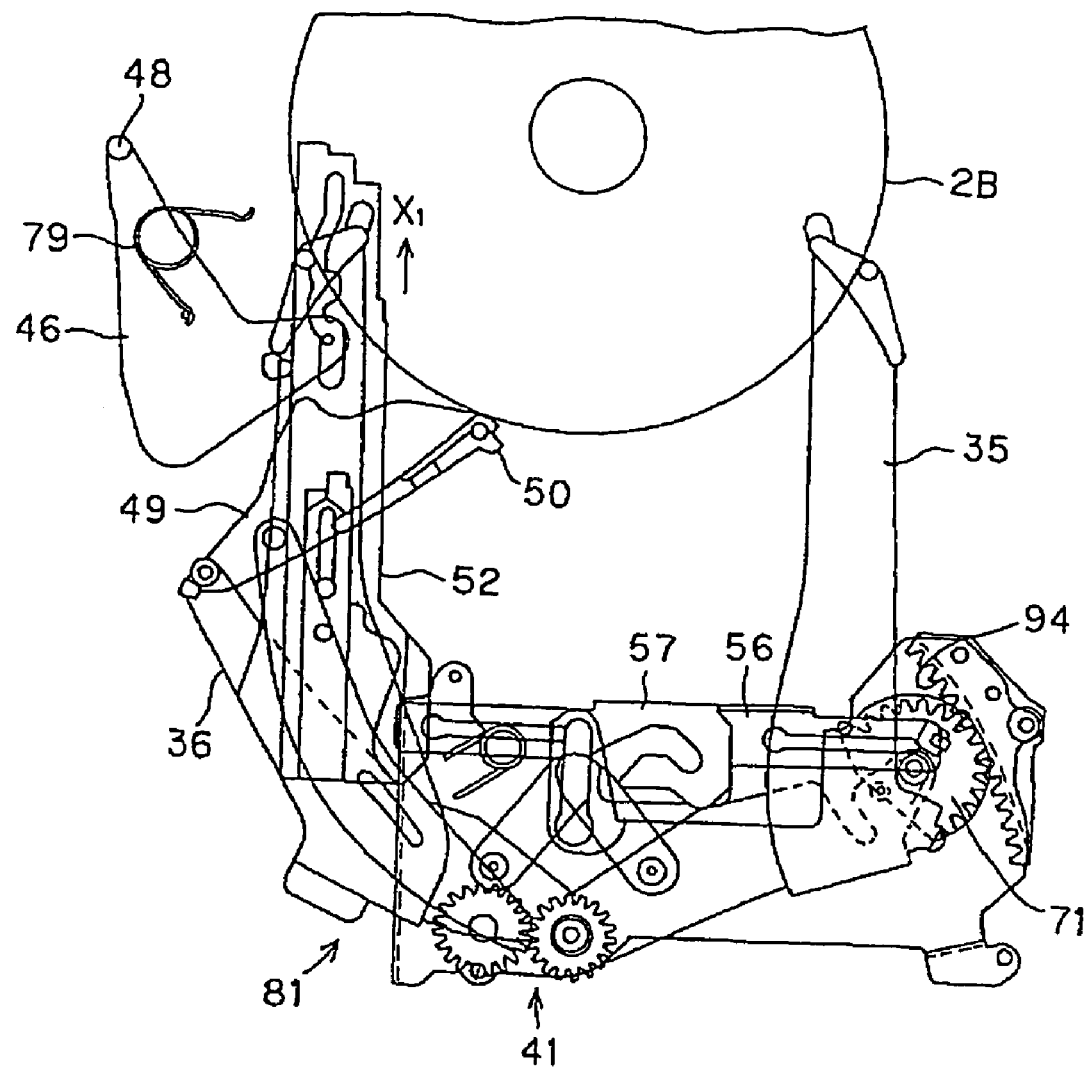
FIG. 48 is a plan view of the disc drive into which a small-diameter optical disc is being inserted.
Figure 49:
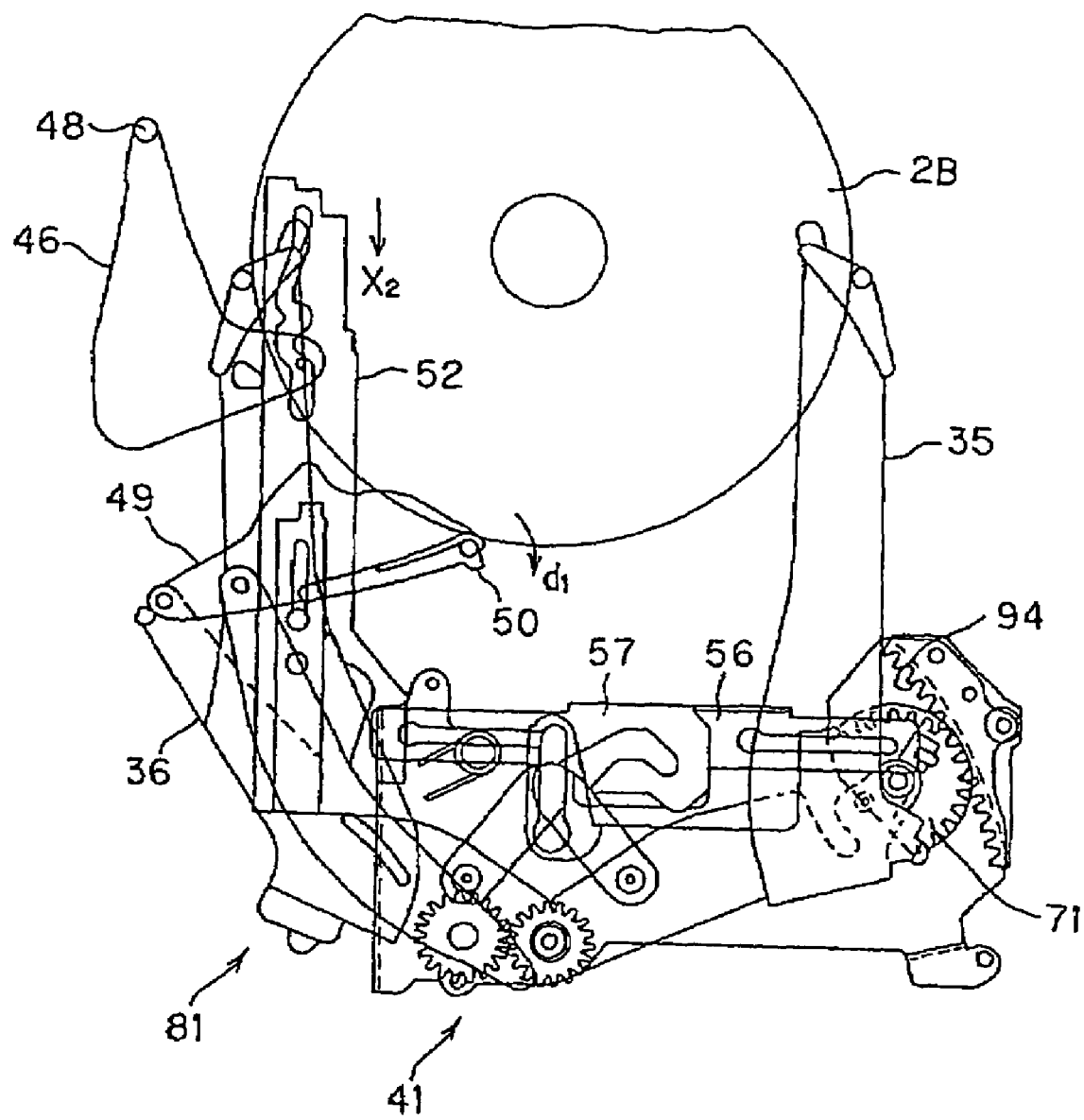
FIG. 49 is a plan view of the disc drive into which the small-diameter optical disc is being loaded.

More particularly, for starting insertion of the small-diameter optical disc 2B into the disc drive 1, the abutment pin 76a of the pushing lever 76 is first made to abut the driving lever 52 which is thus forced toward the front side in the direction of arrow X1 in FIG. 48. The cam pin 76b on the pushing lever 76 pushes the cam grove 78 in the driving lever 52, and thus there will develop a thrust for movement of the driving lever 52 toward the front side in the direction of arrow X1 in FIG. 48.

Next, the small-diameter optical disc 2B is inserted deeper in the disc drive 1. In the state shown in FIG. 49 in which the disc loading is started, when the fourth pivoting arm 49 pressed to the optical disc 2B is pivoted toward the rear side in the direction of arrow d1 in FIG. 49, the driving lever 52 is slid by the linking mechanism 81 toward the rear side in the direction of arrow X2 in FIG. 49. When it is detected by the driving control circuit that the driving lever 52 has been moved over a predetermined stroke in the direction of arrow X2 in FIG. 49, the drive motor 102 starts running in the one direction. As the cam pin 46b of the third pivoting arm 46 is moved in the cam groove 80 in the driving lever 52, the third pivoting arm 46 is pivoted in a direction in which the optical disc 2B is drawn in with the third abutment member 48 being in abutment with the periphery of the optical disc 2B.

Figure 50:
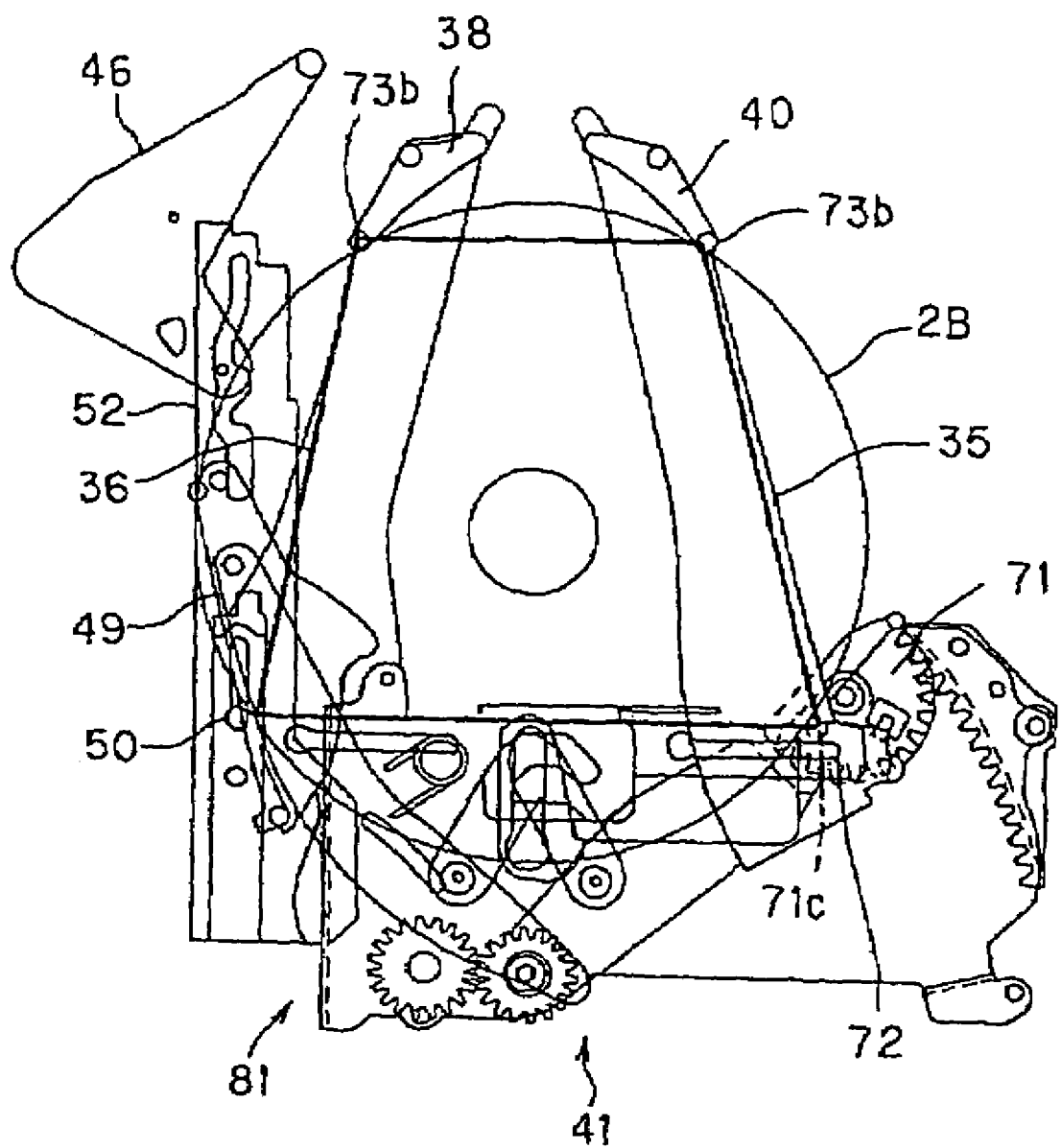
FIG. 50 is a plan view of the disc drive in which the inserted small-diameter optical disc is centered.
Figure 51:
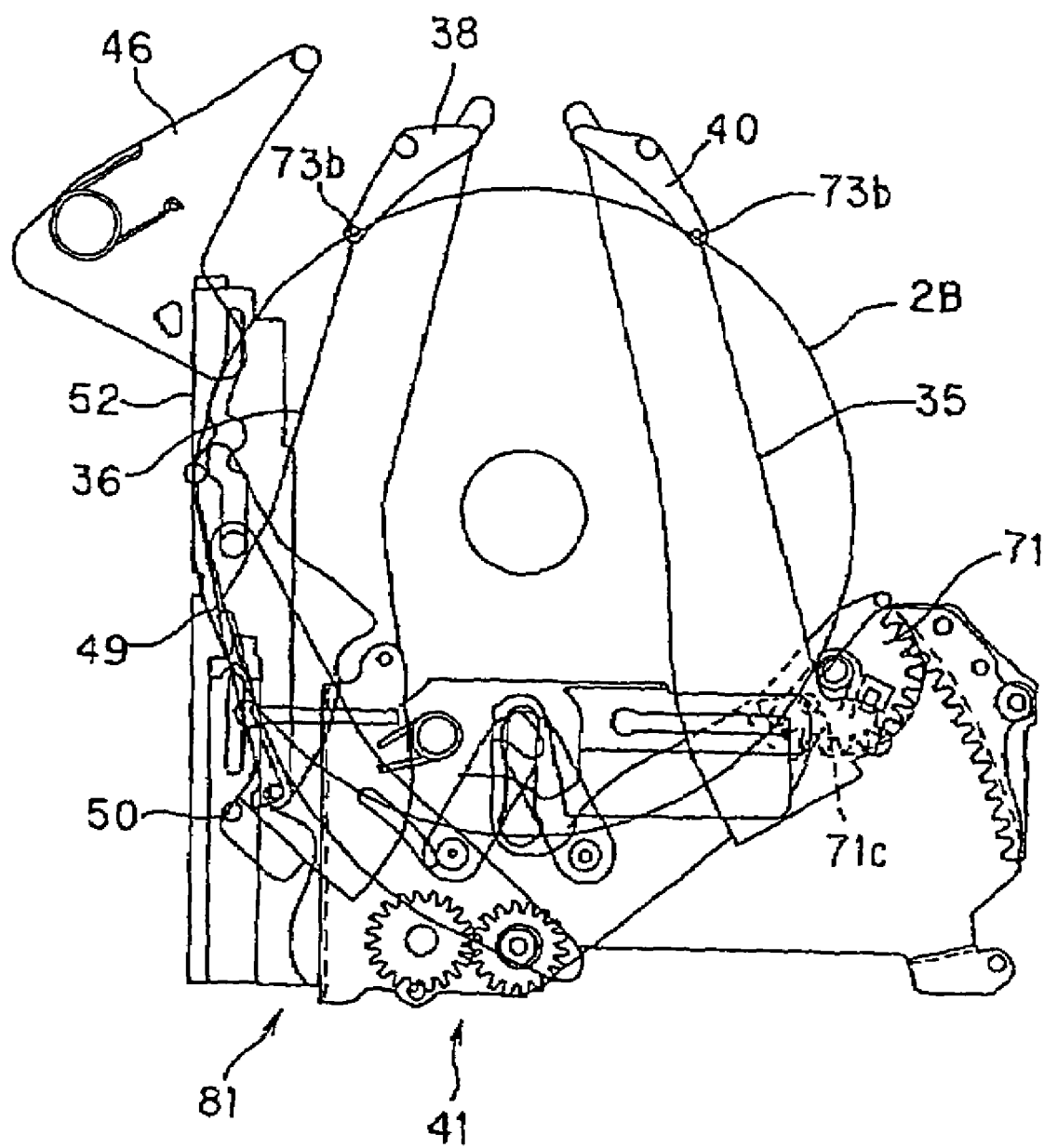
FIG. 51 is a plan view of the disc drive in which the small-diameter optical disc is chucked on the turn-table.

Then, with the small-diameter optical disc 2B being centered for the chucking mechanism 28 to be engaged in the central hole 2a, the optical disc 2B is centered among the rear-side rotating roller 73b provided on the first front-side abutment member 38 of the first pivoting arm 35, rear-side rotating roller 73b provided on the front-side abutment member 40 of the second pivoting arm 36, fourth abutment member 50 of the fourth pivoting arm 49 and the fifth abutment member 71c provided on the fifth pivoting member 71 as shown in FIG. 50. Thus the optical disc 2B is completely chucked as shown in FIG. 51.

Note that in the disc drive 1, the base unit 22 is elevated to the chucking position for a first chucking to set the small-diameter optical disc 2B on the turn-table 23a, the base unit 22 is lowered to the intermediate position and the spindle motor 24a rotates the optical disc 2B. After the optical disc 2B has the phase thereof shifted, the base unit 22 is elevated to the chucking position again and a second chucking is made to set the optical disc 2B on the turn-table 23a.

Figure 52:
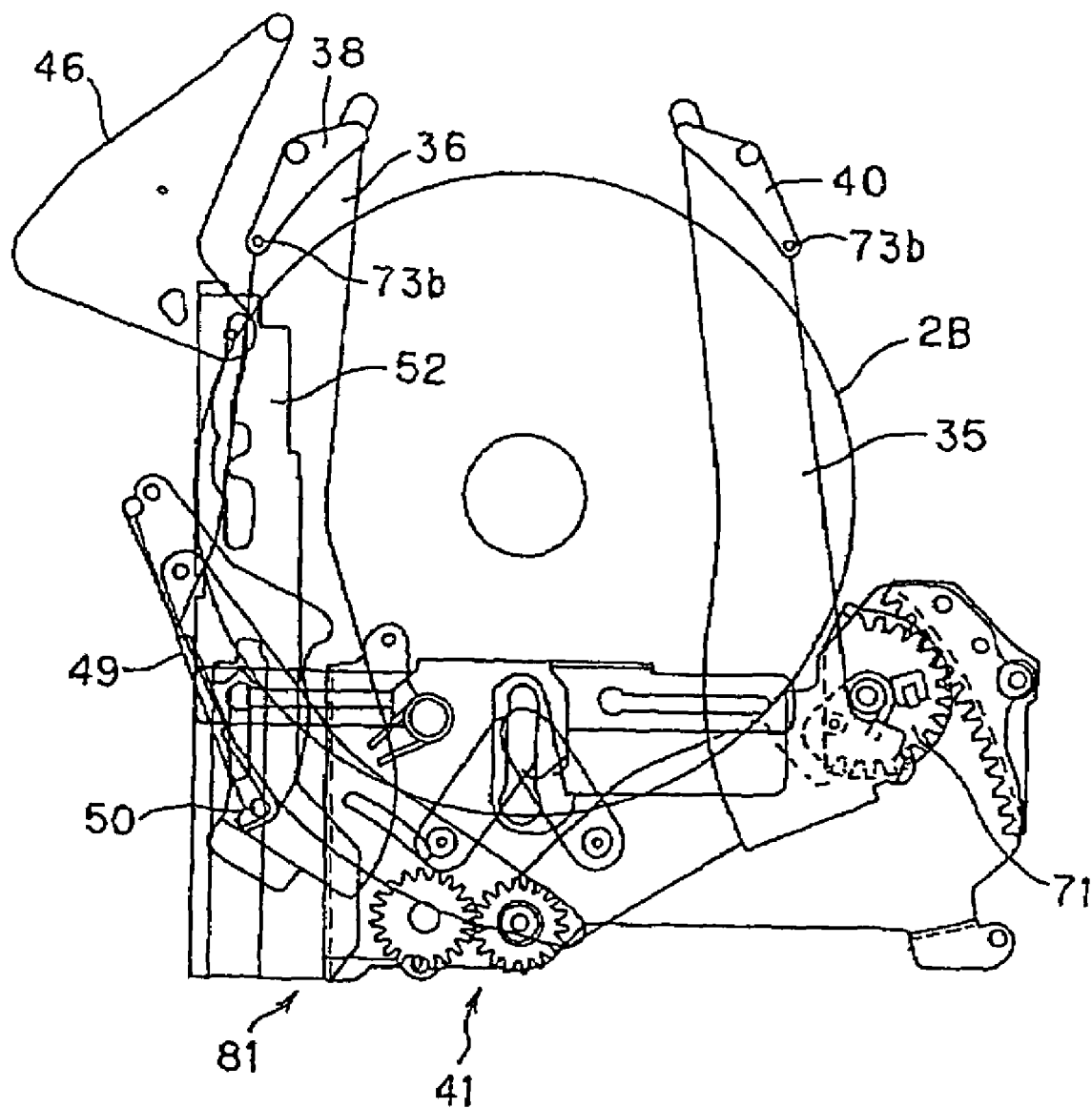
FIG. 52 is a plan view of the disc drive ready for writing or reading information signals to or from the small-diameter optical disc.

Next, for writing or reading information signals to or from the small-diameter optical disc 2B shown in FIG. 52, the rear-side rotating roller 73b provided on the first front-side abutment member 38 of the first pivoting arm 35, rear-side rotating roller 73b provided on the front-side abutment member 40 of the second pivoting arm 36, fourth abutment member 50 of the fourth pivoting arm 49 and the fifth abutment member 71c provided on the fifth pivoting member 71 leave the periphery of the optical disc 2B.

Figure 53:
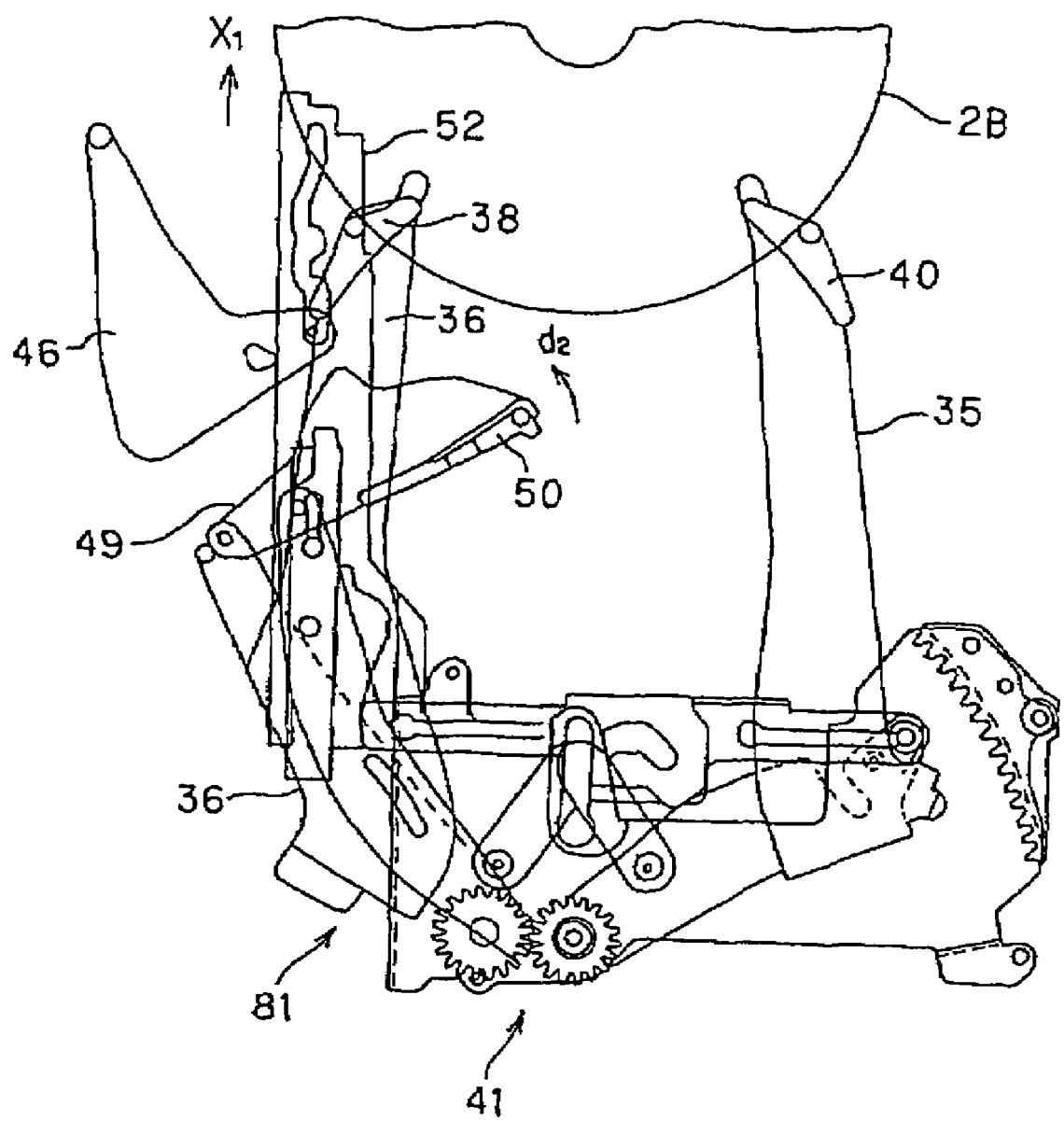
FIG. 53 is a plan view of the disc drive ready for ejecting the small-diameter optical disc.
Figure 54:
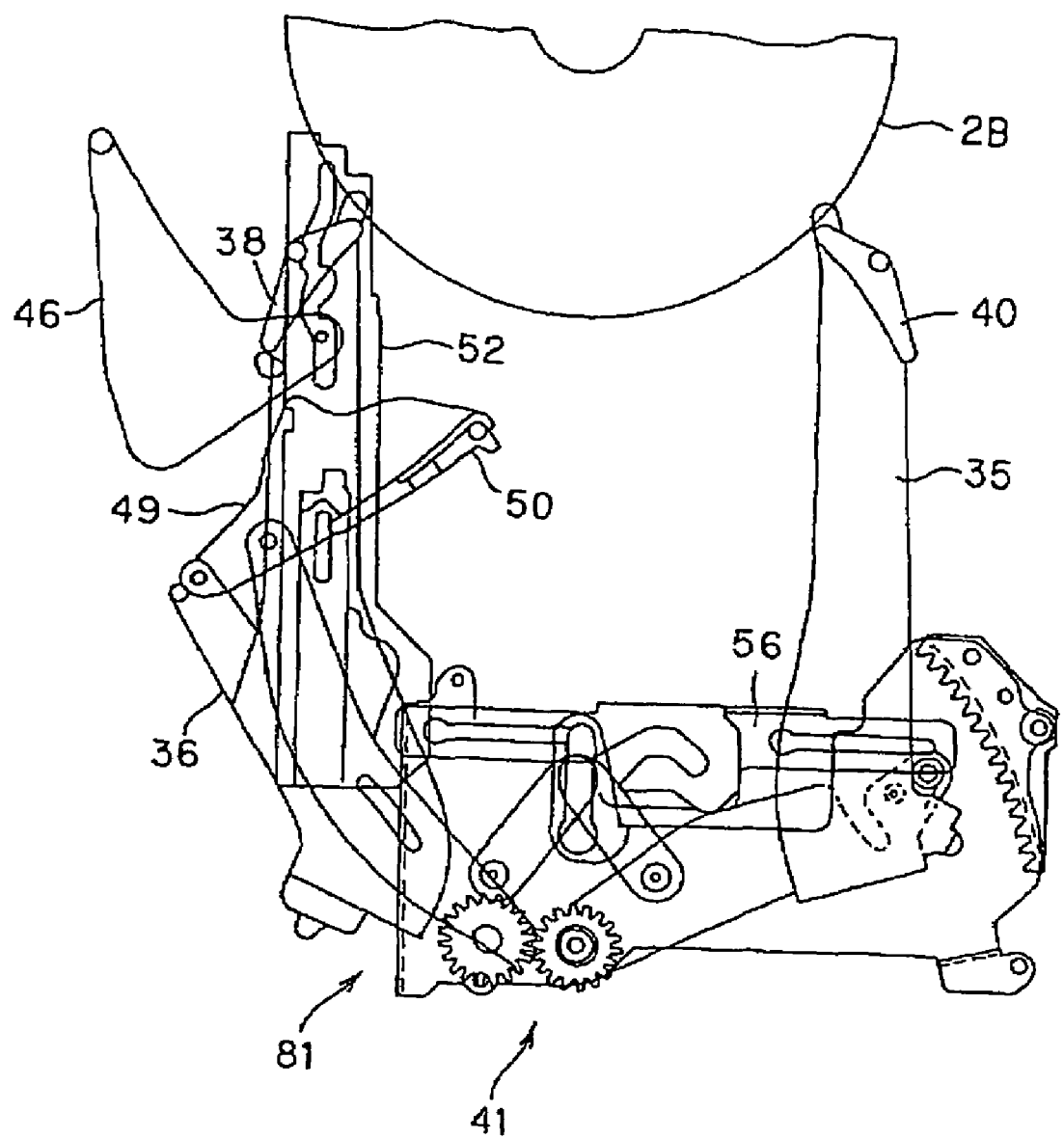
FIG. 54 is a plan view of the disc drive from which the small-diameter optical disc has been ejected.
Figure 65:
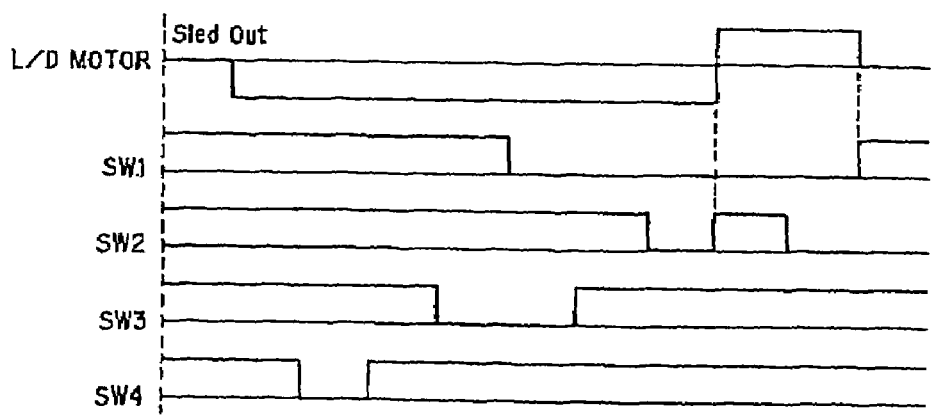
FIG. 65 diagrammatically illustrates the selection of one of the first, second, third and fourth switches when a small-diameter optical disc is ejected from the disc drive.

On the other hand, in the disc drive 1, the small-diameter optical disc 2B is ejected from on the turn-table 23a as shown in FIGS. 53 and 54 by controlling the running direction of the drive motor 102 and controlling the movement of the driving lever 52 according to the timing diagram shown in FIG. 65.

More specifically, first in ejection of the small-diameter optical disc 2B shown in FIG. 53, the drive motor 102 is made to run in the other direction, the driving lever 52 is slide toward the front side in the direction of arrow X1 in FIG. 53, the fourth pivoting arm 49 is pivoted by the linking mechanism 81 toward the front side in the direction of arrow d2 in FIG. 53, and the abutment pin 76a of the pushing lever 76 shown in FIG. 34 is put into abutment with the driving lever 52 to force the first and second pivoting arms 35 and 36 toward each other. Thus, the optical disc 2B is ejected as shown in FIG. 54.

Figure 55:
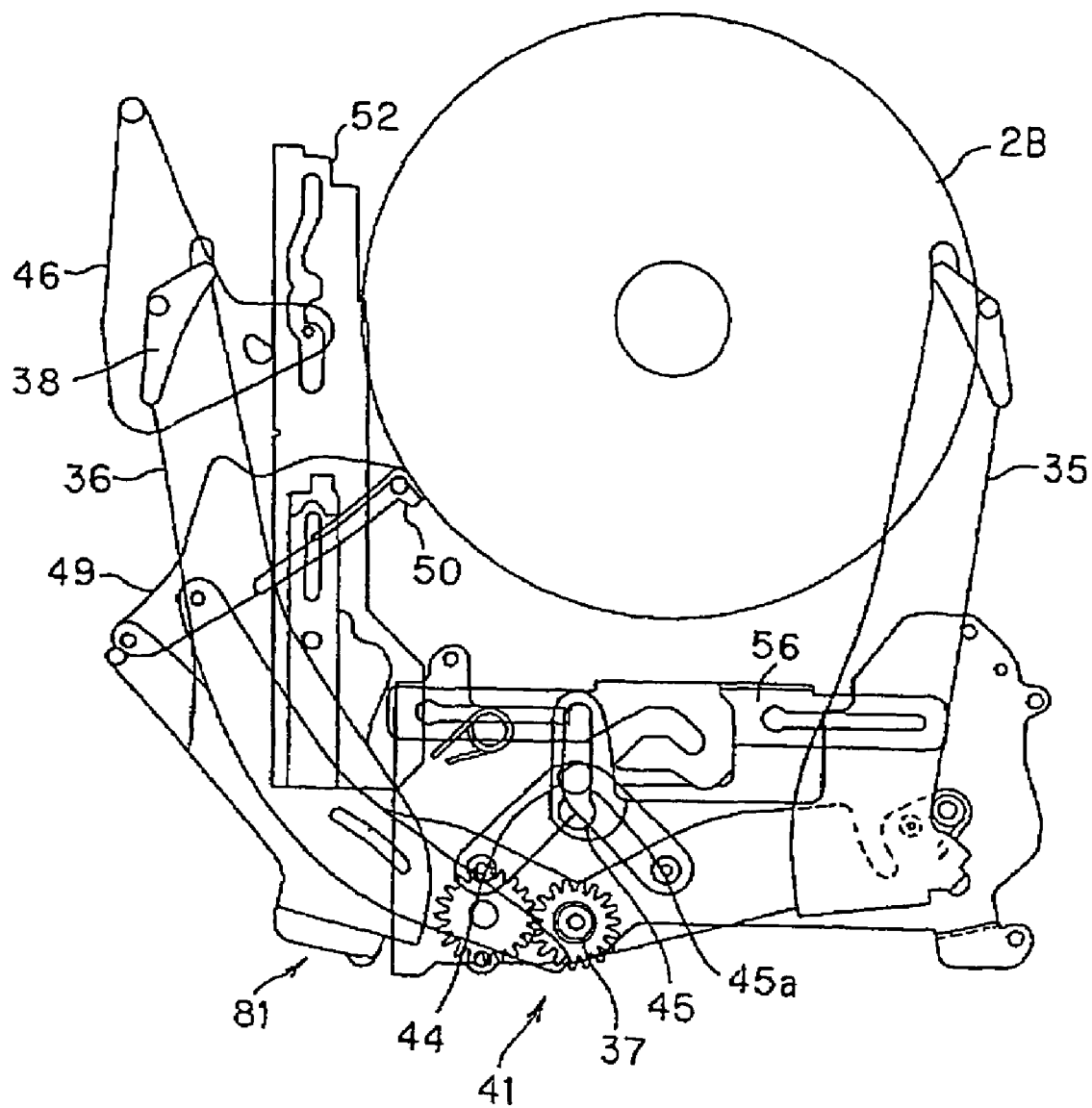
FIG. 55 is a plan view of the disc drive in which the small-diameter optical disc is inserted being one-sided.

Note that in the disc drive 1, if the small-diameter optical disc 2B is inserted from a position of the disc slot 19, sided to the first pivoting arm 35, as shown in FIG. 55, the first and second pivoting arms 35 and 36 are pivoted by the linking mechanism away from each other but the second spindle sliding in the guide recess 45 is caught by the bent portion 45a bent to the left so that the first and second pivoting arms 35 and 36 will be limited from pivoting away from each other and thus the optical disc 2B be blocked from being further inserted.

Thus, in the disc drive 1, the small-diameter optical disc 2B can be prevented from being loaded inappropriately.

Note that if the small-diameter optical disc 2B is inserted from the position of the disc slot 19, sided to the second pivoting arm 36, the drive motor 102 starts running in the one direction in an earlier timing. Thus, the third pivoting arm 46 will forcibly draw in the optical disc 2B toward the center. Therefore, there will not occur any problem even if the optical disc 2B is inserted from a portion of the disc slot 19, sided to the first pivoting arm 35.

Also, in the disc drive 1, even in case any one of the large- and small-diameter optical discs 2A and 2B is inserted, when the driving lever 52 is slid over the same stroke toward the rear side in the direction of arrow X2 shown in each of the relevant drawings, the drive motor 102 is made to run in the other direction to move the driving lever 52 toward the rear side in the direction of arrow X2 shown in each relevant drawing. So, the subsequent movement of the driving lever 52 can be sequentially controlled. Therefore, no separate detection switches may be provided for the optical discs 2A and 2B, respectively, different in outside diameter from each other, which also contributes to a simpler structure of the disc drive 1.

Figure 66:
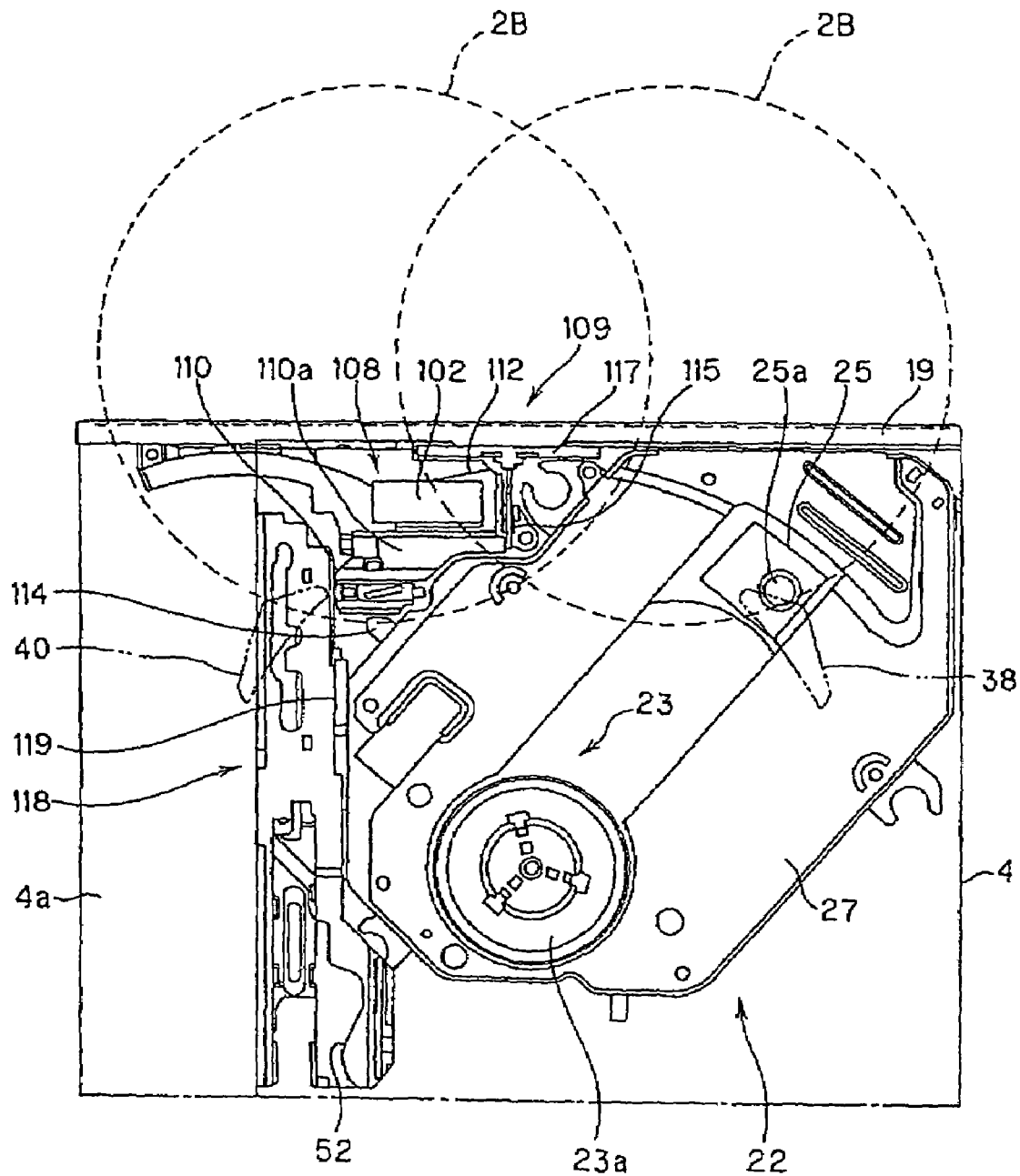
FIG. 66 is a plan view showing a physical relation among the first disc guide mechanism, second disc guide mechanism, shutter operating mechanism and small-diameter optical disc.
Figure 67:
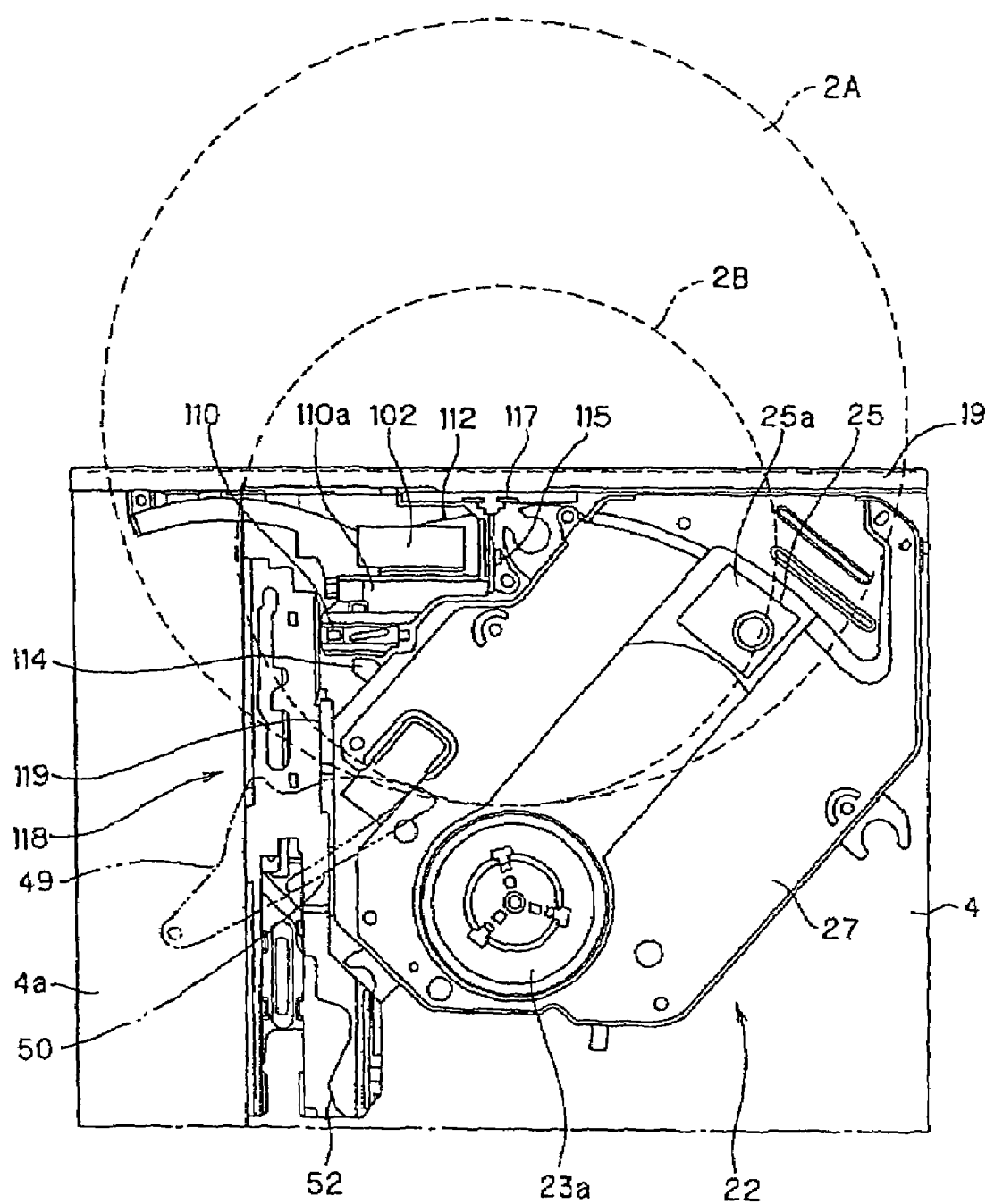
FIG. 67 is a plan view showing a physical relation among the first disc guide mechanism, second disc guide mechanism, shutter operating mechanism, large- and small-diameter optical discs.

Also, the disc drive 1 includes a first disc guide mechanism 108 provided at the front side of the bottom case 4 to guide the optical disc 2 inserted from the disc slot 19 while limiting the angle of insertion of the optical disc 2, and a shutter operating mechanism 109 to prevent, while the optical disc is set on the turn-table 23a, an additional optical disc 2 from being inserted from the disc slot 19 into the housing 3, as shown in FIGS. 66 and 67.

Figure 68:
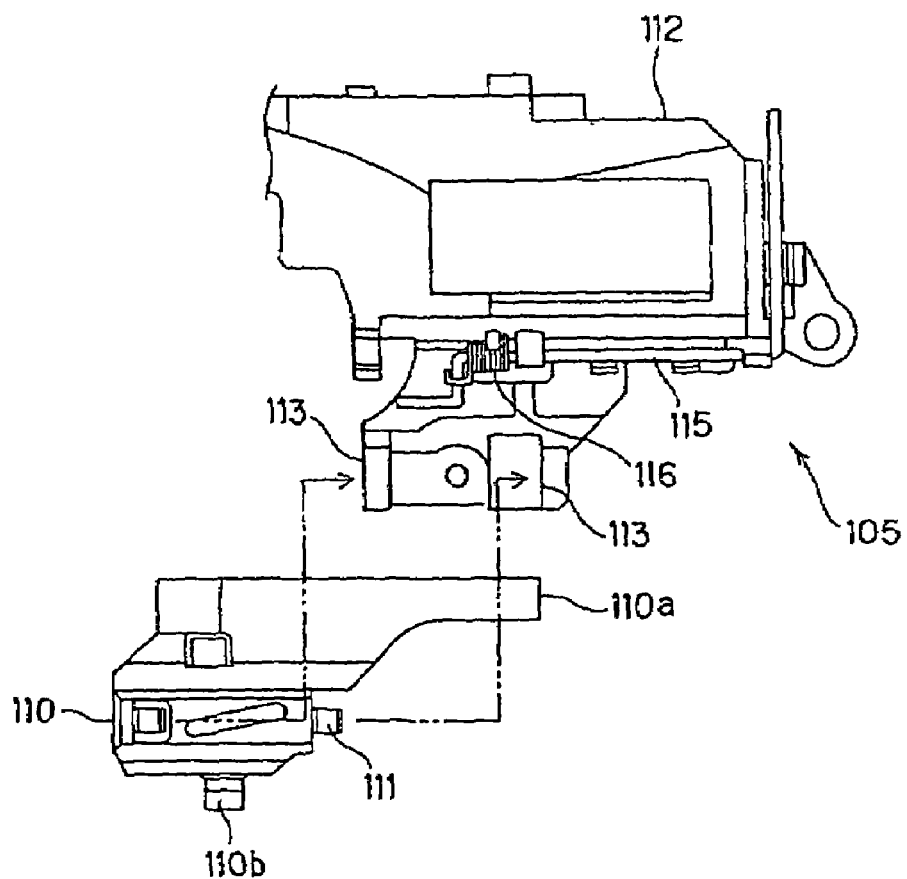
FIG. 68 shows a substantial part of the first disc guide mechanism.

As shown in FIGS. 66, 67 and 68, the above first disc guide mechanism 108 includes an insertion guide lever 110 that is lifted as the base unit 22 is elevated or lowered by the base lifting mechanism 55. The insertion guide lever 110 is formed from a synthetic resin less frictional on the optical disc 2, and disposed along the direction in which the optical disc 2 is to be inserted. It has a spindle 111 provided at the base end thereof, and is supported pivotably with the spindle 111 being engaged in a bearing 113 provided at the rear side of a motor case 112. Also, on the top of the insertion guide lever 110, there is formed for both the large- and small-diameter optical discs 2A and 2B a guide piece 110a long from side to side, extending along the disc slot 19 and projecting toward front side. Further, the insertion guide lever 110 has a pressure-receiving piece 110b projecting from the rear lateral side and which is to be pushed by a pushing piece 114 provided on the base 27.

Also, a torsion bar 115 supported on the rear side of the motor case 112 is engaged at one end thereof on the bottom of the guide piece 110a at the insertion guide lever 110. Inserted through a torsional coil spring 116 fixed to the motor case 112, the torsion bar 115 is forced by the torsional coil spring 116 to have one end thereof directed upward and other end directed downward.

In the first disc guide mechanism 108, when the base unit 22 is in the chucking position as shown in FIG. 70A, the pushing piece 114 of the base unit 22 pushes the pressure-receiving piece 110b of the insertion guide lever 110 downward to elevate the guide piece 110a of the insertion guide lever 110 to a position where it will limit the angle of insertion of the optical disc 2 inserted from the disc slot 19. On the other hand, when the base unit 22 is in the intermediate position as shown in FIG. 70B, the pressure-receiving piece 110b of the insertion guide lever 110 is released from being pushed by the pushing piece 114 of the base unit 22, so that the guide piece 110a of the insertion guide lever 110 can be lowered to a position where it will leave the signal recording surface of the optical disc 2 set on the turn-table 23a.

Therefore, in the disc drive 1, since the insertion guide lever 110 is lifted by the second disc guide mechanism 108 as the base unit 22 is lifted by the base lifting mechanism 55, when the optical disc 2 (large-diameter optical disc 2A or small-diameter optical disc 2B) is inserted from the disc slot 19 in the housing 3, the guide piece 110a of the insertion guide lever 110 guides the optical disc 2 into the housing 3 while limiting the angle of insertion of the optical disc 2 inserted from the disc slot 19, so that the signal recording surface of the optical disc 2 can be prevented from touching, and being damaged by, any part inside the housing 3. Since the guide piece 110a of the insertion guide lever 110 is long from side to side along the disc slot 19, it is compatible with both the large-diameter optical disc 2A and small-diameter optical disc 2B smaller in outside diameter than the large-diameter one 2A.

Figure 69:
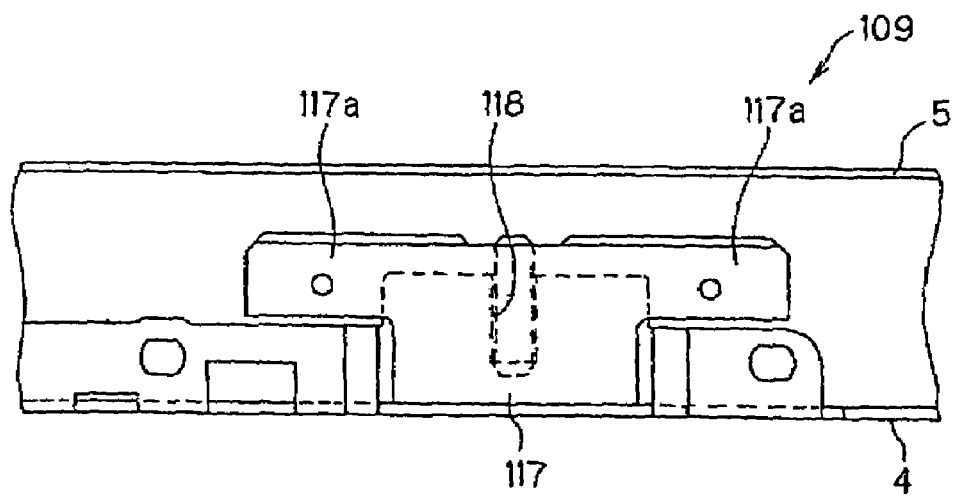
FIG. 69 is a front view of the substantial part of the shutter operating mechanism.

As shown in FIGS. 66, 67 and 69, the shutter operating mechanism 109 includes a shutter member 117 lifted synchronously with the lifting of the insertion guide lever 110 by the aforementioned first disc guide mechanism 108. The shutter member 117 is supported vertically slidable being engaged at the rear side thereof in a normal slit 118 formed in the front surface of the bottom case 4. Also, a pair of shutter pieces 117*a* extending along the disc slot 19 is provided on either lateral side of the shutter member 117 for compatibility with the large- and small-diameter optical discs 2A and 2B. The shutter member 117 is supported at the rear side thereof on the other end of the torsion bar 115. Thus, the shutter member 117 is held in a lower position.

Synchronously with lifting of the insertion guide lever 110 by the first disc guide mechanism 108, the shutter member 117 is lifted between a position where it will block the way of the optical disc 2 inserted from the disc slot 19 and a position where it will make way to the optical disc 2 inserted from the disc slot 19.

More specifically, in the shutter operating mechanism 109, when the base 27 is in the unchucking position as shown in FIG. 70A, the shutter member 117 can be lowered to a position where it will make way to the optical disc 2 inserted from the disc slot 19. On the other hand, in the shutter operating mechanism 109, when the base 27 is in the intermediate position as shown in FIG. 70B, elevation of the insertion guide lever 110 makes the torsion bar 115 supported on the motor case 112 rotate about its own axis to push the shutter member 117 upward. Thus, the shutter member 117 can be elevated to a position where it will block the way of the optical disc 2 inserted from the disc slot 19.

Therefore, in the disc drive 1, while the optical disc 2 is being set on the turn-table 23*a*, the shutter member 117 can prevent any additional large- or small-diameter optical disc 2 from being inserted into the housing 3 from the disc slot 19. Especially, since the pair of shutter pieces 117*a* of the shutter member 117 is shaped to form both wings extending along the disc slot 19, it is possible to prevent any small-diameter optical disc 2B from being inserted from a clearance between the shutter member 117 and disc slot 19.

Further, as shown in FIGS. 66, 67 and 71, the disc drive 1 includes a second disc guide mechanism 118 that guides the small-diameter optical disc 2B inserted from the disc slot 19 into the housing 3 while limiting it to such a height that it can abut the fourth abutment member 50 of the fourth pivoting arm 49.

The second disc guide mechanism 118 includes a guide lever 119 provided near the free end of the fourth pivoting arm 49 and which is lifted synchronously with lifting of the base unit 22 by the base lifting mechanism 55. The guide lever 119 is formed from a synthetic resin less frictional on the optical disc 2, and disposed along the direction in which the small-diameter optical disc 2B is to be inserted. It has a spindle 119*a* provided at the base end thereof, and is supported pivotably with the spindle 119*a* being engaged in a bearing 120*a* of a bearing member 120 provided at the bottom of the bottom case 4.

Also, on the top of the guide lever 119, there is formed a guide pin 119*b* projecting toward the driving lever 52. On the other hand, the driving lever 52 has provided thereon a cam 121 on which the guide pin 119*b* slides, as shown in FIGS. 37B, 37C and 37C. The guide lever 119 has provided at the base end thereof an elastic piece 119*c* extending from the front side toward the rear side. The elastic piece 119*c* is engaged at the free end thereof on an engagement portion 120*b* of the bearing member 120. Therefore, the guide lever 119 will be forced at the free end thereof under the elasticity of the elastic piece 119*c*.

Also, on the front-side top of the guide lever 119, there is provided a disc guide 119*d* that guides the small-diameter optical disc 2B inserted from the disc slot 19 to the fourth abutment member 50 of the fourth pivoting arm 49. On the other hand, on the rear-side top of the guide lever 119, there is provided an arm guide 119*e* that guides the optical disc 2B from the rear side of the housing 3 to the front side while limiting the fourth pivoting arm 49 in the direction of height when ejecting the optical disc 2B to outside the housing 3 from the disc slot 19 or guides the optical disc 2B from the front side of the housing 3 to the rear side when inserting the optical disc 2B from the disc slot 19 into the housing 3 of the disc drive body. Thus, when the fourth pivoting arm 49 is pivoted from the rear side of the housing 3 to the front side or from the front side of the housing 3 to the rear side, the optical disc 2B can be prevented from colliding with the engagement projection 28*a* of the turn-table 23*a*.

When the driving lever 52 is slid back and forth in the direction of arrow X1 or X2 in each of the relevant drawings, the guide pin 119*b* slides on the top of the cam 121 so that the guide lever 119 will be lifted between a guide position where it will limit the small-diameter optical disc 2B inserted from the disc slot 19 in the direction of height and a parking position where it will leave the bottom of the optical disc 2B set on the turn-table 23*a*.

Therefore, in the disc drive 1, the second guide lever located near the free end of the fourth pivoting arm 49 guides the small-diameter optical disc 2B inserted from the disc slot 19 in the housing 3 into the housing 3 while limiting the optical disc 2B inserted from the disc slot 19 to such a height that it can abut the fourth abutment member 50 of the fourth pivoting arm 49, so that the optical disc 2B can further be loaded appropriately and positively.

Note that the aforementioned insertion guide lever 110 has a function similar to that of the guide lever 119 located near the free end of the second pivoting arm 36 to guide the optical disc 2 inserted from the disc slot 19 into the housing 3 while limiting the optical disc 2 to such a height that it can abut the second front-side abutment member of the second pivoting arm 36.

Figure 72:
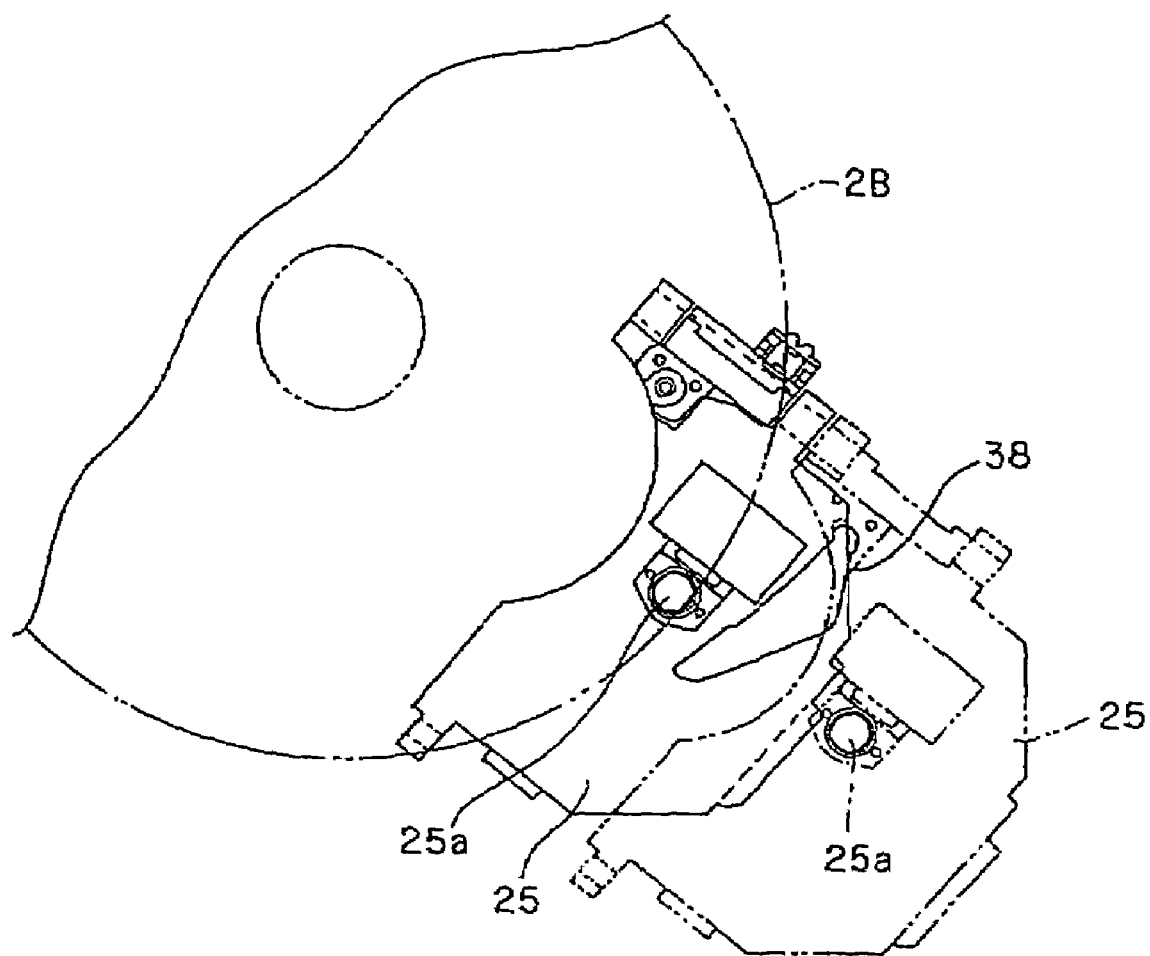
FIG. 72 is a plan view of the optical pickup that is moved between a position outside the outer radius and the inner radius of the small-diameter optical disc.

Note here that in the disc drive 1, the optical pickup 25 is kept positioned at the outermost radius in the moving direction until the optical disc 2 is completely loaded in place by the disc carrying mechanism 34, while the pickup moving mechanism 26 moves the optical pickup 25 radially to the inner radius of the optical disc 2 for the optical pickup 25 to access the inner-radial lead-in area of the optical disc 2 at the time of signal write or read, as shown in FIG. 72.

When the optical pickup 25 is moved by the pickup moving mechanism 26 between the outer and inner radius of the small-diameter optical disc 2 (2B of the large- and small-diameter optical discs 2A and 2B) with the optical disc 2B being set on the turn-table 23*a*, the objective lens 25*a* installed on the optical pickup 25 may possibly touch the first front-side abutment member 38 of the first pivoting arm 35.

On this account, in the disc drive 1 according to the present invention, when the pickup moving mechanism 26 moves the optical pickup 25 between the outer and inner radii of the small-diameter optical disc 2B, the objective lens moving mechanism retreats (lowers) the objective lens 25*a* to a position where the latter will not possibly touch the first front-side abutment member 38 in order to avoid the possible contact of the objective lens 25*a* installed on the optical pickup 25 with the first front-side abutment member 38 of the first pivoting arm 35 lying on the orbit of the objective lens 25*a*.

Figure 73:
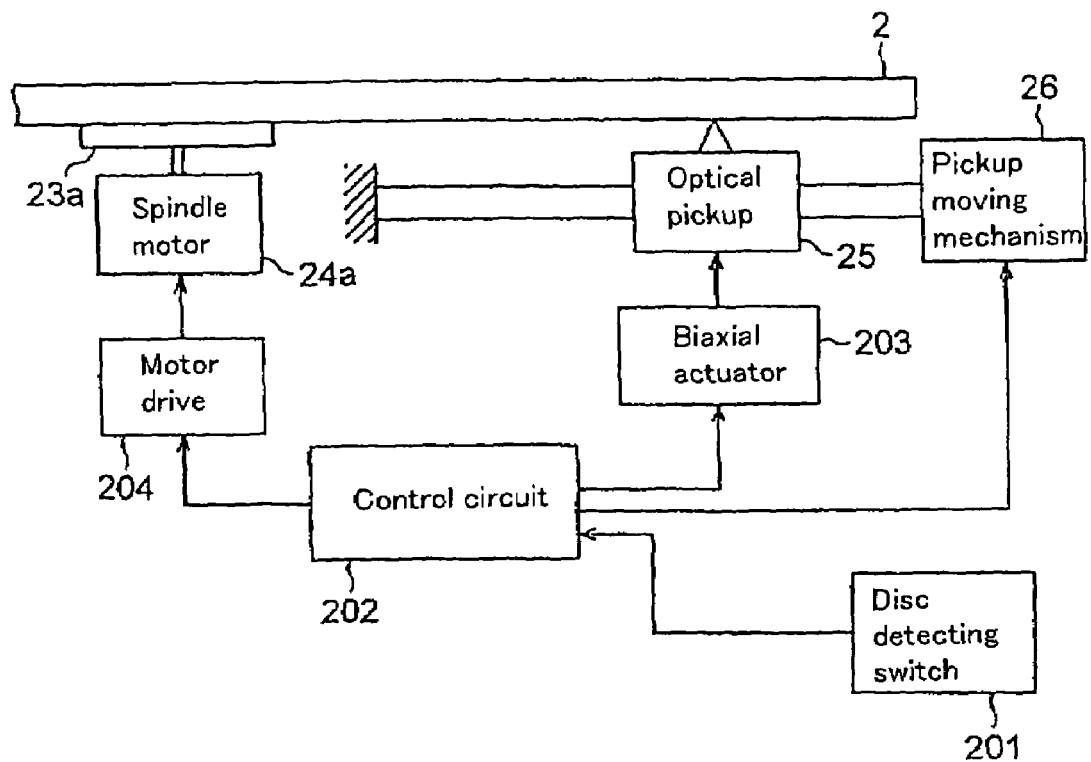
FIG. 73 is a block diagram of the disc drive including a controller that moves the objective lens of the optical pickup toward and/or away from the optical disc.
Figure 74:
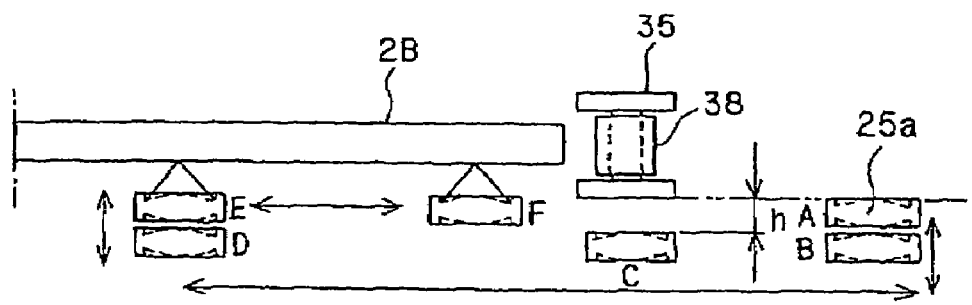
FIG. 74 is a side elevation of the objective lens driving mechanism in operation to control the movement of the objective lens.

As shown in FIG. 73, the disc drive 1 includes a disc detection switch 201 to detect when the optical disc is inserted to the write/read position inside the housing 3. When the disc detection switch 201 detects when the optical disc 2 has been inserted in the disc drive 1, it supplies a detection signal to a control circuit 202. Supplied with the detection signal indicating that the optical disc 2 is inserted, the control circuit 202 drives a biaxial actuator 203 that moves the objective lens 25*a* of the optical pickup 25 in a focusing direction parallel to the optical axis of the objective lens 25*a* and in a tracking direction in a plane perpendicular to the optical axis, to thereby retreat (lower) the objective lens 25*a* in a direction away from the signal recording surface of the optical disc 2 set on the turn-table 23*a*, as shown in FIG. 74. That is, the objective lens 25*a* is moved from a position indicated with a reference A to a position indicated with a reference B in FIG. 74.

Note here that a drive current is supplied to a voice coil motor of the biaxial actuator 203 to retreat (lower) the objective lens 25*a* to such a height h that at least touch with the first front-side abutment member 38 can be avoided, that is, to a position lower than the main side of the pickup base 29 or to a position where the objective lens 25*a* is farthest from the signal recording surface of the optical disc 2.

Next, the control circuit 202 controls the pickup moving mechanism 26 to move the optical pickup 25 radially from the outermost radius to the inner radius of the optical disc 2 for access to the inner-radial lead-in area of the optical disc 2 while keeping the objective lens 25*a* retreated in the direction away from the signal recording surface of the optical disc 2. That is, the optical pickup 25 is moved from the position B to a position indicated with a reference D in FIG. 74. At this time, since the objective lens 25*a* is retreated to a position indicated with a reference C in FIG. 74 where it is off the signal recording surface of the optical disc 2, collision can be avoided between the objective lens 25*a* and the first front-side abutment member 38.

Next, when the optical pickup 25 is moved to the inner-radial lead-in area of the optical disc 2, the control circuit 202 controls the biaxial actuator 203 to elevate the objective lens 25*a* from the position D to a position indicated with a reference E in FIG. 74 where the objective lens 25*a* stays before being retreated. More specifically, by shutting off the power supply to the voice coil motor of the biaxial actuator 203, the objective lens 25*a* is returned to the pre-retreat position E.

Next, the control circuit 202 controls a motor drive 204 to drive the spindle motor 24*a*. The spindle motor 24*a* rotates the optical disc 2 set on the turn-table 23*a*. Further, the control circuit 202 controls the motor drive 204 for the optical pickup 25 to make initial access to the optical disc 2. More particularly, when focus servo control and tracking servo control are applied while the biaxial actuator 203 is moving the objective lens 25*a*, the optical pickup 25 will read TOC (Table of Contents) recorded in the lead-in area. Thereafter, for recording signals to the optical disc 2, the optical pickup 25 is moved to a predetermined address in the program area of the optical disc 2 on the basis of the read TOC data. For reading signals from the optical disc 2, the optical pickup 25 is moved to an address in the program area where specified data is recorded (to positions E and F in FIG. 74).

Note that normally it cannot be known until the spindle motor 24 rotates the optical disc 2 set on the turn-table 23*a* and the drive current is known which the optical disc 2 is, a large-diameter one 2A or a small-diameter one 2B. On this account, unless a special switch for disc discrimination is provided on the aforementioned disc carrying mechanism 34, the optical pickup 25 should desirably be made to make an initial access in which the objective lens 25*a* is retreated whether the optical disc 2 inserted from the disc slot 19 is a large-diameter one or a small-diameter one.

On the other hand, in the disc drive 1 according to the present invention, before ejecting the optical disc 2, the above procedure is followed nearly reversely to retreat (lower) the objective lens 25*a* to a position where it will not touch the first front-side abutment member 38 and then the optical pickup 25 is moved outwardly in the radial direction.

More specifically, when the eject button 21 provided on the aforementioned front panel 18 is pressed or when an eject command is supplied from the personal computer 1000 to the disc drive 1, the optical pickup 25 is moved from the position E in FIG. 74 where the biaxial actuator 203 included in the objective lens driving mechanism will retreat (lower) the objective lens 25*a* in a direction away from the signal recording surface of the optical disc 2 set on the turn-table 23*a* to the position D in FIG. 74. The voice coil motor of the biaxial actuator 203 is supplied with a drive current to lower the objective lens 25*a* to a height h where the objective lens 25*a* will not touch at least the first front-side abutment member 38, more specifically, to a position lower than the main side of the pickup base 29 or to a position farthest from the signal recording surface of the optical disc 2.

Next, with the objective lens 25*a* being kept retreated in a direction away from the signal recording surface of the optical disc 2, the optical pickup 25 is moved from the position D in FIG. 74 where the pickup moving mechanism 26 moves the optical pickup 25 to the outer radius of the optical disc 2 to the position B. At this time, since the objective lens 25*a* has been retreated to the position C in FIG. 74 in the direction away from the signal recording surface of the optical disc 2, the contact between the objective lens 25*a* and first front-side abutment member 38 can be avoided when the small-diameter optical disc 2B is inserted.

When the optical pickup 25 has been moved to the outermost radius of the optical disc 2, the control circuit 202 controls the biaxial actuator 203 of the objective lens moving mechanism to elevate the objective lens 25*a* from the position B in FIG. 74 to the position A. More particularly, when the power supply to the voice coil motor of the biaxial actuator 203 is shut off, the objective lens 25*a* is returned to the pre-retreat position. Thereafter, the optical disc 2 is ejected by the disc carrying mechanism 34.

Note that since it has already been known when the optical disc 2 is to be ejected which the optical disc 2 set on the turn-table 23*a* is, the large-diameter one 2A or small-diameter one 2B, the objective lens 25*a* should be retreated only for ejection of the small-diameter optical disc 2B. For ejection of the large-diameter optical disc 2A, the objective lens 25*a* may not be retreated as the case may be.

Also, the objective lens 25*a* may be retreated before the optical pickup 25 is moved as well as the optical pickup 25 is being moved between the outer and inner radii of the small-diameter optical disc 2B.

As above, in the disc drive 1 according to the present invention, when the pickup moving mechanism 26 moves the optical pickup 25 between the outer and inner radii of the small-diameter one (2B) of the large-diameter optical disc 2A and small-diameter optical disc 2B different in outside diameter from each other with the optical disc 2B being set on the turn-table 23*a*, the objective lens 25*a* can be retreated away from the signal recording surface of the optical disc 2B to prevent the objective lens 25*a* from touching and damaging a part such as the first front-side abutment member 38.

INDUSTRIAL APPLICABILITY

The present invention is not limited to the slot-in type disc drive that is installed in the aforementioned personal computer 1000 but it is widely applicable to a disc drive capable of writing and/or reading information signals to and/or from an optical disc.

The invention claimed is:

1. A disc drive comprising:
   a housing having formed at a front side thereof a disc slot through which each of large- and small-diameter optical discs different in outside diameter from each other is introduced and ejected;
   a base unit including a base on which there are provided together a disc mount onto which the optical disc introduced from the disc slot into the housing is to be set, a disc rotation driving mechanism to drive, by rotation, the optical disc set on the disc mount, an optical pickup to write or read information signals to the optical disc being rotated by the disc rotation driving mechanism while irradiating a light beam condensed by an objective lens to the signal recording surface of the optical disc and a pickup moving mechanism to move the optical pickup radially of the optical disc; and
   a disc carrying mechanism to selectively carry optical discs having different outside diameters between a disc insertion/ejection position where the disc is inserted or ejected from the disc slot and a disc setting position where the optical disc is to be set,
   the optical pickup including an objective lens moving mechanism to move the objective lens at least in a direction parallel to the optical axis of the objective lens and a driving control circuit that controls the objective lens moving mechanism to retreat the objective lens in a direction away from the signal recording surface of a small-diameter one of small- and large-diameter optical discs different in outside diameter from each other, which is set on the disc mount, when the pickup moving mechanism moves the optical pickup between the outer and inner radii of the small-diameter optical disc.

2. The apparatus according to claim 1, wherein the disc carrying mechanism includes a plurality of pivoting members having provided at the free end thereof an abutment portion to abut the periphery of the optical disc inserted from the disc slot and having the base end thereof pivotably supported so that it is pivotable in a plane parallel to the optical disc, these pivoting members cooperating with each other to carry the large- or small-diameter optical disc.

3. The device according to claim 2, wherein the objective lens moving mechanism moves the objective lens to a position where it will be prevented from being put into contact with the abutment portions of the pivoting members.

4. The device according to claim 1, further comprising a base lifting mechanism having a chucking mechanism to hold the optical disc on the disc mount and which moves the base between a chucking position where the optical disc is held on the disc mount by the chucking mechanism and a position where the optical disc is released from being held by the chucking mechanism,
   the driving control circuit detecting the completion of the chucking of the optical disc by the base lifting mechanism, then retreating the objective lens in a direction away from the signal recording surface of the small-diameter optical disc and controlling the objective lens moving mechanism and pickup moving mechanism to move the optical pickup between the outer and inner radii of the small-diameter optical disc while keeping the objective lens retreated.

5. The device according to claim 1, wherein the driving control circuit positions the optical pickup at the outermost radius of the optical disc in the moving direction of the optical pickup until the disc carrying mechanism completely carries the optical disc onto the disc mount.

6. The device according to claim 1, wherein before the optical disc to be set on the disc mount is identified to be a large- or small-diameter one, the driving control circuit retreats the objective lens in a direction away from the signal recording surface of the optical disc irrespectively of the optical disc when the pickup moving mechanism moves the optical pickup.

7. A method of controlling a disc drive, comprising the steps of:
   providing a housing having formed at a front side thereof a disc slot through which each of large- and small-diameter optical discs different in outside diameter from each other is introduced and ejected;
   providing a base unit including a base on which there are provided together a disc mount onto which the optical disc introduced from the disc slot into the housing is to be set, a disc rotation driving mechanism to drive, by rotation, the optical disc set on the disc mount, an optical pickup to write or read information signals to the optical disc being rotated by the disc rotation driving mechanism while irradiating a light beam condensed by an objective lens to the signal recording surface of the optical disc and a pickup moving mechanism to move the optical pickup radially of the optical disc; and
   providing a disc carrying mechanism to selectively carry optical discs having different outside diameters between a disc insertion/ejection position where the disc is inserted or ejected from the disc slot and a disc setting position where the optical disc is to be set,
   the objective lens being retreated in a direction away from the signal recording surface of a small-diameter one of small- and large-diameter optical discs different in outside diameter from each other, which is set on the disc mount, when the optical pickup is moved between the outer and inner radii of the small-diameter optical disc.

8. The method according to claim 7, wherein the disc carrying mechanism includes a plurality of pivoting members each having provided at the free end thereof an abutment portion to abut the periphery of the optical disc inserted from the disc slot and having the base end thereof pivotably supported so that it is pivotable in a plane parallel to the optical disc, the objective lens being retreated to a position where it will be prevented from being put into contact with the abutment portion of each pivoting member when these pivoting members cooperate with each other to carry the large- or small-diameter optical disc.

* * * * *